(12) United States Patent
Crum et al.

(10) Patent No.: US 11,071,978 B2
(45) Date of Patent: Jul. 27, 2021

(54) TRANSPORTER SYSTEMS, ASSEMBLIES AND ASSOCIATED METHODS FOR TRANSPORTING TISSUE SAMPLES

(71) Applicant: Ventana Medical Systems, Inc., Tucson, AZ (US)

(72) Inventors: Nathan Crum, Marana, AZ (US); Timothy Keller, Oro Valley, AZ (US); Alastair Laing, Oro Valley, AZ (US); Michael Otter, Tucson, AZ (US); Vinnie Petre, Tucson, AZ (US); Elizabeth Pigman, Tucson, AZ (US); Taylor Shingler, Tucson, AZ (US); Stacey Stanislaw, Tucson, AZ (US); Benjamin Stevens, Oro Valley, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

(21) Appl. No.: 15/659,581

(22) Filed: Jul. 25, 2017

(65) Prior Publication Data
US 2017/0320054 A1    Nov. 9, 2017

Related U.S. Application Data

(63) Continuation of application No. PCT/EP2016/051489, filed on Jan. 27, 2016.
(Continued)

(51) Int. Cl.
*B01L 3/00* (2006.01)
*G01N 35/10* (2006.01)
(Continued)

(52) U.S. Cl.
CPC ............ *B01L 3/502* (2013.01); *B01L 9/06* (2013.01); *G01N 1/31* (2013.01); *G01N 35/10* (2013.01);
(Continued)

(58) Field of Classification Search
None
See application file for complete search history.

(56) References Cited

U.S. PATENT DOCUMENTS

| | | | | |
|---|---|---|---|---|
| 2003/0087423 A1* | 5/2003 | Haywood | ............... | B01L 3/502 435/270 |
| 2008/0206807 A1* | 8/2008 | Duymelinck | ........... | B01L 3/508 435/40.5 |

(Continued)

FOREIGN PATENT DOCUMENTS

| | | |
|---|---|---|
| EP | 2458365 A1 | 5/2012 |
| JP | 2001-066196 A | 3/2001 |

(Continued)

OTHER PUBLICATIONS

International Search Report dated Apr. 25, 2016 from corresponding PCT/EP2016/051489 filed Jan. 26, 2016, 5 pages.

*Primary Examiner* — Kathryn Wright
(74) *Attorney, Agent, or Firm* — Charney IP Law LLC; Thomas M. Finetti

(57) ABSTRACT

A tissue sample that has been removed from a subject can be properly fixed for evaluation using the disclosed transporter assembly for carrying a tissue sample and method for fixing an unfixed tissue sample. In one embodiment, the disclosed assembly includes a transport container, a fixative in the transport container, and a cooling device that reduces and/or maintains the temperature of the fixative to perform a pre-soaking process at a temperature of less than about 7° C. The pre-soaking process can, for example, be performed
(Continued)

during sample transport or during extended periods of storage, such as over a weekend.

24 Claims, 61 Drawing Sheets

Related U.S. Application Data

(60) Provisional application No. 62/107,874, filed on Jan. 26, 2015, provisional application No. 62/108,184, filed on Jan. 27, 2015.

(51) Int. Cl.
  *G01N 1/31* (2006.01)
  *B01L 9/06* (2006.01)
  *B01L 7/04* (2010.01)

(52) U.S. Cl.
  CPC ............ *B01L 3/50825* (2013.01); *B01L 7/04* (2013.01); *B01L 2200/026* (2013.01); *B01L 2200/147* (2013.01); *B01L 2200/18* (2013.01); *B01L 2300/024* (2013.01); *B01L 2300/047* (2013.01); *B01L 2300/0609* (2013.01); *B01L 2300/1855* (2013.01); *B01L 2300/1877* (2013.01); *B01L 2300/1883* (2013.01); *B01L 2300/1894* (2013.01); *G01N 2001/315* (2013.01)

(56) References Cited

U.S. PATENT DOCUMENTS

| | | |
|---|---|---|
| 2009/0104692 A1 | 4/2009 | Bartfeld et al. |
| 2011/0129910 A1 | 6/2011 | Kang et al. |
| 2012/0214195 A1 | 8/2012 | Chafin et al. |
| 2012/0236900 A1 | 9/2012 | Hubbard et al. |
| 2015/0037830 A1 | 2/2015 | Jakobsen et al. |

FOREIGN PATENT DOCUMENTS

| | | |
|---|---|---|
| JP | 2002-82026 | 3/2002 |
| JP | 2004-037215 | 2/2004 |
| JP | 2004-238051 | 8/2004 |
| JP | 2007121017 A | 5/2007 |
| JP | 2011502254 A1 | 1/2011 |
| JP | 2014505890 A | 3/2014 |
| WO | 2007014742 A1 | 2/2007 |
| WO | 2012110646 A1 | 8/2012 |
| WO | 2013/192606 A1 | 12/2013 |

\* cited by examiner

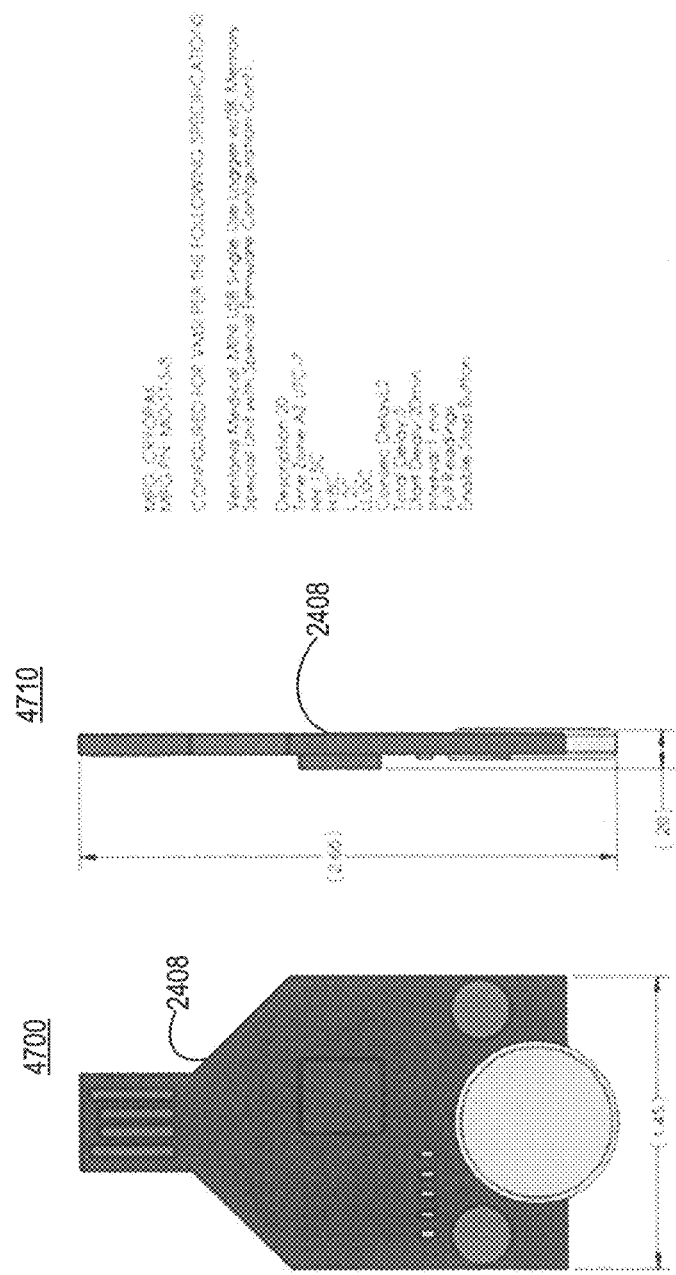

Cooling Box for Specimen transport

- Cooling elements are pre-charged over night for next day surgery.
- Reagent Containers/Vials are kept precooled in fridge.
- Box is configured prior to surgery and transported to surgery location and will keep reagents cold.
- Shipping is initiated at end of surgery day

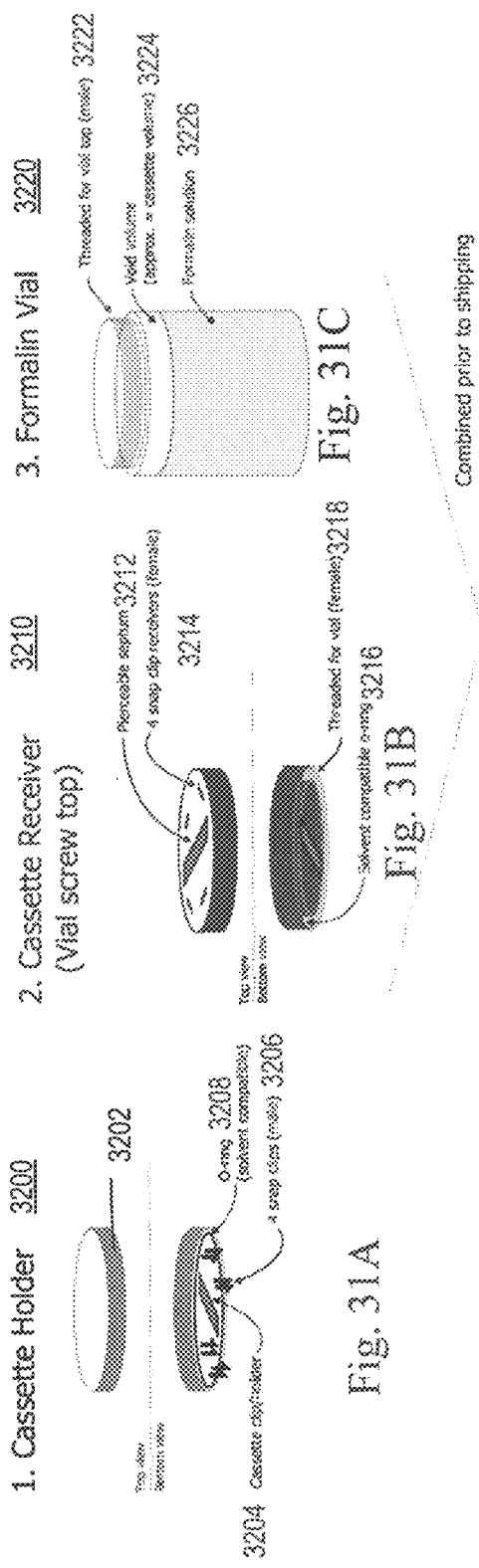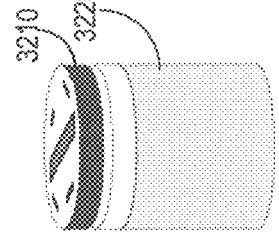

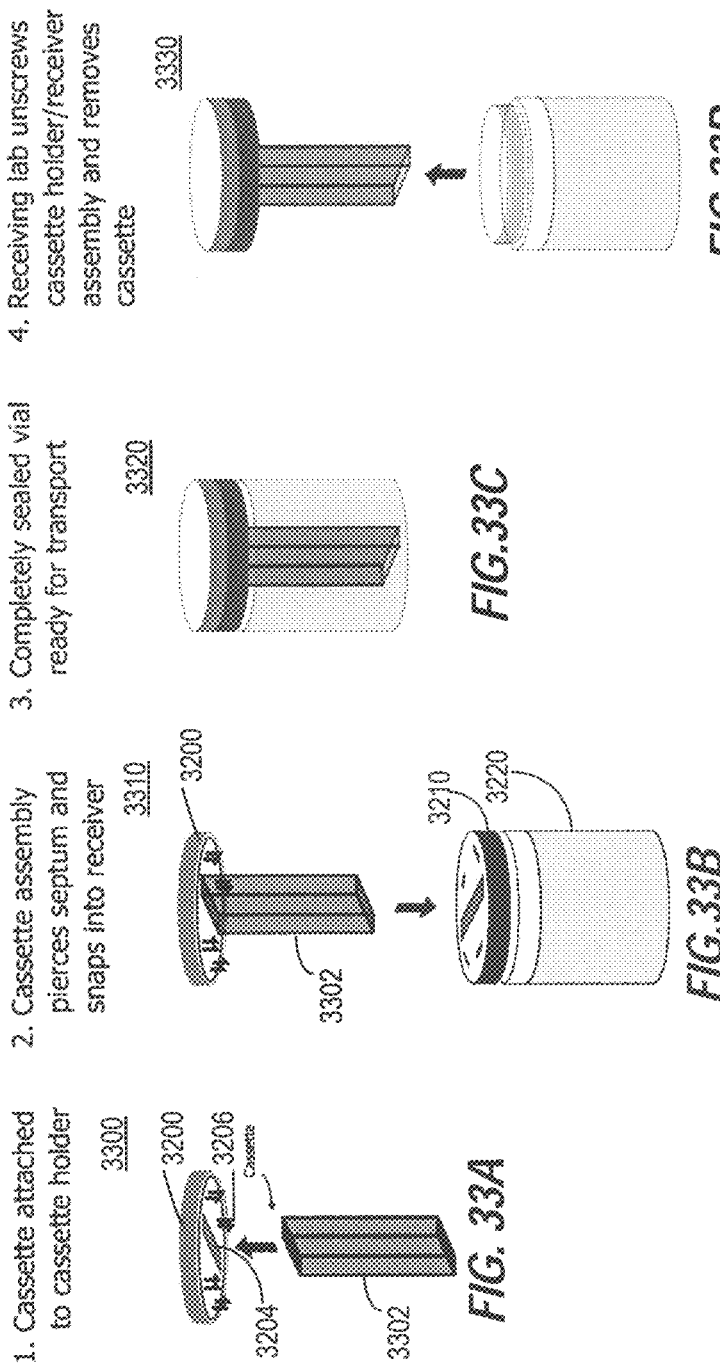

State #1: The sample is in air, exposed to the environment. The black wedge is the membrane-breaking "arm," shown attached to the SampleContainer Lid.

The formalin is isolated from the environment. The red surface indicates a breakable membrane.

A continuation of State 1, the Sample Container Lid is affixed to the Sample Container:
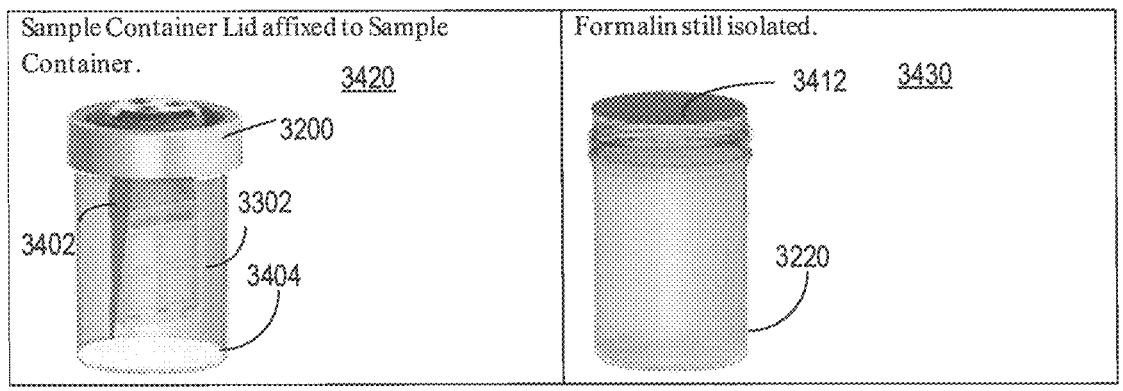
FIG. 34C    FIG. 34D
Transition to State 2: By screwing the Sample Container around the Formalin Container, we isolate the sample from the environment. The formalin is still isolated from the sample because the membrane has not yet been broken by the arm.
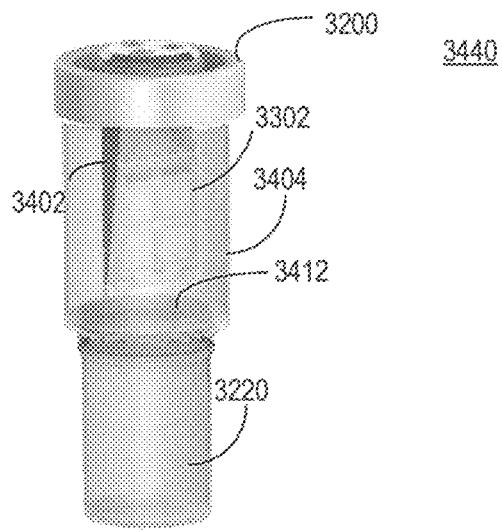
FIG. 34E

TISSUE TRANSPORT CONTAINER W/FUME REDUCTION
01 APR 2014

- 3500
- 3508 CASSETTE COVER
- 3302 TISSUE CASSETTE
- 3504 CASSETTE CLIP
- 3506
- 3510 TISSUE CONTAINER LID
- 3512 CASSETTE SEPTUM
- 3514
- 3520 TISSUE CONTAINER

FIG. 35A

3510
1) CASSETTE IS DRY & STERILE ABOVE LID AND CONTAINER IS PRE-FILLED WITH FORMALIN.
FIG. 35B

3520
2) CASSETTE COVER IS REMOVED AND DISCARDED, BREAKING STERILE SEAL.
FIG. 35C

3530
3) CASSETTE AND CLIP ARE UNSCREWED FROM THE LID TOGETHER.
FIG. 35D

3540
4) INSERT TISSUE INTO CASSETTE.
FIG. 35E

3550
5) REPLACE TISSUE CONTAINER LID AND SCREW THE CASSETTE CLIP INTO THE INSIDE.
FIG. 35F

3560
6) INSERT CONTAINER LID AND CASSETTE ASSEMBLY INTO CONTAINER THROUGH SEPTUM.
FIG. 35G

3570
7) TISSUE AND CASSETTE ARE SEALED IN TISSUE CONTAINER WITH FORMALIN.
FIG. 35H

3580
8) SEPTUM REMOVED WITH CASSETTE CLIP AND LID TO PROVIDE SPLASH-FREE, EASY ACCESS TO THE CASSETTE.
FIG. 35I

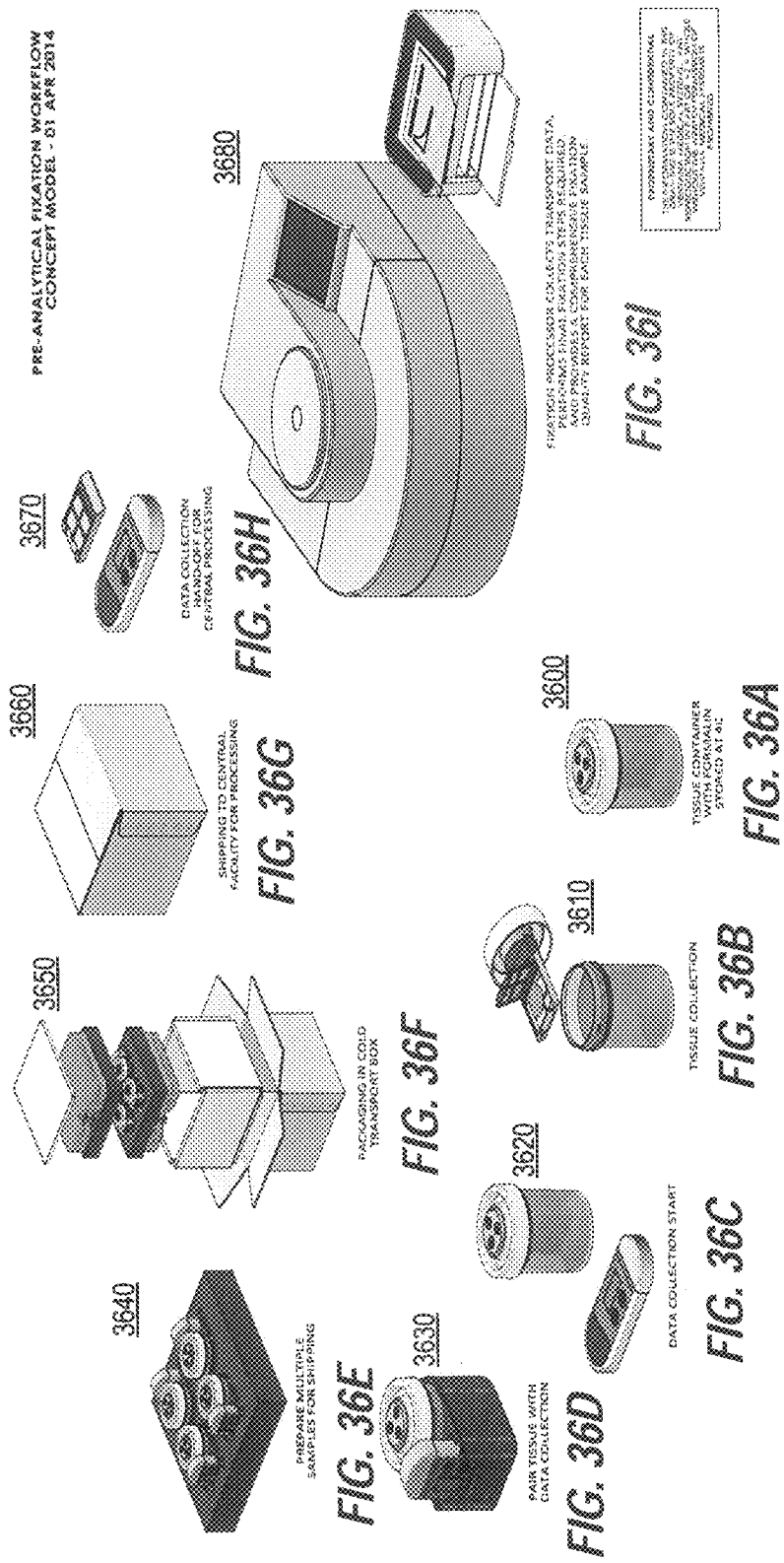

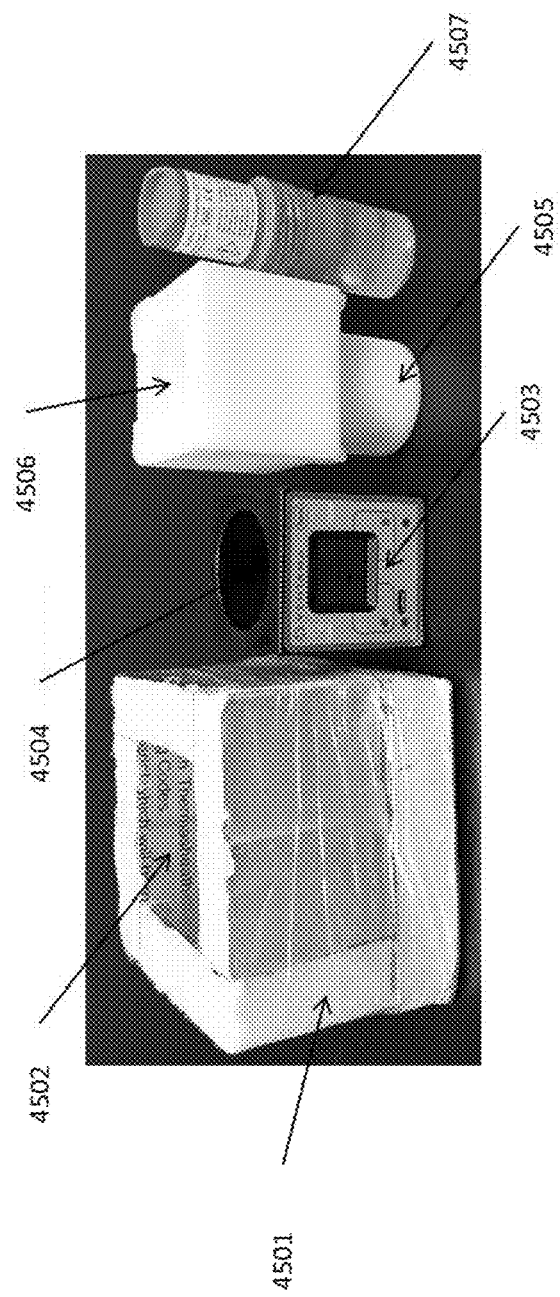
Fig. 45A
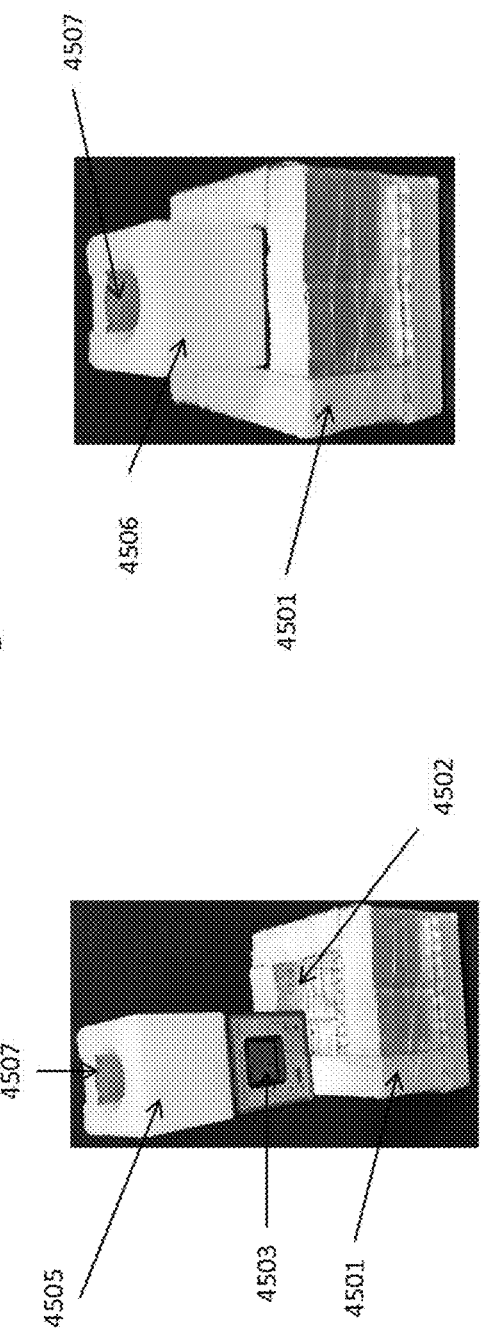
Fig. 45B
Fig. 45C

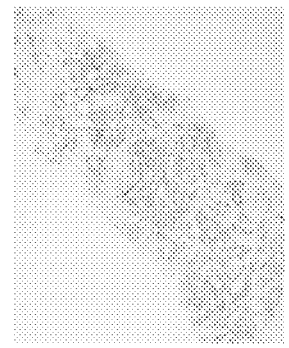
21°C with air flow
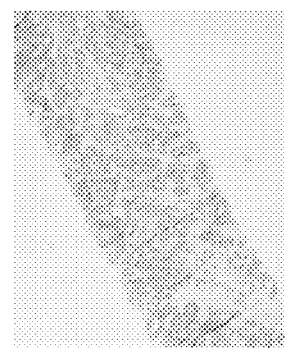
23°C
Fig. 46B
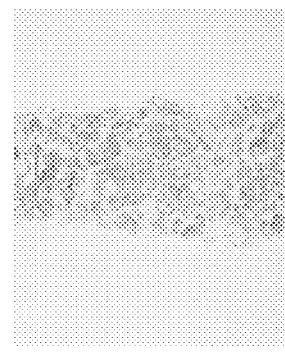
19°C
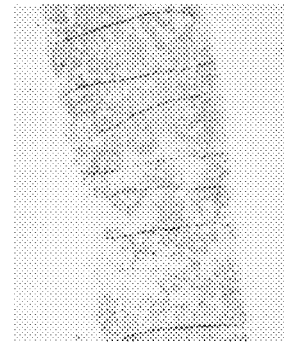
15°C
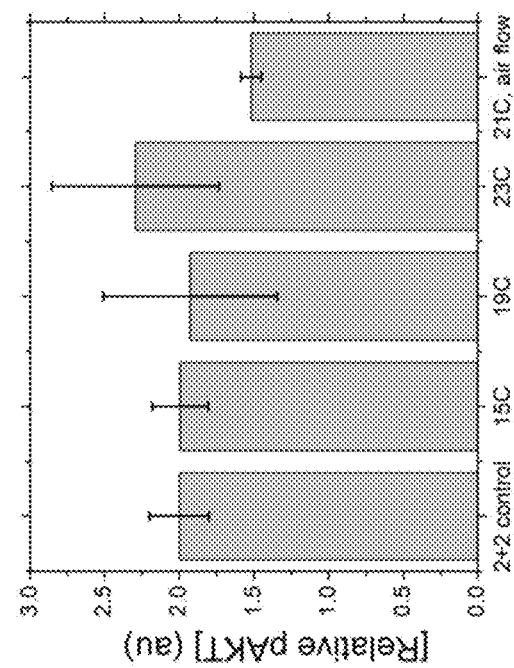
Fig. 46C

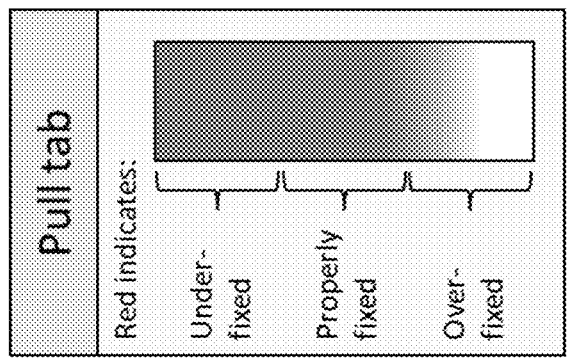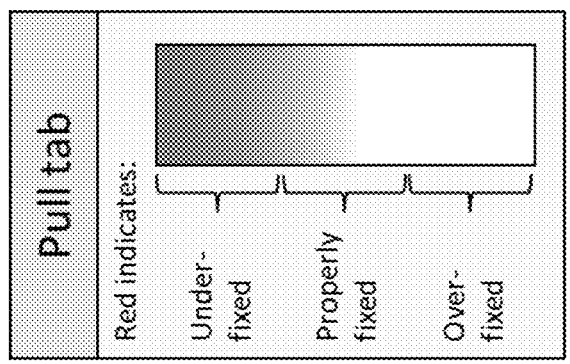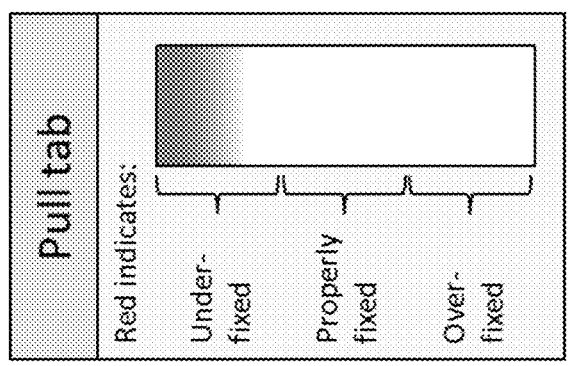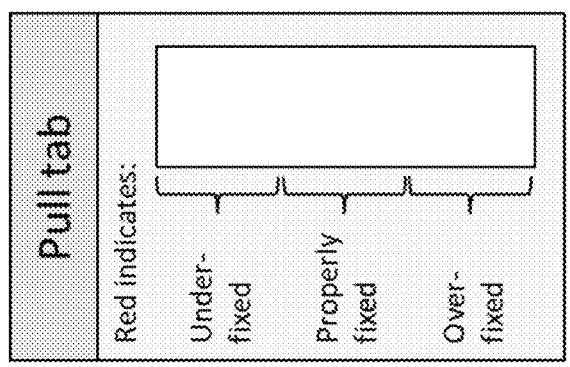
Fig. 47B

| Warm step / Cold step | Underfixed | Properly fixed | Overfixed |
|---|---|---|---|
| Not fully diffused | 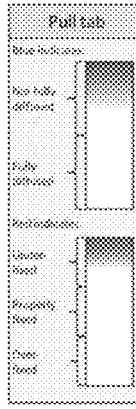 | 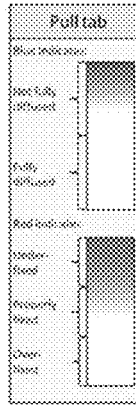 | 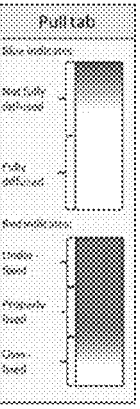 |
| Fully diffused | 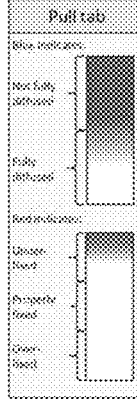 | 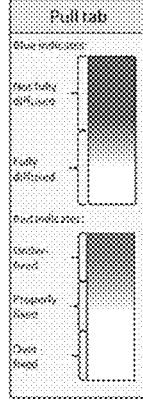 | 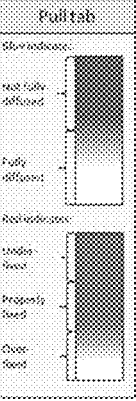 |
Fig. 47D

TRANSPORTER SYSTEMS, ASSEMBLIES AND ASSOCIATED METHODS FOR TRANSPORTING TISSUE SAMPLES

CROSS-REFERENCE TO RELATED APPLICATIONS

This is a continuation of International Patent Application No. PCT/EP/2016/051489, filed Jan. 26, 2016, the benefit of which is claimed. Benefit is further claimed to each of U.S. Provisional Patent Application No. 62/107,874, filed Jan. 26, 2015, and U.S. Provisional Patent Application No. 62/108, 184, filed Jan. 27, 2015. The contents of all of these related applications are incorporated by reference herein.

FIELD

The present disclosure relates generally to transporter systems, assemblies and associated methods for transporting tissue samples. More specifically, the present disclosure relates to transporter systems and transporters for monitoring and/or analyzing the condition of tissue samples during transportation to improve the preservation of cellular activity.

BACKGROUND

Preservation of tissues removed by surgical procedures is a topic of great importance. After removal of a tissue sample from a subject, the tissue sample is often placed in a liquid that will suspend the metabolic activities of the cells. This process is commonly referred to as "fixation" and can be accomplished by several different types of liquids. The most common fixative in use by anatomical pathology labs is 10% neutral buffered formalin (NBF). This fixative forms cross-links between formaldehyde molecules and amine containing cellular molecules. In addition, this type of fixative preserves proteins for storage. When used at room temperature, NBF diffuses into a tissue section and cross-links proteins and nucleic acids, thereby halting metabolism and preserving the tissue for paraffin wax infiltration. The formalin can be at slightly elevated temperature (i.e., higher than room temperature) to further increase the cross-linking rate, whereas lower temperature formalin can significantly decrease the cross-linking rate. For this reason, histologists typically perform tissue fixation at room temperature or higher.

Several effects are often observed in tissues fixed by the above methods. First as the fixative is defusing into the tissue at room or higher temperatures the cross-linking is occurring at the same time. This cross-linking inhibits the fixative diffusion which can allow enzymes in the tissue to degrade fragile biomarkers that can be critical to disease interpretation. This also can lead to tissue that is either under exposed or over exposed by liquid fixatives. For example, if formalin has not diffused properly through the tissue samples, outer regions of the tissue samples exposed to formalin may be over-fixed and interior regions of the tissue samples not exposed to formalin may be under-fixed, resulting in very poor tissue morphology. In under-fixed tissue, subsequent exposure to ethanol often shrinks the cellular structures and condenses nuclei since the tissues will not have the chance to form a proper cross-linked lattice. When under-fixed tissue is stained, such as with hematoxylin and eosin (H&E), many white spaces may be observed between the cells and tissue structures, nuclei may be condensed, and samples may appear pink and unbalanced with the hematoxylin stain. Tissues that have been over-fixed typically do not work well for subsequent immunohistochemical (IHC) processes. As a result, the optimal antigen retrieval conditions for these tissues do not work properly and therefore the tissue samples appear to be under stained.

Proper medical diagnosis and patient safety often require properly fixing the tissue samples prior to staining. After excision, tissue samples are often placed in warm formalin and transported from an operating room to a laboratory. Unfortunately, the tissue samples tend to exhibit over-fixed outer regions and under-fixed inner regions. It may be difficult to identify such over-fixation and under-fixation upon arrival to the laboratory, thereby making it difficult to properly prepare the samples for examination. The workers at the laboratory may not know when to remove the tissue samples from the formalin or other fixative. If tissue samples are removed from the formalin prior to complete diffusion and/or cross-linking, the sample may be under-fixed. If the specimen is left in the formalin an excess length of time, diagnosis may be delayed and the specimen may be over-fixed. This under-fixation and over-fixation often results in poor preservation of biological molecules, tissue morphology, and/or post-translational modification signals.

Conventional, prefilled specimen containers are available from various suppliers. Such conventional containers offer only a simple lid for closing after sample insertion. It is not possible to ascertain what conditions the tissue sample in the container was exposed to or for how long. Conventional specimen tracking is generally performed by a handwritten process on paper labels or reports filled out after a sample has been removed from a patient and before transporting the sample container to the lab. Several minutes or even tens of minutes can laps during which sample degradation can occur.

There are several problems with current best-practice histology sample, collection, and transport methodologies. Current room-temperature fixation protocols do not preserve biomarkers sufficiently. Tissue storage after removal is not sufficiently standardized with respect to biomarker preservation; this can result in some specimens even being left without formalin over the weekend in a refrigerator. The lack of rigid adherence to set protocols across institutions and sites often results in widely varying degrees of histomolecular degradation. This compromises downstream processing, especially in samples subjected to a variety of biomarker-based diagnostics.

Current, standard specimen collection containers general contain a single, initially-submerged tissue sample that does not stay in place during transport. These results in the tissue often floating up to the surface, or adhered to the side of the wall of the container, thus compromising the amount of contact each sample has with the fixative fluid, the perfusion of which is critical for proper preservation and subsequent processing of the sample. Additionally, variations in ambient temperature during transport are known to affect efficacy of fixative. WO 2012/040823 A1 discloses a two part specimen container where the fixative is held in a separate compartment until after the sample has been placed in the specimen compartment. EP1913360B1 and U.S. Pat. No. 8,691,165B2 ('360/'165 devices) disclose a specimen container that has temperature and/or time data logging devices embedded in either the specimen container, container cap or a tissue cassette carried in the specimen container. None of the above systems/devices solve the fixation and other problems mentioned above.

General best-practices may vary intra- and inter-institutionally in spite of barcode labeling. Current methodologies rely heavily on paper and individualized computer input which may also vary from institution to institution; chain of custody is established through a series of signatures. Real-time tracking of the computer specimen is paper-based and cannot provide an up-to-the-minute accounting of temperature, location and transport time. The end result of these challenges is questionable sample quality (biomarker preservation may not correctly reflect the original state of the tissue) and lack of traceability during processing. These are unacceptable risks when dealing with oncology patients.

SUMMARY OF THE DISCLOSURE

The disclosed sample collection, transport and tracking system includes an integrated solution for meeting one or more of the above-referenced challenges, especially the preservation of biomarkers in a tissue sample. The various embodiments provide superior, digitized tracking that begins the process of optimized formalin fixation and biomarker preservation without supervision by a laboratory technician. A cold part of the fixation process happens while the specimen is in transit. This means that once the specimens reach their destination: an anatomic pathology laboratory, they need at most a short heat treatment (e.g. ~1 hour at 45° C.) to achieve substantially higher quality fixation for subsequent processing, staining and analysis.

The disclosed integrated solution therefore can, in certain embodiments, result in 1) superior formalin fixation results for a broader range of biomarker-based diagnostics, including novel biomarker preservation previously only possible in fresh frozen specimens; 2) a processing time that is compatible with standard fixation protocols (depending on tissue type); 3) preservation of volatile biomarkers for up to 14 days prior to complete processing; 4) optionally, fully electronic tracking establishing a chain of custody that can be readily accessed from digital tablets and/or uploaded for cloud computing; 5) optionally, a real-time recording of multiple conditions that can be used to gauge whether additional measures will be necessary at destination to ensure optimal processing, including staining.

In general, the presently disclosed sample collection, transport, and tracking systems can comprise: (a) a sample container for holding the tissue sample immersed in a volume of cold formalin-based fixative solution; (b) a temperature-responsive element capable of tracking and recording the temperature of formalin-based fixative solution disposed in the sample container; and (c) a case comprising an insulator or a cooling element insulator and/or a cooling element, wherein the cavity is sized to accept the sample container and the temperature-responsive element in an arrangement that permits the temperature-responsive element to track and record the temperature of the formalin-based fixative solution in the sample container, and wherein the insulator and/or a cooling element is capable of maintaining the volume of the formalin-based fixative solution at a temperature in the range of 0° C. to 10° C. for at least 2 hours under shipping conditions when the tissue sample transport and storage assembly is assembled.

In some embodiments, an apparatus for processing tissue samples includes a container holding reagents, a carrier assembly, and a transport mechanism (transporter). The carrier assembly can include a specimen holder and a sensor or monitoring assembly positioned to monitor various conditions of the tissue sample held by the specimen holder. In one embodiment the monitor assembly can include one or more sensors selected to, among other capabilities, determine, monitor or store data about: the temperature of the container and/or sample; elapsed time; environmental temperature in the transporter; ambient light to determine if the carrier assembly and sample container are in or outside the transporter; acoustic; infrared proximity (determine if specimen or a cassette containing the specimen is in the specimen container or the container is in the carrier assembly, etc.); accelerometer to records impact or inversion; leaks or fluid loss; or any other type of sensors or sensor arrays. Additionally, one or more sensors can be configured to transmit data, such as temperature, for example, while being submerged in the reagent in the specimen holder in the reagents.

At least some embodiments disclosed herein are transporter systems for monitoring tissue samples before, during, and/or after fixation. The tissue sample(s) are placed in fixative contained in a specimen container which is held in a carrier assembly which in turn is placed in a transporter. The specimen container can be removed from the carrier and transporter and processed based on information from a monitoring system. The monitoring system can provide, without limitation, diffusion or saturation information, fixation information, temperature-time information, or other information about the tissue samples. In some procedures, a transporter with a cooling capability can rapidly reduce the temperature of the fixative to a preferred temperature for minimizing or limiting fixation (e.g., cross-linking). The cooling transporter can continuously or periodically cool the fixative to keep the fixative at or below the pre-soaking temperature throughout shipping. After fixative has adequately saturated the tissue sample, a fixation process can later be performed to fix substantially the entire tissue sample. In some embodiments, the transporter can provide information to the laboratory indicating the diffusion or saturation status. In some embodiments, the cooling transporter is operable to reduce a temperature of the fixative to inhibit fixation of a tissue sample during a diffusion process.

At least some embodiments disclosed herein are specimen transporters that can pre-cooled a fixative. A tissue sample can be contacted with the pre-cooled fixative, which diffuses through the tissue sample. The specimen transporter can keep the tissue sample, and fixative diffused through the tissue sample, at a relative low temperature to inhibit or prevent fixation. The fixation process can be caused by heating the tissue sample to start or promote cross-linking. In some embodiments, the transporter keeps the tissue sample at the low temperature during transport from a collection site (e.g., an operating room at a hospital) to a processing site (e.g., a pathology laboratory). After receiving the container, the pathology laboratory can perform the fixation process. As such, substantially the entire fixation process can be performed at the pathology laboratory.

In some embodiments, a low temperature portable transporter system includes a carrier assembly including a holding chamber, a fixative in a specimen container retained in the holding chamber, and either or both a cooling device carried by a transporter or insulation in the transporter sufficient to maintain the fixative at a desired temperature for a desired amount of time. The cooling device is generally in thermal communication with the specimen container and is operable to reduce a temperature of the fixative in the container. In one embodiment, the carrier assembly has an open configuration for receiving the tissue sample and fixative container and a closed configuration for sealing the holding chamber. The cooling device can have a non-cooling mode and a cooling mode. In one embodiment, the cooling device in the cooling mode reduces a temperature of the fixative to at least about 15° C. in less than about 5 minutes. In some embodiments, the pre-soaking and later fixation process preserve signals of proteins in the tissue sample significantly, for example, by preserving at least 30%, 50%, 70%, or 90% post-translation modification signals. The tissue fixation methods in accordance with at least some embodiments can significantly halt the enzyme activities degrading proteins, such as halting the enzyme activities of protease.

In some embodiments, the transporter system is adapted to perform an autonomous warming process, whereby a cold environment for the tissue sample container for a minimum period of time (generally at least 2 hours) to allow for diffusion of the fixative solution into the tissues, before allowing it to passively warm to ambient temperature over a few hours, at which temperature the tissue can be fixed through chemical crosslinking. The cold temperature is maintained by contact with a thermal reservoir made of a phase change material which has a melting temperature close to the desired diffusion temperature (which is generally from 0 to 7° C.), which also allows the phase change material to be frozen in conventional refrigerator. Exemplary phase change materials include, for example, proprietary blends of oily (at room temperature) liquids, such as mixtures derived from vegetable oils (triglycerides), cycloalkanes and other components, and from paraffin (linear and/or branched hydrocarbons of various lengths).

In some embodiments, a portable transporter system includes a carrier assembly, a fixative, and a fixation-inhibiting cooling device. The carrier assembly includes a holding chamber containing the fixative. The fixation-inhibiting cooling device is carried by the carrier assembly and is in thermal communication with the fixative. The fixation-inhibiting cooling device is operable to reduce a temperature of the fixative to inhibit fixation of a tissue sample contacting the fixative. The portable transporter system can be readily carried (e.g., manually transported) by a person. In a laboratory setting, the portable transporter system can be manually transported between workstations and equipment. In a shipping setting, the portable transporter system can be manually transported to and from a vehicle. The portable transporter can be configured to thermally isolate or substance a pre-cool fixative. Additionally or alternatively, the portable transporter can be self-cooling to chill the fixative.

In yet further embodiments, a portable transporter system includes a carrier assembly, a fixative, and a thermal device operable to adjust of maintain the temperature of the fixative to inhibit fixation of a tissue sample, promote fixation, or the otherwise thermally process the tissue sample. The portable transporter system can be a handheld system for convenient transport. In some embodiments, the thermal device includes a fixation-inhibiting cooling device configured to reduce a temperature of the fixative to perform a diffusion process. In other embodiments, the thermal device includes a thermoelectric unit and/or refrigeration unit.

In one embodiment, a portable transporter system includes a carrier assembly holding fixative and fixation-inhibiting cooling means. The carrier assembly includes a holding chamber containing the fixative and sample. The fixation-inhibiting cooling means is in thermal communication with the fixative/sample container and is operable to reduce a temperature of the fixative from room temperature (e.g., about 20° C. to about 25° C.) to a temperature (e.g., temperature less than about 15° C.). The fixation-inhibiting cooling means can include an activation agent, a cooling agent, a refrigeration unit, or a thermoelectric cooler unit. The portable transporter system can cool the fixative to the desired temperature. Alternatively, the portable transporter system can keep a chilled, pre-cooled liquid at a desired temperature. Thus, the portable transporter system can reduce the temperature of fixative to the pre-soak temperature or maintain the temperature of the fixative already at the pre-soak temperature.

In some embodiments, an apparatus for processing tissue samples includes a container holding reagents, a carrier assembly, and a transport mechanism. The carrier assembly can include a specimen holder and a sensor assembly positioned to determine the state of the tissue sample held by the specimen holder. The transport mechanism can submerge the sensor assembly and the tissue sample held by the specimen holder in the reagents. In one embodiment, the sensor is a temperature measurement sensor. In one embodiment, the apparatus further includes a computing device with instructions, when executed, that cause the apparatus to (a) if diffusion of fixative through the tissue sample at or above a target diffusion level, a fixation process is performed on the tissue sample and (b) if diffusion of fixative through the tissue sample is below a target diffusion level, a diffusion process is performed on the tissue sample. The target diffusion level can be selected based on the tissue protocols to be performed. For example, in some protocols, the fixative can be diffused throughout most of the volume of the tissue sample prior to fixation.

In one embodiment, the portable transporter system can further include a coupler for coupling the data collection device to the carrier assembly together to form a paired tissue sample with data collection.

In one embodiment, the portable transporter system can include an electronic data logger operable to store data for at least one of: sensing presence or insertion of the tissue sample in the specimen container; the time of insertion of the tissue sample data; time of insertion of the tissue sample data in at least one memory; log time and date data of at least one of: insertion in the specimen container of the tissue sample in the standard histology cassette, or receipt of a start time data; start a timer to track time data from at least one of: an insertion time of a the specimen container with the tissue sample therein into the carrier assembly, or receipt of a start timer data signal; determine a time duration data of at least one of: from the log time and date, or from the start of the timer; indicate a time duration data since at least one of: the log time and date, or the start of the timer; indicate data via a display; indicate data via a liquid crystal display (LCD); indicate data via a light emitting diode (LED) display; record a temperature data; record a temperature and time data; record at least one of a temperature or a time of crossing at least one temperature threshold data; record at least one of a temperature or time of temperature excursion data against at least one preprogrammed threshold; record at least one of a temperature or time of temperature excursion against heating or freezing data; record at least one temperature change and a time of the at least one temperature change data; indicate at least one recording; indicate on at least one display the at least one record; monitor temperature excursions data; monitor at least one temperature change, and a time of the at least one temperature change, and log the at least one temperature change and the time data; monitor data of at least one temperature change and time after seal of the carrier assembly, and indicate relative performance of the data against at least one pre-programmed threshold; indicate on at least one display results data of the monitor; store data on at least one memory; store at least one of sensed data; recorded data; monitored data; or calculated data on at least one memory; store date on at least one memory, wherein the data can include at least one of: a sample identifier; an identifier; a radio frequency identifier (RFID); a bar code identifier; QR code identifier; a location; a sensed location; a received location; a global positioning system (GPS) location; a location relative to a Wi-Fi access point; a location relative to a wireless communication network; a wired communication data; a wireless communication data; a direct connection; a local connection; a local area network (LAN); a wide area network (WAN); a remote connection; a Bluetooth network data; a near field communication (NFC) data; a Zigbee protocol-compliant standard wireless communication data; a date and time of a data point; a sensed data point; a port connection; a universal serial bus (USB) port connection; a coupling to a communication device; a coupling to a computing device; a coupling to a portable device; a coupling to a wireless device; a coupling to a personal computer device; a coupling to a smartphone device; a coupling to a tablet device; a coupling to a mobile phone device; or a coupling to a telephony device.

In one embodiment, a timer apparatus is provided which uses diffusion of a colored liquid through an absorbent membrane as a timer to indicate how long the colored liquid has been in contact with the absorbent membrane. Measurements of the time of arrival of the colored liquid front at various points along the length of the absorbent membrane can be used as a rough measurement of the time that a tissue sample has been in fixative. In some embodiments, the timer apparatus is capable of determining the amount of time that the fixative has spent at a particular temperature range. For example, a device for monitoring the time that a tissue sample has spent in room temperature fixative can comprise an absorbent membrane separated from a dye-soaked pad by a dye-impervious film. Once the film is removed, the dye comes into contact with the absorbent membrane and starts to diffuse along its length. The distance that the dye is seen to have diffused down the membrane indicates the length of time since the film was removed. Text and markings on the front of the device can either show the user how long the tissue has been in fixative, or give an indication of the state of the tissue. A similar device can measure the time that a tissue sample has spent at cold (e.g. 0-7° C.) and room temperature. A first colored dye indicates the length of time spent at cold temperature by the same method of diffusion along an absorbent membrane and is initiated by removal of the dye-impervious barrier. When the temperature increases beyond the desired temperature range, the dye should stop diffusing and thus give a record of how long the tissue sample was at 0-7° C. A second colored dye, now mixed with a material which melts at a specific temperature above the cold temperature range (e.g. room temperature), will only diffuse along a separate absorbent membrane when the environment around the tissue sample reaches the specific temperature. Thus one can also monitor the time that the tissue sample was at or above the specific temperature. Since two times are being monitored, there are several possible states for the device to end in, indicating whether the tissue sample was exposed to both cold temperature and a higher temperature for the proper amount of time for ideal fixation. It is also possible for the device to merely report the length of time (in hours) at each temperature. The device for monitoring the time spent in cold and room temperature can include a method to halt the diffusion of the first dye through the absorbent membrane when the temperature increases in order to provide a record of how long the tissue sample spent in the cold temperature. For example, a phase change material is introduced behind the absorbent membrane in contact with the first dye. This phase change material (PCM) will remain solid at cold temperature, but when the ambient temperature increases it will melt. The chemical composition of the PCM, absorbent membrane and first dye should be chosen such that the PCM fouls the absorbent membrane and prevents further diffusion of the first dye. For instance, the PCM could be a paraffin which melts at 18° C., and the first dye could be a mixture of dye, water and glycerol. In that case the hydrophobicity of the paraffin absorbed into the membrane would prevent the aqueous mixture from diffusing further along the absorbent membrane.

In one embodiment, the portable transporter system can include a fixative can prefilled into the specimen container, and can be refrigerated until ready for use.

In one embodiment, the tissue sample, when surgically removed, is marked with a patient identifier.

In one embodiment, the portable transporter system where the patient identifier can include at least one of: a barcode; a wristband; or a radio frequency identifier (RFID).

In one embodiment, the tissue sample is inserted into the standard histology cassette and the standard histology cassette is placed in the carrier assembly, wherein the standard histology cassette has a unique identifier.

In one embodiment, the portable transporter system can include a carrier assembly, wherein the assembly holds a data logger in close proximity, and wherein the data logger logs at least one start time and start temperature reading.

In one embodiment, the data logger logs temperatures continuously during transport to a laboratory.

In one embodiment, the portable transporter system can include, where the data logger logs at least one of a temperature or a time at least one of: continuously; periodically; aperiodically; at least one threshold; at least one temperature threshold; at a time interval; upon a temperature change; according to sensed data; or after a time duration.

In one embodiment, the portable transporter system where upon arrival at the laboratory, time and temperature data is read from the data logger of the transport assembly and verifies integrity of the tissue sample.

A tissue collection system is set forth to preserve volatile phosphomarkers and allow storage/transport for multiple days in conjunction with comprehensive chain-of-custody tracking. An exemplary embodiment can include various exemplary components: a) a spill free and fume reduced handling and insertion of a specimen into an example sample collection container for use with cold or room temperature (RT) fixatives (e.g. formalin of varying concentrations). Additionally a provision to fully submerse the specimen in a fixative, to hold the sample specimen submersed, and to retain fluid contact even in an inverted orientation during transport. Additionally an option to use a standard tissue cassette to receive the sample and hold the cassette such that it is fully submersed in fixative during transport. The cassette is presented in a dry and non-contaminating fashion for sample insertion. b) a comprehensive chain-of-custody tracking IT of histology specimen from point of removal in the operating room (OR) to Histology Lab. c) Embodiments provide for a Custom Tissue Transport Container with reduced exposures to fumes and risk of spills, as well as a cold transport system with data monitoring. d) A method of comprehensively labeling and tracking specimen-ID from the OR to microscope slide using identification schemes such as, e.g., but not limited to, RFID tags, magnetic strips, QR codes, ePens, and barcodes, etc. connected by mobile (and/or static) computer systems is set forth. An improved comprehensive method of using one consistent specimen ID methodology between Patient ID to embedded tissue block, to ID used on microscope slide used for staining, and to imaging, diagnosis, and final report on computer is set forth.

At least some embodiments disclosed herein are transporter systems configured to monitor tissue samples before, during, and/or after fixation. The tissue samples are pre-soaked in fixative contained in a transporter. The tissue samples can be removed from the transporter and processed based on information from a monitoring system. The monitoring system can provide, without limitation, diffusion or saturation information, fixation information, temperature-time information, or other information about the tissue samples. In some procedures, a self-cooling transporter can rapidly reduce the temperature of the fixative to a pre-soaking temperature thereby minimizing or limiting fixation (e.g., cross-linking). The self-cooling transporter can continuously or periodically cool the fixative to keep the fixative at or below the pre-soaking temperature throughout shipping. After fixative has adequately saturated the tissue sample, a fixation process can be performed to fix substantially the entire tissue sample. In some embodiments, the transporter can provide information to the laboratory indicating the diffusion or saturation status. In some embodiments, the self-cooling transporter is operable to reduce a temperature of the fixative to inhibit fixation of a tissue sample during a diffusion process.

At least some embodiments disclosed herein are specimen transporters that can pre-cool a fixative. A tissue sample can be contacted with the pre-cooled fixative, which diffuses through the tissue sample. The specimen transporter can keep the tissue sample, and fixative diffused through the tissue sample, at a relative low temperature to inhibit or prevent fixation. The fixation process can be caused by heating the tissue sample to start or promote cross-linking. In some embodiments, the transporter keeps the tissue sample at the low temperature during transport from a collection site (e.g., an operating room at a hospital) to a processing site (e.g., a pathology laboratory). After receiving the container, the pathology laboratory can perform the fixation process. As such, substantially the entire fixation process can be performed at the pathology laboratory.

In some embodiments, a self-cooling transporter system includes a transport container including a holding chamber, a fixative in the holding chamber, and a cooling device carried by the transport container. The cooling device is in thermal communication with the fixative and is operable to reduce a temperature of the fixative. In one embodiment, the transport container has an open configuration operative to receive the tissue sample and a closed configuration operative to seal the holding chamber. The cooling device has a non-cooling mode and a cooling mode. In one embodiment, the cooling device in the cooling mode reduces a temperature of the fixative at least about 25° C. in less than about 5 minutes. In some embodiments, the pre-soaking and fixation process preserve signals of proteins in the tissue sample significantly, for example, by preserving at least 30%, 50%, 70%, or 90% post-translation modification signals. The tissue fixation methods in accordance with at least some embodiments can significantly halt the enzyme activities degrading proteins, such as halting the enzyme activities of protease.

In some embodiments, a portable transporter system includes a transport container, a fixative, and a fixation-inhibiting cooling device. The transport container includes a holding chamber containing the fixative. The fixation-inhibiting cooling device is carried by the transport container and is in thermal communication with the fixative. The fixation-inhibiting cooling device is operable to reduce a temperature of the fixative to inhibit fixation of a tissue sample contacting the fixative. The portable transporter system can be readily carried (e.g., manually transported) by a person. In a laboratory setting, the portable transporter system can be manually transported between workstations and equipment. In a shipping setting, the portable transporter system can be manually transported to and from a vehicle. The portable transporter can be conFigured to thermally isolate or substance a pre-cool fixative. Additionally or alternatively, the portable transporter can be self-cooling to chill the fixative.

In yet further embodiments, a portable transporter system includes a transport container, a fixative, and a thermal device operable to adjust the temperature of the fixative to inhibit fixation of a tissue sample, promote fixation, or the otherwise thermally process the tissue sample. The portable transporter system can be a handheld system for convenient transport. In some embodiments, the thermal device includes a fixation-inhibiting cooling device configured to reduce a temperature of the fixative to perform a diffusion process. In other embodiments, the thermal device includes a thermoelectric unit and/or refrigeration unit.

In one embodiment, a self-cooling portable transporter system includes a transport container holding fixative and fixation-inhibiting cooling means. The transport container includes a holding chamber containing the fixative. The fixation-inhibiting cooling means is in thermal communication with the fixative and is operable to reduce a temperature of the fixative from room temperature (e.g., about 20° C.-about 25° C.) to a pre-soak temperature (e.g., temperature less than about 5° C.). The fixation-inhibiting cooling means can include an activation agent, a cooling agent, a refrigeration unit, or a thermoelectric cooler unit. The portable transporter system can pre-cool the fixative. Alternatively, the portable transporter system can keep a chilled liquid at a desired temperature. Thus, the portable transporter system can reduce the temperature of fixative to the pre-soak temperature or maintain the temperature of the fixture already at the pre-soak temperature.

In some embodiments, an apparatus for processing tissue samples includes a container holding reagents, a carrier assembly, and a transport mechanism. The carrier assembly can include a specimen holder and a sensor assembly positioned to acoustically analyze the tissue sample held by the specimen holder. The transport mechanism can submerge the sensor assembly and the tissue sample held by the specimen holder in the reagents. In one embodiment, the apparatus further includes a computing device with instructions, when executed, that cause the apparatus to (a) if diffusion of fixative through the tissue sample at or above a target diffusion level, a fixation process is performed on the tissue sample and (b) if diffusion of fixative through the tissue sample is below a target diffusion level, a diffusion process is performed on the tissue sample. The target diffusion level can be selected based on the tissue protocols to be performed. For example, in some protocols, the fixative can be diffused throughout most of the volume of the tissue sample prior to fixation.

In one embodiment, a portable transporter system adapted to carry a tissue sample in a standard histology cassette, the tissue sample contacting a fixative, can include: a transport container can include: a holding chamber; a cassette septum; and a fixative in the holding chamber; and a container lid can include: a cassette clip attachably couplable to receive, hold and retain the standard histology cassette.

In an embodiment, the portable transporter system can further include: fixation-inhibiting cooling device carried by the transport container and in thermal communication with the fixative in the holding chamber, wherein the fixation-inhibiting cooling device is operable to reduce a temperature of the fixative to inhibit fixation of the tissue sample contacting the fixative.

In one embodiment, the portable transporter system can further include a cassette cover removably coupled to the container lid.

In one embodiment, the portable transporter system can include where the cassette cover can include a sterile seal between the cassette cover and the container lid.

In one embodiment, the portable transporter system can include where the fixative can include formalin.

In one embodiment, the portable transporter system can include where the cassette septum is removable with the container lid, the cassette clip, and the standard histology cassette.

In one embodiment, the portable transporter system can include where the removable cassette septum can provide easy access to the standard histology cassette while eliminating splashing of the fixative.

In one embodiment, the portable transporter system can include where the cassette clip is removable couplable to the container lid.

In one embodiment, the portable transporter system can include where the container clip is operable to be screwed into at least one side of the container lid.

In one embodiment, the portable transporter system where the cassette clip is operable to be clipped to the standard histology cassette.

In one embodiment, the portable transporter system can include where the cassette clip includes: a first end operable to be coupled to at least one side of the container lid; and a second end operable to be coupled to the standard histology cassette.

In one embodiment, the portable transporter system can include where the cassette septum can include a breakable membrane.

In one embodiment, the portable transporter system can include where the container lid can further include an arm operable to break the breakable membrane upon insertion of the cassette into the holding chamber of the transport container.

In one embodiment, the portable transporter system can include where the container lid can further include a cylindrical portion, which can include an internal screw thread portion adapted to couple with an external screw thread portion of the transport container, operable to isolate the sample, air and the fixative from a surrounding environment.

In one embodiment, the portable transporter system can further include a data collection device.

In one embodiment, the portable transporter system can further include a coupler for coupling the data collection device to the transport container together to form a paired tissue sample with data collection.

In one embodiment, the portable transporter system can further include a first shipping receptacle portion for receiving a plurality of the paired tissue samples with data collections.

In one embodiment, the portable transporter system can further include a second shipping receptacle portion for receiving the plurality of the paired tissue samples with data collections.

In one embodiment, the portable transporter system can further include at least one fixation-inhibiting cooling device in thermal communication with the fixative in the holding chamber, wherein the fixation-inhibiting cooling device is operable to reduce a temperature of the fixative to inhibit fixation of the tissue sample contacting the fixative.

In one embodiment, the portable transporter system can further include at least one cold transport box operable to receive the first shipping receptacle portion, the plurality of the paired tissue samples with data collections, and the at least one fixation-inhibiting cooling device.

In one embodiment, the portable transporter system wherein the cassette septum can include at least one split.

In one embodiment, the portable transporter system can include where the at least one split of the cassette septum includes at least two splits.

In one embodiment, the portable transporter system where the at least two splits of the cassette septum can include where the at least two splits are perpendicular to one another.

In one embodiment, the portable transporter system can include where the at least two splits of the cassette septum can include wherein the at least two splits are of different length to one another.

In one embodiment, the portable transporter system where the at least one split of the cassette septum can include at least one cross-shaped split.

In one embodiment, the portable transporter system can include where the standard histology cassette holding the tissue sample is operable to maintain the tissue sample submersed in fluid independent of the orientation of the transport container.

In one embodiment, the portable transporter system where the cassette clip can include a clip feature operable to hold and retain the standard histology cassette, where the standard histology cassette is adapted to include a corresponding feature.

In one embodiment, the portable transporter system can further include a carrier feature operable to slideably receive and retain the standard histology cassette therein.

In one embodiment, the portable transporter system can include where the container lid can include at least one side operable to hold an unused cassette upward to avoid contamination with the fixative prior to sample insertion.

In one embodiment, the portable transporter system can include where the container lid can include at least one side operable to seal the fixative fluid inside the holding chamber of the transport container during transport or handling and to avoid spillage and fumes.

In one embodiment, the portable transporter system where the container lid can include: at least one side operable to releasably couple the container lid onto the holding chamber.

In one embodiment, the portable transporter system can include where the at least one side operable to releasably couple the container lid onto the holding chamber couples via matching screw threads.

In one embodiment, the portable transporter system can include where the standard histology cassette is held separately until the tissue sample is collected, and where the container lid is operable to receive the standard histology cassette when the tissue sample is ready for insertion into the holding chamber.

In one embodiment, the portable transporter system can include where the container lid can include: a multi-purpose lid wherein at least one side is operable to at least one of: hold an unused cassette upward to avoid contamination with the fixative prior to sample insertion; seal the fixative fluid inside the holding chamber of the transport container during transport or handling and to avoid spillage and fumes; releasably couple the container lid onto the holding chamber; releasably couple the container lid onto the holding chamber couples via matching screw threads; or receive the cassette when the tissue sample is ready for insertion.

In one embodiment, the portable transporter system, can further include an electronic data logger coupled to the transport container via a pod.

In one embodiment, the portable transporter system can include where the electronic data logger is in thermal communication with the transport container.

In one embodiment, the portable transporter system can include where the electronic data logger is operable to at least one of: sense insertion of the tissue sample in the transport container; determine time of insertion of the tissue sample data; store time of insertion of the tissue sample data in at least one memory; log time and date data of at least one of: insertion in the transport container of the tissue sample in the standard histology cassette, or receipt of a start time data; start a timer to track time data from at least one of: an insertion time of the standard histology cassette with the tissue sample in the transport container, or receipt of a start timer data signal; determine a time duration data of at least one of: from the log time and date, or from the start of the timer; indicate a time duration data since at least one of: the log time and date, or the start of the timer; indicate data via a display; indicate data via a liquid crystal display (LCD); indicate data via a light emitting diode (LED) display; record a temperature data; record a temperature and time data; record at least one of a temperature or a time of crossing at least one temperature threshold data; record at least one of a temperature or time of temperature excursion data against at least one preprogrammed threshold; record at least one of a temperature or time of temperature excursion against heating or freezing data; record at least one temperature change and a time of the at least one temperature change data; indicate at least one recording; indicate on at least one display the at least one record; monitor temperature excursions data; monitor at least one temperature change, and a time of the at least one temperature change, and log the at least one temperature change and the time data; monitor data of at least one temperature change and time after seal of the transport container, and indicate relative performance of the data against at least one pre-programmed threshold; indicate on at least one display results data of the monitor; store data on at least one memory; store at least one of sensed data; recorded data; monitored data; or calculated data on at least one memory; store date on at least one memory, wherein the data can include at least one of: a sample identifier; an identifier; a radio frequency identifier (RF ID); a bar code identifier; QR code identifier; a location; a sensed location; a received location; a global positioning system (GPS) location; a location relative to a Wi-Fi access point; a location relative to a wireless communication network; a wired communication data; a wireless communication data; a direct connection; a local connection; a local area network (LAN); a wide area network (WAN); a remote connection; a Bluetooth network data; a near field communication (NFC) data; a Zigbee protocol-compliant standard wireless communication data; a date and time of a data point; a sensed data point; a port connection; a universal serial bus (USB) port connection; a coupling to a communication device; a coupling to a computing device; a coupling to a portable device; a coupling to a wireless device; a coupling to a personal computer device; a coupling to a smartphone device; a coupling to a tablet device; a coupling to a mobile phone device; or a coupling to a telephony device.

In one embodiment, the portable transporter system can further include a carrier unit integrated with a plurality of the container lids.

In one embodiment, the portable transporter system can include where the integrated carrier unit can include where the plurality of the container lids can include at least four container lids.

In one embodiment, the portable transporter system can further include a protective sheath operable to protect the standard histology cassette against contamination or dust.

In one embodiment, the portable transporter system where the carrier unit can include a plurality of holding chambers shipped with fixative in the plurality of holding chambers, each having one of the container lids.

In one embodiment, the portable transporter system can include where the container clip does not require the standard histology cassette to be removed from the container lid.

In one embodiment, the portable transporter system can include where the container lid is reversible and can be screwed onto the transport container immersing the tissue sample in the fixative.

In one embodiment, the portable transporter system, where it is possible at a glance to see which of the plurality of holding chambers have samples inserted.

In one embodiment, the portable transporter system can include where the fixative can include formalin.

In one embodiment, the portable transporter system can include where each of the container lids is tall enough to receive application of at least one label, code, barcode, or identifier.

In one embodiment, the portable transporter system can include where each the transport container cannot be inadvertently left outside of a fixation-inhibiting cooling device.

In one embodiment, the portable transporter system can include where cassette clip holds the standard histology cassette to ease reading of at least one code on the standard histology cassette.

In one embodiment, the portable transporter system can include where the fixative can be prefilled into the transport container, and can be refrigerated to be ready for use.

In one embodiment, the portable transporter system can include where the tissue sample, when surgically removed is marked with a patient identifier.

In one embodiment, the portable transporter system where the patient identifier can include at least one of: a barcode; a wristband; or a radio frequency identifier (RFID).

In one embodiment, the portable transporter system can include where the tissue sample is inserted into the standard histology cassette, and the standard histology cassette is placed in the transport container, wherein the standard histology cassette has a unique identifier.

In one embodiment, the portable transporter system can include where the transport container is transferred into a pod, wherein the pod holds a data logger in close proximity, and wherein the data logger logs at least one start time and start temperature reading.

In one embodiment, the portable transporter system can include where the pod is inserted into a fixation-inhibiting cooling device.

In one embodiment, the portable transporter system can include where the fixation-inhibiting cooling device can ensure the tissue sample is kept at 4° C. during transport.

In one embodiment, the portable transporter system can include where the data logger logs temperatures continuously during transport to a laboratory.

In one embodiment, the portable transporter system can include, where the data logger logs at least one of a temperature or a time at least one of: continuously; periodically; aperiodically; at at least one threshold; at at least one temperature threshold; at a time interval; upon a temperature change; according to sensed data; or after a time duration.

In one embodiment, the portable transporter system where upon arrival at the laboratory, time and temperature data is read from the data logger of the pod of the transport container and verifies integrity of the tissue sample.

In one embodiment, the portable transporter system can include where the tissue sample is stored in cold storage if additional cold storage time is determined to be required.

In one embodiment, the portable transporter system can include, where the tissue sample is reviewed and at least one of transferred or kept in a final code identified standard histology cassette.

In one embodiment, the portable transporter system can include, where the tissue sample is processed using a standard heated fixative processor, and with subsequent processing steps.

In one embodiment, the portable transporter system can include wherein the standard heated fixative processor processing the tissue sample for 2 hours at 45° C. temperature.

In one embodiment, the portable transporter system can include wherein the subsequent processing steps can include at least one of an alcohol processing step, a xylene processing step, or a paraffin processing step.

In one embodiment, the portable transporter system can include where the tissue sample is embedded, sectioned, and stained.

In one embodiment, the portable transporter system can include where the tissue sample is stained with various markers or probes.

In one embodiment, the portable transporter system can include where the stain results are made available for at least one of: review by a pathologist, receipt of at least one score by a pathologist; or report results for the tissue sample to at least one clinical database.

In one embodiment, the portable transporter system can further include where electronic data is collected.

In one embodiment, the portable transporter system can include where the electronic data can be collected by at least one of: an electronic pen; a unique identifier; a tablet device; a wireless identifier; a Wi-Fi media access control (MAC) address; a static computing device; a mobile computing device; a barcode scanner; an external data temperature logger; a portable fixation-inhibiting cooling device can include intelligence; a portable fixation-inhibiting cooling device can include an electronic datalogger for collecting temperature and time data;

In one embodiment, the portable transporter system can include where a fixation-inhibiting cooling element is precharged over night for next day surgery.

In one embodiment, the portable transporter system can include where the transport container can be kept pre-cooled in a refrigerator.

In one embodiment, the portable transporter system can include where a fixation-inhibiting cooling device is configured prior to surgery, is transported to surgery location, and keeps reagents cold.

In one embodiment, the portable transporter system can include where transportation of the portable transporter system is performed at an end of a surgery day.

In one embodiment, the portable transporter system can include where a fixation processor is operable to at least one of: collect transport data; perform final fixation steps required; or provide a comprehensive fixation quality report for each of the tissue samples.

In one embodiment, the portable transporter system can include where the electronic data is collected by an electronic pen, and collection can include processing of data of the tissue sample can include at least one of: establish chain-of-custody during the tissue sample collection, integrate data can include at least one of: patient-ID, location of surgery, day/time, name of surgeon, or location of removal of the tissue sample; associate with a designated of the transport container and cassette identifier (ID); record insertion time of the tissue sample into the transport container; log transport conditions can include at least one temperature or time profile; document a total time of cold diffusion after which the sample can be safely removed and submitted to a heated fixative step for crosslinking; duplicate capture of handwritten Lab Requisition Form by electronic data capture and associate data to a specific specimen of the tissue sample or the standard histology cassette via identifier can include at least one of a barcode or radio-frequency identifier (RFID); verify a minimum fixation condition; or enable data capture for a clinical trial.

In one embodiment, the portable transporter system can include where the electronic data is collected by an electronic pen (ePen) can include at least one of: use ePen to fill out lab requisition form; collect electronic data; collect identifier information from patient, the transport container, the standard histology cassette; transfer electronic data to a computing device for verification or correction; upload verified electronic data via communications network if possible; if upload not possible, ePen travels with the tissue sample in fixation-inhibited cooling device; receive at accessioning stage in histology lab for display and report to the LIS; optionally enter any corrections, if required; or provide readout of datalogger, or integrate into data uploaded to the LIS.

In one embodiment, the portable transporter system can include where the electronic data is collected by a unique identifier.

In one embodiment, the portable transporter system can include, wherein the unique identifier can include at least one of: an Anoto code printed onto a label of a container; a barcode on the cassette could be a vantage compatible preprinted code being inserted into the container; a barcode on the cassette identifiable by a barcode reader when the container arrives at accessioning stage, wherein the barcode reader is tied to patient-ID associated to a code of the container; or a unique label with Anoto pattern on the container, wherein the container is picked randomly, pen ties code electronically to patient-ID, and handwritten link and an identifier to be copied from a label of the container onto paper.

In one embodiment, the portable transporter system can include where the electronic data is collected by a tablet device coupled to the portable transporter system by at least one of wired or wireless communication, and collection can include processing of data of the tissue sample can include at least one of: establish chain-of-custody during the tissue sample collection, integrate data can include at least one of: patient-ID, location of surgery, day/time, name of surgeon, or location of removal of the tissue sample; associate with a designated of the transport container and cassette identifier (ID); record insertion time of the tissue sample into the transport container; log transport conditions can include at least one temperature or time profile; document a total time of cold diffusion after which the sample can be safely removed and submitted to a heated fixative step for crosslinking; duplicate capture of handwritten Lab Requisition Form by electronic data capture and associate data to a specific specimen of the tissue sample or the standard histology cassette via identifier can include at least one of: a barcode; or radio-frequency identifier (RFID); data capture via at least one of: camera; RFID; or near field communication (NFC) tag via communication interface; capture of image of surgical site; verify a minimum fixation condition; or enable data capture for a clinical trial.

In one embodiment, the portable transporter system can include where the electronic data is collected by the tablet can include at least one of: capture pertinent information about patient and study on the tablet; capture duplicate entry of lab requisition form on the tablet; optionally correct any data entry errors on screen, if needed; optionally upload verified electronic data via wireless communication to LIS; provide tablet accompanying the tissue sample in same cooling and shipping box; receive at the accessioning stage in histology lab the tablet for display or report to the LIS; or provide readout of datalogger, or integrate into data uploaded to the LIS.

In one embodiment, the portable transporter system can include wherein the electronic data is collected by a wireless identifier.

In one embodiment, the portable transporter system can include where the electronic data is collected by the wireless identifier can include at least one of: a wireless fidelity (Wi-Fi) media access control (MAC) address.

In one embodiment, the portable transporter system can include where the electronic data is collected by the Wi-Fi MAC address and wherein a device having the Wi-Fi MAC address can include at least one of: a datalogger and positional time stamper operable to track the tissue sample; any time a Wi-Fi router or device with the MAC address communicate, identity of both the router and the device are logged; or since time of contact is known and location of a Wi-Fi router is known, a location of a device with the MAC address is recorded over the journey of the MAC device via a network of free-access Wi-Fi routers.

In one embodiment, the portable transporter system can include wherein the electronic data is collected by a static computing device, and collection can include processing of data of the tissue sample can include at least one of: establish chain-of-custody during the tissue sample collection, integrate data can include at least one of: patient-ID, location of surgery, day/time, name of surgeon, or location of removal of the tissue sample; associate with a designated of the transport container and cassette identifier (ID); record insertion time of the tissue sample into the transport container; log transport conditions can include at least one temperature or time profile; document a total time of cold diffusion after which the sample can be safely removed and submitted to a heated fixative step for crosslinking; duplicate capture of handwritten Lab Requisition Form by electronic data capture and associate data to a specific specimen of the tissue sample or the standard histology cassette via identifier can include at least one of: a barcode; or radio-frequency identifier (RFID); data capture via at least one of: camera; RFID; or near field communication (NFC) tag via communication interface; capture of image of surgical site; verify a minimum fixation condition; or enable data capture for a clinical trial.

In one embodiment, the portable transporter system can include where the electronic data is collected by the static computing device, can include at least one of: capture pertinent information about patient and study; capture duplicate entry of lab requisition form; optionally correct any data entry errors on screen, if needed; optionally upload verified electronic data via communication network to LIS; if LIS connectivity is prohibited, optionally program data logger to retain additional information on computer locally; receive at the accessioning stage in histology lab identifier information to reference the tissue sample via LIS query for display or report to the LIS; or provide readout of datalogger, or integrate into data uploaded to the LIS.

In one embodiment, the portable transporter system can include where the electronic data is collected by a travelling cooling shipping box with intelligence, and collection can include processing of data of the tissue sample can include at least one of: establish chain-of-custody during the tissue sample collection, integrate data can include at least one of: patient-ID, location of surgery, day/time, name of surgeon, or location of removal of the tissue sample; associate with a designated of the transport container and cassette identifier (ID); record insertion time of the tissue sample into the transport container; log transport conditions can include at least one temperature or time profile; document a total time of cold diffusion after which the sample can be safely removed and submitted to a heated fixative step for crosslinking; duplicate capture of handwritten Lab Requisition Form by electronic data capture and associate data to a specific specimen of the tissue sample or the standard histology cassette via identifier can include at least one of: a barcode; or radio-frequency identifier (RFID); data capture via at least one of: camera; RFID; or near field communication (NFC) tag via communication interface; capture of image of surgical site; verify a minimum fixation condition; or enable data capture for a clinical trial.

In one embodiment, the portable transporter system can include where the electronic data is collected by the travelling cooling shipping box with the intelligence, can include at least one of: capture pertinent information about patient and study; capture duplicate entry of lab requisition form; optionally interface computer with a host computer in the travelling cooling shipping box to store data; optionally monitor loading or unloading of the tissue sample by the host computer in the travelling cooling shipping box, and log time and temperature; optionally correct any data entry errors on screen, if needed; or at the accessioning stage in histology lab, the host computer provides electronic data collected.

In one embodiment, the portable transporter system can include where the transport of the tissue sample can include a cooling box configured to at least one of: pre-charge over night for a next day surgery; pre-cool in fridge the container; prior to surgery transport to surgery location and maintain in cold temperature reagents; or initiate shipping at end of surgery day.

In one embodiment, the portable transporter system can include where the cooling box is maintained at about 4° C.

In one embodiment, a portable transporter system adapted to carry a tissue sample contacting a fixative, can include: a transport container can include: a holding chamber; and a fixative; and a container lid can include: a cassette holder operable to be coupled to the standard histology cassette and can include a first seal; and a cassette receiver operable to be releasably coupled to the transport container and can include a second seal, where the cassette holder and the cassette receiver are operable to be attachably coupled to one another upon insertion of the standard histology cassette coupled to the cassette holder into the cassette receiver.

In one embodiment, the portable transporter system can include, wherein the cassette holder and the cassette receiver are operable to be attachably coupled to one another via at least one male snap clip and at least one female snap clip receiver.

In one embodiment, the portable transporter system can include where the at least one male snap clip is on a bottom portion of the cassette holder, and the at least one female snap clip receiver is on an upper portion of the cassette receiver.

In one embodiment, the portable transporter system can include where the at least one male snap clip can include a plurality of the at least one male snap clips.

In one embodiment, the portable transporter system can include where the plurality of the male snap clips can include at least four snap clips.

In one embodiment, the portable transporter system can include where the first and second seals comprise solvent compatible o-rings.

In one embodiment, the portable transporter system can include where the fixative has a fixative volume can include: a holding chamber volume of the holding chamber less a cassette volume of a standard histology cassette.

In one embodiment, a portable transporter system adapted to carry a tissue contacting a fixative, can include a transport container can include: a holding chamber; and a container lid operable to be releasably coupled to the transport container, the container lid can include: a built-in septum can include a molded boss can include an external thread; and a standard sealing screw-top can include an inner thread matching the external thread of the molded boss, the screw-top operable to cover the built-in septum.

In one embodiment, the portable transporter system can further include where a syringe can include a pre-filled amount of fixative, and operable to be refrigerated until used to fill the holding chamber with the fixative, via the built-in septum, after the tissue sample is placed inside the holding chamber.

In one embodiment, the portable transporter system can include where the fixative can include formalin.

In one embodiment, the portable transporter system can further include where the a cassette clip attachably couplable to receive, hold and retain the standard histology cassette.

BRIEF DESCRIPTION OF THE DRAWINGS

Non-limiting and non-exhaustive embodiments are described with reference to the following drawings. The same reference numerals refer to like parts or acts throughout the various views, unless otherwise specified.

FIGS. 9A and 9B show another exemplary carrier assembly data loggers.

FIGS. 31A-31C are individual components of a cassette holder, cassette receiver, and fixative vial.

FIGS. 32A and 32B illustrate a user receiving the cassette holder, and the cassette receiver/vial assembly, respectively.

FIGS. 33A, 33B, 33C, and 33D illustrate a process of attaching the cassette to the cassette holder; piercing a septum of the cassette receiver/vial assembly; completely sealing a vial, ready for transport; and having the receiving lab unscrew the cassette holder/receiver assembly and removing the cassette, respectively.

FIGS. 34C and 34D illustrate a continuation of the first state of FIGS. 34A and 34B with the sample container lid of FIG. 34A affixed to the protective cylinder, with the fixative container of FIG. 34B still isolated.

FIG. 34E illustrates a transition to a second state, by screwing the sample container around the fixative container, isolating the sample from the environment, with the fixative still isolated prior to the arm breaking the membrane.

FIGS. 35A-35I is an exemplary fume reduction feature explained, with an exemplary cassette cover in an exemplary dry implementation.

FIGS. 36A-36I is an exemplary preanalytical workflow.

FIGS. 37-44E illustrate example specimen vials, lids, clips, and cassettes, of various example embodiments.

FIG. 37 is an exemplary exploded view of an exemplary tissue pot with lid, and exemplary 10% NBF.

FIG. 38 is an exemplary exploded view of an exemplary tissue pot with lid, and exemplary 30% NBF.

FIGS. 44A-44E are various views of an exemplary cell transport seal block, which resembles a straight screw head, including an exemplary slotted cassette clip of one embodiment, as can be used in the process set forth in FIGS. 35A-35I.

FIGS. 45A-45C are digital images of a transport device that is especially configured for an autonomous warming embodiment.

FIGS. 46A-46C demonstrate the results of an experiment with an autonomous heating device as depicted herein stored at a variety of ambient temperatures. FIG. 46A is a graph of the temperature of the sample container under various ambient temperature conditions. FIG. 46B is a series of digital images of tissues immunohistochemically stained for pAkt after the experiments. FIG. 46C is a bar graph of the relative stain intensity from tissues immunohistochemically stained for pAkt.

FIGS. 47A-47D illustrate exemplary embodiments of a simple timer useful with the present invention.

DETAILED DESCRIPTION OF THE INVENTION

Figure 1:
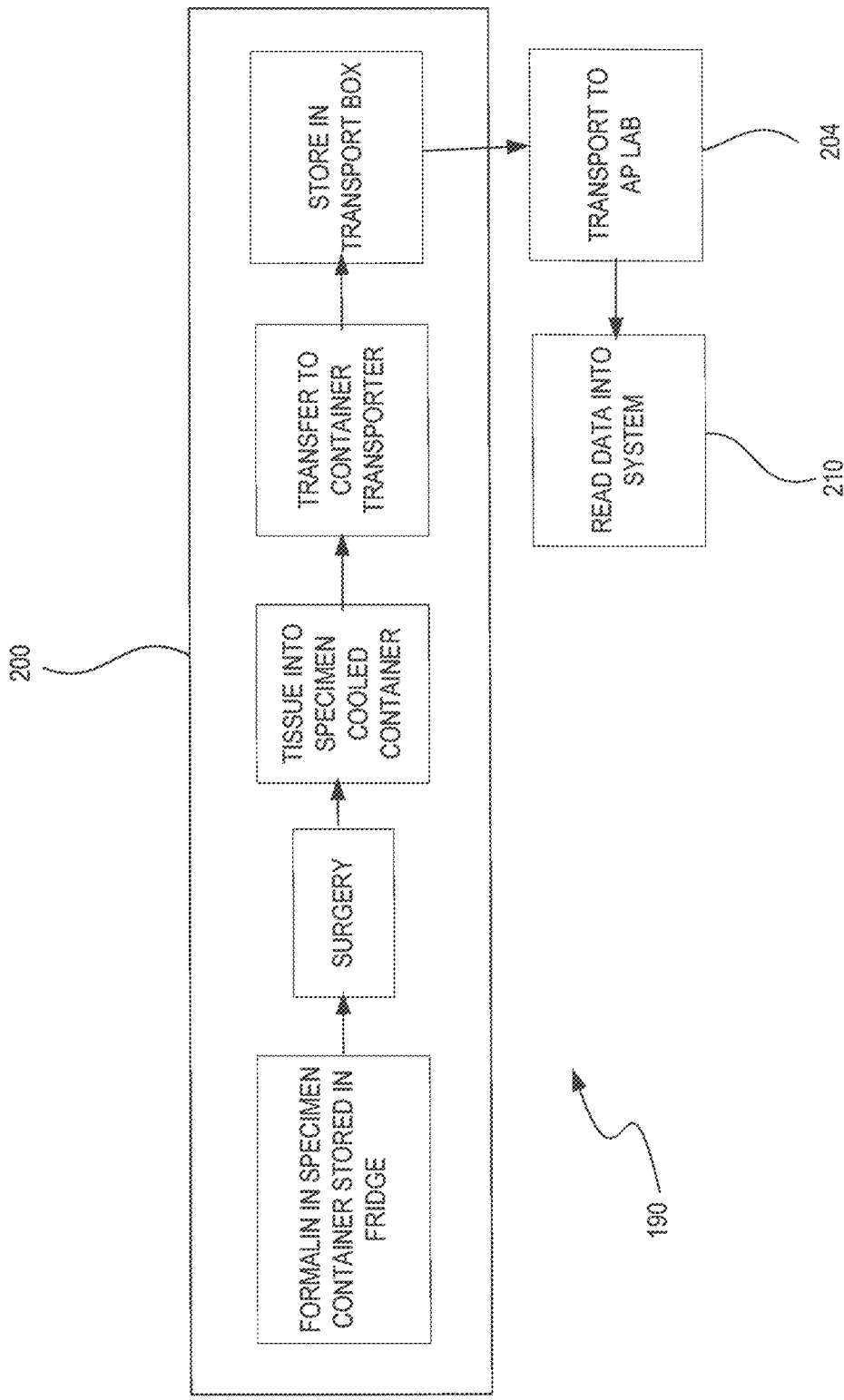
FIG. 1 is a workflow for processing a tissue sample from a collection site to a processing site in accordance with one embodiment.

Formalin fixation is a mainstay of histopathologic analysis, yet the practice is poorly standardized and a significant potential source of pre-analytical errors. Concerns of workflow and turnaround time drive development of shorter protocols, but abbreviated protocols lead to poor histomorphology or inadequate downstream assay results. Additionally, immunohistochemistry assays for phosphorylated epitopes or other biomarkers have been challenging in the context of formalin fixed tissue. Standardized fixation parameters issued for clinical biomarker assays to mitigate the errors from pre-analytical variation, such as the ASCO/CAP guidelines for HER2 IHC, call for fixation in neutral buffered formalin for 6 hours to 72 hours. We studied basic formalin biochemistry to develop a formalin fixation protocol that involves a pre-incubation in sub-ambient temperature formalin prior to a brief exposure to heated formalin. This protocol is more rapid than standard protocols yet preserves histomorphology and biomarkers such as phosphorylated proteins, mRNA, and miRNA, for example. We have determined that biomarker preservation for extended times is compatible with possible tissue transport solutions.

Commonly owned patent application US 2012/0214195 A1 discloses a two-temperature, rapid formalin fixation protocol that reduces fixation time and is optimized for use across a broad range of tissue types through better preservation of histomolecular features. The two-temperature process involves soaking the tissue specimen in precooled formalin for up to five minutes and then letting the sample soak for two hours at 4° C., and another two hours at 45° C., according to an exemplary embodiment. This can be generally performed on standard laboratory equipment such as an ice bucket or heating plate, in an exemplary embodiment. Finally, dehydration, clearing, paraffinization, embedding and sectioning are generally performed in an automatic standalone tissue processor (such as, e.g., but not limited to, Leica, Sakura, Avantik, etc.), according to an exemplary embodiment.

The inventors have devised an integrated specimen collection and transport solution that ensures specimens are optimized for subsequent staining and analysis using a cold packing method that can include the first half of the two-temp fixation process, according to an exemplary embodiment. By the time the pack is opened at the anatomical pathology (destination) laboratory, the specimen has been properly fixed at the appropriate cold temperature, according to an exemplary embodiment. The specimen can then be heated up, using, e.g., but not limited to, standard laboratory equipment or specialized Ventana hardware, etc., for the requisite two hours, and can be subsequently ready for tissue processing, according to an exemplary embodiment.

The integrated system can also provide digital tracking, in the form of specimen temperature and time recording that can enable pathology professionals to monitor conditions that may affect subsequent processing or analysis, according to an exemplary embodiment. The system is designed for use with either paper-based laboratory request forms, or a digital e-LRF pen that accompanies the specimen throughout its journey and allows for paperless routing, as well as enhanced specimen tracking that can be synced to wireless devices or uploaded for cloud computing, according to an exemplary embodiment.

Some of the problems with conventional best-practice histology sample, collection, and transport methodologies include the following:

Current room-temperature fixation protocols do not preserve biomarkers sufficiently.

Tissue storage after removal is not sufficiently standardized with respect to biomarker preservation; this can result in some specimens even being left without formalin over the weekend in a refrigerator. The lack of rigid adherence to set protocols across institutions and sites often results in widely varying degrees of histomolecular degradation. This compromises downstream processing, especially in samples subjected to a variety of biomarker-based diagnostics.

Fixative fluid spills as a result of inversion or jostling.

Variations in ambient temperature during transport, which has been known to affect efficacy of fixative.

Operator exposure to caustic materials and fumes during handling.

Exemplary problems with conventional standardized tracking methodologies include:

General best-practices may vary intra- and inter-institutionally in spite of barcode labeling.

Current methodologies rely heavily on paper and individualized computer input which may also vary from institution to institution; chain of custody is established through a series of signatures.

Real-time tracking of the computer specimen is paper-based and cannot provide an up-to-the-minute accounting of temperature, location and transport time.

The end result of these challenges is questionable sample quality and biomarker preservation may not correctly reflect the original state of the tissue and lack of traceability during processing. These are unacceptable risks when dealing with oncology patients.

We have devised an integrated specimen collection and transport solution using a cold storage/transport method comprising: (a) a sample container assembly for holding sealing the tissue sample in an enclosed environment while immersed in a cold formalin-based fixative solution (preferably at a temperature in the range of 0° C. to 7° C.); (b) a temperature-responsive element capable of tracking and recording the temperature of formalin-based fixative solution disposed in the sample container over a period of time; and (c) a case comprising a cavity defined by a material comprising an insulator and/or a cooling element. The sample container is inserted into the cavity of the case. Sufficient insulator and/or cooling element is provided such that the temperature of the formalin-based fixative solution is held at a temperature in the range of 0° C. to 10° C. (preferably from 0° C. to 7° C.) for at least 2 hours at ambient temperature (i.e. from 15 to 40° C.). The temperature responsive element is positioned such that it records one or more of the following data points the temperature of the formalin-based fixative solution over a period of time;

the amount of time that the formalin-based fixative solution is below and/or above a predetermined temperature;

Optionally, a time may be provided that records the amount of time that the tissue sample has been exposed to the formalin-based fixative solution. Other monitors may be provided to record data including: exposure of the device or system to an impact; opening of the device during shipment and/or storage; leakage or loss of the formalin-based fixative solution; and/or time of flight of acoustic waves through the tissue sample as a measure of diffusion of fixative.

As used herein, the term "temperature-responsive element" or "temperature-responsive assembly" shall include any device, apparatus, chemical, or other element that can track and record a temperature of a medium. Examples include thermometers, infrared temperature sensors, phase change materials (such as the WARMMARK time-temperature tag).

In some embodiments, the system uses prefilled specimen containers stored at reduced temperatures, a transport box with or without cold elements and a data logger for sample quality checking. Tissue samples can also be pre-soaked by submerging them in pre-cooled fixative. The pre-soaking process can occur while the tissue samples are transported to reduce overall processing times and to enable fast and accurate medical diagnosis. The pre-soaking process can be monitored with various types of sensors, monitors and data loggers to obtain information about the pre-soaking process or other information used for subsequent tissue processing, such as a histological processing (e.g., fixing, embedding, dehydrating, infiltrating, embedding, sectioning, and/or staining). The information obtained from the sensors/monitors in the data logger about the pre-soaking process can be used to determine, for example, (1) diffusion status of tissue samples, (2) target temperatures for fixation, (3) tissue processing times (e.g., when to remove the tissue samples from fixatives). After fixing the tissue sample, the tissue sample can be removed from the fixative and can be subjected to one or more histological processes performed based, at least in part, on information obtained from the monitoring.

To minimize or limit fixation during shipping of the tissue sample (e.g., shipping from a collection site to a processing site), the pre-cooled fixative can be at a pre-soaking temperature for a pre-soak period of time. The pre-soak process can involve diffusion of cold fixative throughout substantially the entire thickness or cross section of the tissue sample. After desired diffusion is achieved, the tissue sample can be heated to a fixation temperature that is higher than the pre-soak temperature to start and/or promote cross-linking. By inhibiting or preventing fixation during transport, the fixation process can be performed at the processing site to accurately control the fixation process. If the fixative is formaldehyde, cross-linking can occur between formaldehyde molecules and amine containing cellular molecules without significantly compromising the tissue characteristics (e.g., antigenicity, morphology, or both).

For processing a tissue sample in accordance with one embodiment. Generally, tissue samples are monitored from sample collection through processing. Collected information can be used to perform subsequent histology processing and to generate reports (e.g., reports used for diagnosis, patient monitoring, billing, etc.), an audit trail (e.g., an audit trail of specimen handling steps), a processing parameter log (e.g., a log that could be printed and as a quality record at the end of the processing), or the like.

Initially a tissue sample is taken from a subject and can be one or more sections of tissue, an organ, a tumor section, a smear, a frozen section, cytology prep, or cell lines. An incisional biopsy, a core biopsy, an excisional biopsy, a needle aspiration biopsy, a core needle biopsy, a stereotactic biopsy, an open biopsy, or a surgical biopsy can be used to obtain the sample. In some embodiments, the tissue sample can contain genomic DNA, RNA (including mRNA & miRNA), protein, phosphorylated protein or combinations thereof. Example tissue samples include, but are not limited to tissue biopsy, pap cytological material, surgical specimen, amniocentesis samples and autopsy material. In one example, a sample includes a biopsy of an adenocarcinoma, a sample of noncancerous tissue, and a sample of normal tissue (from a subject not afflicted with a known disease or disorder).

The tissue sample is then placed in a transporter system with a media. A freshly removed tissue sample can be pre-soaked by placing the tissue sample in fixative within an appropriate amount of time to prevent or limit an appreciable amount of degradation (e.g., ischemia). In some embodiments, the tissue sample is taken from a subject and placed in the fixative within a relatively short amount of time, for example, less than about 1 minute, 2 minutes, 5 minutes, 30 minutes, 1 hour, 2 hours, or the like. In some embodiments, the fixative can be pre-chilled/pre-cooled to a temperature below room temperature down to about 0° C. The tissue sample can be placed into an open specimen container containing the pre-cooled liquid fixative. Alternatively the tissue sample can be placed in a tissue cassette such as those known in the art. The tissue cassette can then be placed in the specimen container to submerse the tissue in the pre-cooled liquid fixative. The composition and temperature of the fixative can be selected to achieve a desired rate of diffusion and/or cross-linking. The fixative can be formalin solutions of formaldehyde in water used for preservation of biological specimens. If formalin used as a fixative it is typically 10% NBF, but other solution concentrations (e.g., 10%-80% NBF) also can be used. The tissue sample can remain immersed in the fixative while it is conveniently transported to another location.

Exemplary transporter systems can include, but are not limited to, packaging, a bottle, a vial, or other object used to hold liquid media and at least one tissue sample. The transporter systems can include machine-readable code (e.g., optical symbology, magnetic pattern or electromagnetic, or electrostatic signal having information content) that may relate to sample identity, patient information, sample origin, sample chain of custody, instructions for processing samples, information regarding the characteristics of samples, test results for samples, images of samples, or other information associated with the tissue sample.

The fixative can be at a pre-soak temperature (or "diffusion temperature") to allow diffusion of the fixative while inhibiting fixation. The pre-soak temperature can be about 0° C. to about 15° C., about 4° C. to an upper temperature about 10° C. or from about 3° C. to about 5° C. For some procedures, the pre-soak temperature can be about 4° C. Although some fixing (e.g., cross-linking) may occur during the pre-soaking process, the fixing primarily occurs after the pre-soaking process (i.e., during the fixation process). The pre-soaking process can balance the beneficial properties associated with substantially complete diffusion while minimizing or limiting the effects associated with initializing or promoting cross-linking and preventing ischemia. In some embodiments, the rate of diffusion of the fixative is be maximized while limiting and minimizing any deleterious effects associated with increased cross-linking rate. In other embodiments, the transporter system can include room temperature fixative that is quickly chilled to inhibit ischemia and cross-linking while promoting fixative diffusion into the sample.

The transporter system can be transported to an onsite laboratory or an offsite site laboratory while the fixative diffuses through the tissue sample. The fixative can be kept at or below the pre-soak temperature, thereby allowing for a wide range of delivery times without significantly impacting the state of the tissue specimen. In some procedures, the fixative is formalin with a target transport period of time in a range of about 15 minutes to 72 hours or longer, e.g. 14 days. If the sample arrives at the processing site before completion of the target pre-soak period of time, the tissue sample can be left in the fixative to complete the diffusion process. Alternatively, the tissue specimens can be removed from the transporter system and the pre-soaking process can be completed with another fixative.

Once at the laboratory the tissue sample can either be evaluated to determine whether the fixative has adequately infused the sample tissue of the data compiled from the monitoring system can by analyzed to determine the diffusion. After desired diffusion is achieved, the fixation process can be performed by, for example, heating the tissue sample to a fixation temperature to start and/or promote cross-linking if the rate of cross-linking is temperature dependent. In some procedures, the tissue sample can be removed from the transporter system and delivered to a processing apparatus/system that can perform a fixation process by immersing the tissue sample in warm fixative. If the fixative is formaldehyde, the temperature of the warm formalin can be greater than the ambient temperature and up to at least 55° C., more typically from about 35° C. to about 45° C., as this temperature range may increase the cross-linking kinetics sufficiently to allow relatively quick tissue cross-linking. However, if the temperature is increased above about 50° C., the tissue sample may begin to degrade, which may have a deleterious effect on certain subsequent histological reactions. Thus, the upper temperature and time period of the fixation process can be selected to allow subsequent imaging processes, such as in situ hybridization, IHC, and/or hematoxylin and eosin (H&E) processing. The time period for the fixation process can range from greater than about 15 minutes up to at least about 5 hours, more typically is at least about 1 hour to about 4 hours, and more typically is from about 2 hours to about 3 hours. In certain embodiments, the fixation process can be performed for about 1.5 hour at a temperature of about 45° C. The pre-soak fixative and the cross-linking fixative can be the same or different. As yet another example, entirely different aldehyde fixatives, such as formaldehyde and glutaraldehyde, can be used for the pre-soak process and fixation processes. Additionally, instead of removing the sample from the fixative, the pre-soak fixative can be heated to cause cross-linking. As such, the tissue sample can remain immersed in the same fixative throughout the pre-soak and fixation processes.

Various factors may be considered to determine pre-soaking and fixation processing. These factors can include: sample thickness, which typically ranges from about 1 mm to about 10 mm thick, more typically from about 2 mm to about 8 mm thick, and even more typically from about 4 mm to about 6 mm thick; volume of fixative to tissue sample mass, which typically is from about 10:1 to about 50:1 volume to mass; fixative composition; temperature; and sample immersion time in the fixative. Processing times, fixation history, condition history, tissue characteristics, or other histology information can be used to adjust processing to ensure proper tissue processing.

FIG. 1 is a workflow 190 for tracking tissue samples from a collection site to a processing site. At 200, a tissue sample can be taken from a subject at an operating room and loaded into a specimen container. The specimen container can be assigned identification information and loaded into shipping container, such as a transporter system. At 204, the tissue sample is shipped from the collection site to the processing site (such as an onsite or offsite pathology lab) by, for example, a courier or a runner. The transport time can be less than 24 hours or as much as 14 days. At 206, information (e.g., temperature condition, temperature versus time information, diffusion state, etc.) from a monitoring system of the transporter system can be used to determine an appropriate fixation protocol. The tissue sample can be fixed, and the fixed tissue sample can be processed using standard tissue processing techniques.

Figure 2:
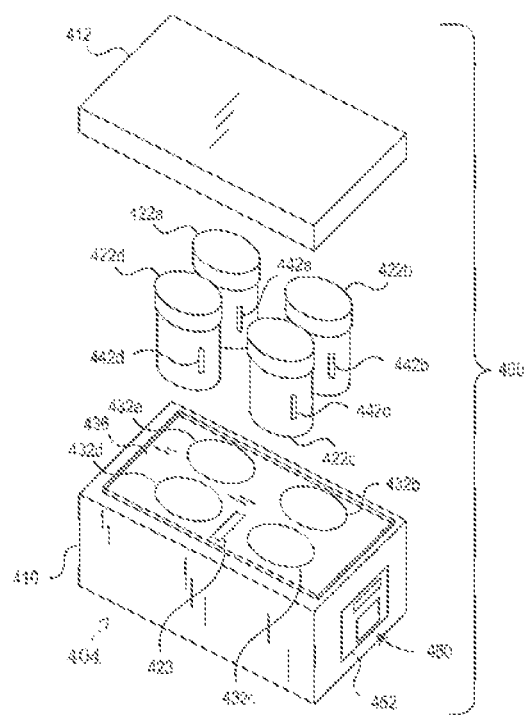
FIG. 2 is an exploded isometric view of a transport system in accordance with one embodiment.

FIG. 2 is an exploded isometric view of a transporter system 400. The transporter system 400 includes a transporter container 404 having a main body 410 and a closure 412. The closure 412 can be separated from the main body 410 to access the specimen containers 422 (individually 422a, 422b, 422c, 422d). Referring to FIG. 2, specimen containers 422 can be similar one another and, thus, the description of one specimen container applies equally to the others. The specimen containers 422 can be bottles, vials, pots, or other types of containers made of plastic, glass, or other material suitable for contacting fixatives. One example of such a container can be CELLSTOR POT available from CellPath Ltd. (Newtown, Powys, UK) another BIOPSAFE is available from Axlab Innovation A/S (Vedbæk, Denmark). Other types of specimen containers can also be used. The specimen containers 422a, 422b, 422c, 422d can be held in receptacles 432a, 432b, 432c, 432d of a tray 436. The tray 436 can be a solid metal tray with a relatively high thermal mass capable of absorbing significant amounts of heat. The tray 436 can be cooled in a freezer unit and placed into the main body 410, which can be at room temperature. The containers 422 can be inserted the tray 436, which absorbs heat from the containers 422 and their contents. Alternatively, the rack 436 can be made, in whole or in part, of one or more thermally isolating materials, such as open-cell foam or closed cell foam, to further increase storage time of the pre-cooled specimen containers 422. Additionally, thermally isolating materials may provide anti-freeze protection for the sample in adverse transport conditions (e.g., during cold winter conditions). The temperature strip 423 can be used to monitor the temperature of the tray 436.

A monitoring system can obtain and store information about the tissue samples in the respective specimen containers 422 and includes detection devices 442 (individually 442a, 442b, 442c, 442d) and a controller 450. In some embodiments, the detection devices 442 include radio-frequency identification (RFID) tags with a small metallic antenna and a silicon chip, and can be active or passive. The information content of an RFID tag can be fixed or changeable. The RFID tags can communication information to the communication device 452. Additionally or alternatively, the detection devices 442 can include sensing elements (e.g., temperature sensor that measure the measure a temperature of the tissue sample) or can be in communication with sensing devices carried by the containers 422. The communication device 452 can be in the form of an RFID code reader, which are well known in the art and typically include an antenna and a transceiver that receives information from the RFID tag. Because the communication device 452 is physically coupled to the container 410, the communication device 452 can remain in communication with the tag throughout shipping.

Monitoring system can also comprise real time monitoring of the movement of the fixative through the tissue sample. The composition of the fixative may be selected to enhance monitoring. For example, NBF has a relatively high bulk modulus compared to interstitial fluid. The sound transmissibility of the fixative is related to its bulk modulus ( ) and density ( ) according to the speed equation, speed of sound in fixative=. The fixative, such as formalin, with a bulk modulus greater than interstitial fluid can significantly alter the TOF as it displaces the interstitial fluid.

A TOF acquisition scheme may be used to monitor tissue samples. The TOF acquisition scheme may include an A/D conversion scheme (e.g., about 1 μsec phase comparison) to obtain a large number of phase comparisons to provide generally real-time monitoring. The phase comparisons may be performed at the same frequency and phase relationship, and the temperature of the fixative and/or tissue sample can remain generally constant to increase signal to noise ratios. Because fluctuations in temperature may cause measurable changes in TOF, the TOF acquisition scheme can compensate for changes in TOF attributable to, for example, temperature changes.

In addition to acoustic monitoring the monitoring system can additionally be comprised of one or more sensors selected to, among other capabilities, determine, monitor or store data about: the temperature of the container and/or sample; elapsed time; environmental temperature in the transporter; ambient light to determine if the carrier assembly and sample container are in or outside the transporter; infrared proximity (determine if specimen or a cassette containing the specimen is in the specimen container or the container is in the carrier assembly, etc.); accelerometer to records impact or inversion; leaks or fluid loss; or any other type of sensors or sensor arrays. Additionally, one or more sensors may be configured to transmit data, such as temperature, for example, while being submerged in the reagent in the specimen holder in the reagents.

Figure 3:
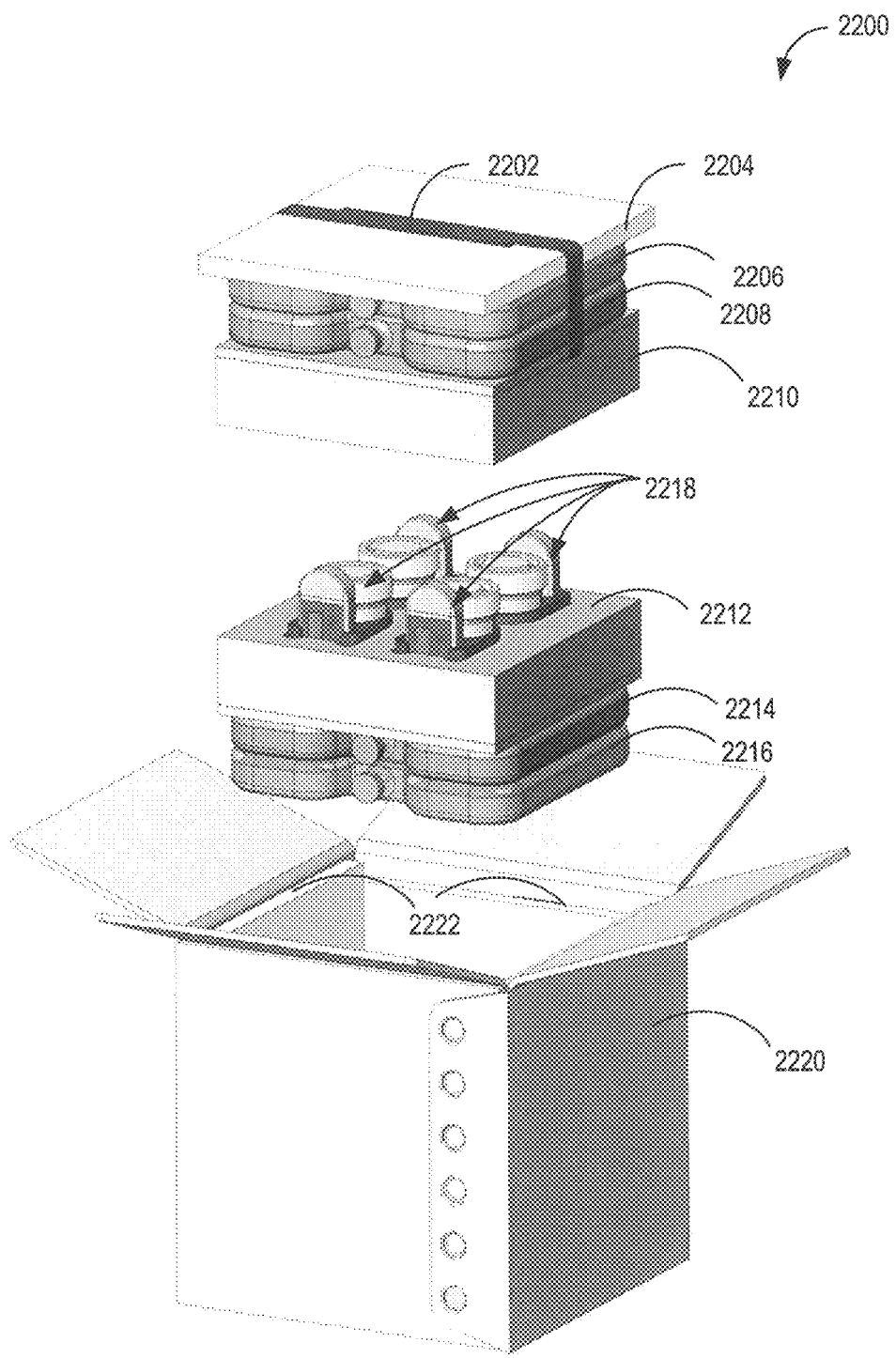
FIG. 3 is an illustration of an exemplary four cup transport system.

FIG. 3 is a cross-sectional view of a transporter system 2200.

FIG. 3 depicts an illustration 2200 of an exemplary four cup transport system. The exemplary cold tissue transport system, as illustrated in FIG. 3 can maintain a temperature of the specimen within an exemplary range of 2–8° C. by using two exemplary elements: vacuum insulation panels 2204, 2222, and phase change blocks 2206, 2208, 2214, 2216. The box is assembled as shown in FIG. 3. According to exemplary embodiment, an exemplary strap, such as, e.g., but not limited to, a coupler, such as, a VELCRO strap, can hold an exemplary vacuum insulation panel lid 2204, onto a vacuum insulation box 2222 in exemplary outer box 2220, an exemplary chill −20° C. block 2206, another exemplary chill 4° C. block 2208, an exemplary foam insert 2210, to which the exemplary strap 2202 can be coupled, an exemplary foam insert 2212 can be configured to receive exemplary specimen containers 2218, as shown, and exemplary chill 4° C. block 2214, and the other exemplary chill −20° C. block 2216 can be placed beneath the foam insert 2212, according to an exemplary embodiment.

The exemplary vacuum insulation panels 2204, 2222 can provide excellent insulation from the environment, according to an exemplary embodiment. The exemplary panels 2204, 2222 line all sides of the interior of the box 2220 with a fairly tight fit, according to an exemplary embodiment. The exemplary insulation panels 2204, 2222, along with the phase change chill or ice blocks 2206, 2208, 2214, 2216, nest the specimens tightly in their exemplary carrier assemblies 2218, which can be seated, as illustrated in 2200, into an exemplary foam rack 2212, 2210, holding an exemplary four cups 2218.

The exemplary phase change blocks 2206, 2208, 2214, 2216 can provide thermal buffering from the environment, according to an exemplary embodiment. Two types of blocks can be used simultaneously to maintain the sample temperature between 2° C. and 8° C., according to an exemplary embodiment. The exemplary green blocks 2206, 2216 can be prepared in a −20° C. freezer (at least overnight) and can be placed toward the outside of the shipping box, away from the foam inserts 2210, 2212 which hold the samples, as illustrated in FIG. 3. In order to provide proper thermal buffering, the green blocks' 2206, 2212 temperature should be no lower than −20° C. (if it is lower it may freeze the sample) and no higher than −15° C. (if it is higher it won't last as long), according to an exemplary embodiment. The green blocks 2206, 2212 should not be placed in a freezer with a defrosting function, according to an exemplary embodiment. The exemplary orange blocks 2208, 2214 can be prepared in a 4° C. refrigerator (at least overnight) and can be placed next to the foam inserts 2210, 2212 which can hold the samples, maintaining them at 4° C., according to an exemplary embodiment. Prior to packing the box 2220, the orange blocks 2208, 2214 should be removed from the refrigerator; if the blocks 2208, 2214 are completely frozen, the blocks 2208, 2214 should be allowed to warm until most or all of the blocks' 2208, 2214 content is liquid, according to an exemplary embodiment. If the blocks 2208, 2214 are either partially or completely liquid and still at 4° C., the blocks 2208, 2214 are ready for use, according to an exemplary embodiment.

Carrier Assemblies (CryoPack carrier assembly FIG. 7A-G, and TEMPOD carrier assembly FIG. 8A-H)

Figure 4A:
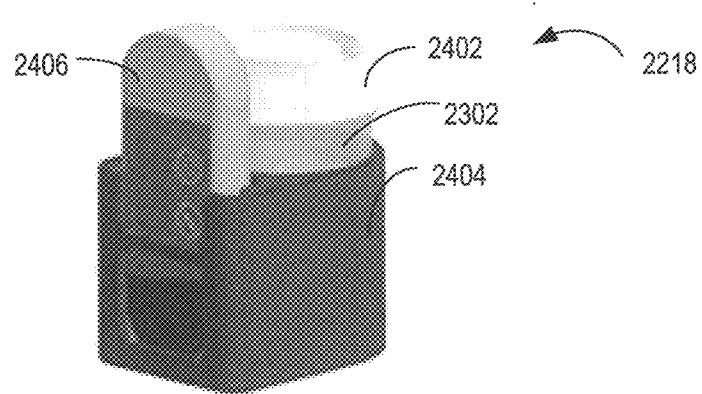
FIG. 4A is an exemplary carrier assembly including an exemplary TEMPOD casing with an exemplary specimen vial with specimen lid fixed atop it, and an exemplary data logger, both inserted in exemplary slots therein, according to an exemplary embodiment.

FIG. 4A illustrates an exemplary carrier assembly 2218 including an exemplary carrier assembly 2404 shown including an exemplary TEMPOD carrier assembly 2404 with an exemplary specimen vial 2302 with specimen lid 2402 atop it, and an exemplary data logger 2406, inserted in exemplary slots therein, according to an exemplary embodiment. Exemplary TEMPOD carrier assembly 2404 can be an exemplary plastic casing that can seat the vial 2302 with lid 2402, and data logger 2406, which together can be placed into the Styrofoam inserts 2210, 2210 inside the GreenBox 2220, according to an exemplary embodiment.

As previously mentioned the monitoring assembly may include one or more sensors selected to, among other capabilities, determine, monitor or store data about: the temperature of the container and/or sample; elapsed time; environmental temperature in the transporter; ambient light to determine if the carrier assembly and sample container are in or outside the transporter; acoustic; infrared proximity (determine if specimen or a cassette containing the specimen is in the specimen container or the container is in the carrier assembly, etc.); accelerometer to records impact or inversion; leaks or fluid loss; or any other type of sensors or sensor arrays. Additionally, one or more sensors may be configured to transmit data, such as temperature, for example, while being submerged in the reagent in the specimen holder in the reagents.

Figure 4B:
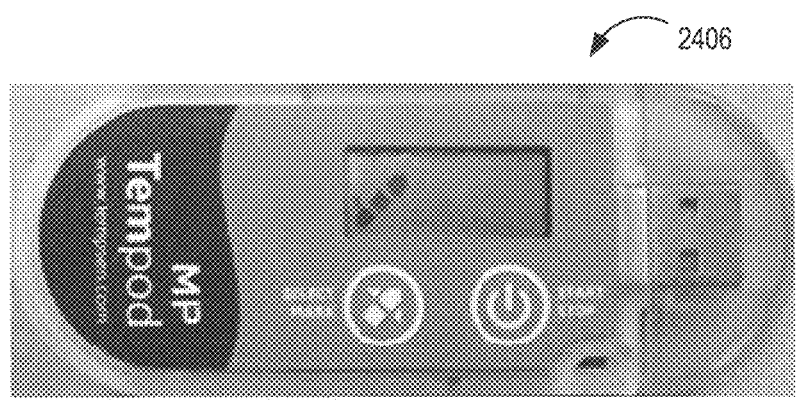
FIG. 4B is an example TEMPOD data logger.
Figure 4C:
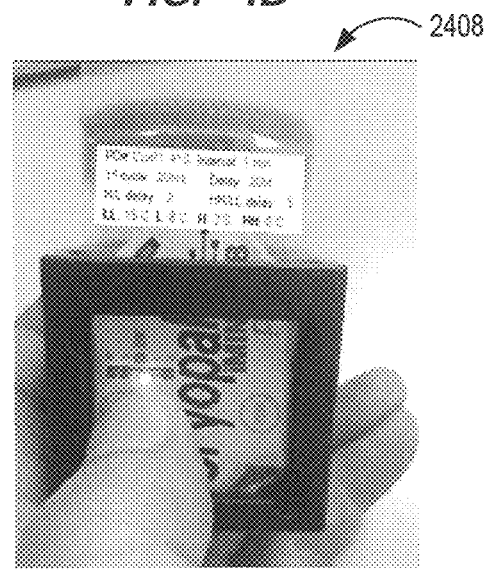
FIG. 4C is an example CRYOPAK data logger usable for both cold- and room-temperature transport, according to another exemplary embodiment.

Data loggers (FIGS. 4B, 4C, 9A and B, and 10A and B)

FIG. 4B illustrates an exemplary embodiment of an exemplary current implementation including an exemplary TEMPOD data logger 2406, which can be used to monitor the temperature of specimen samples in a vial 2302 and can be used to maintain a chain of custody over the samples in an accompanying associated vial 2302 with lid 2402, as shown in FIG. 4A. In an example embodiment, the TEMPOD data logger 2406 can be used for both cold- and room-temperature transport. The data logger 2406 of the carrier assemblies 2218 record and monitor temperature excursions against exemplary preprogrammed thresholds (e.g., but not limited to, heating, and/or freezing, etc.), about which can be indicated with an exemplary display such as, e.g., but not limited to, a LED/LCD display with exemplary warning(s). These exemplary data logger(s) 2406 can be preconfigured for the first sample collection. Alternatively, as illustrated in FIG. 4C, Cryopak data loggers 2408 can also be used for both cold- and room-temperature transport, according to another exemplary embodiment. Each of the data loggers 2406, 2408 can come with associated accompanying, proprietary software, according to an exemplary embodiment.

Figures 6A, 6B:
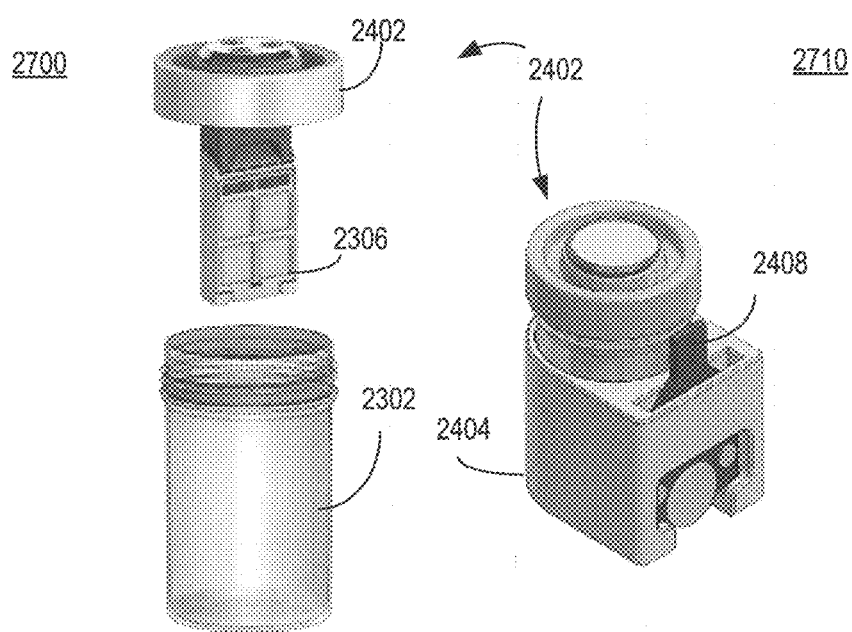
FIGS. 6A and 6B depict an exemplary exploded view, and inserted view, respectively, of an exemplary specimen vial, with specimen lid, cassette coupled to lid by an exemplary clip and pod casing, and exemplary CRYOPACK data logger according to an exemplary embodiment.

FIGS. 6A and 6B depict an exemplary exploded view 2700 and inserted view 2710, respectively of a an exemplary specimen vial 2302, specimen lids 2402, cassette 2304, 2306, coupled to lid 2402 by an exemplary clip (not labeled, with various embodiments discussed herein) and carrier assembly 2404, and CRYOPACK data logger 2408 (discussed herein with reference to FIG. 4C), according to an exemplary embodiment.

An exemplary embodiment can include data logging electronics 2406, 2408, which can be held separately from the vial 2302 via carrier assembly 2404 construct, with thermal communication to allow monitoring by the data logger 2406, 2408 of the vial and its sample contents.

An exemplary embodiment can provide an exemplary timer/clock function associated with the insertion of the container, and can log other times and/or temperatures of events, or at specific and/or periodic times.

An exemplary embodiment can provide an exemplary feature having a means to indicate completion of a predetermined time after the insertion or manual start was established.

An exemplary embodiment can provide an exemplary display, monitor or indicator (such as, e.g., with an indicating/monitoring/displaying and/or storing system and/or method LED/LCD).

An exemplary embodiment can provide an exemplary feature having a temperature recording capability.

An exemplary embodiment can provide an exemplary feature of having a means to record and indicate temperature excursions against preprogrammed thresholds (heating, freezing), indicating with LED/LCD.

An exemplary embodiment can provide an exemplary feature having a means to monitor temperature excursions and time after sealing of the container, and can indicate successful completion per LED/LCD against preprogrammed thresholds.

An exemplary embodiment can provide an exemplary feature of generating one or more of the warnings set forth in Table 1. Moreover, the triggering of such a warning may instigate one or more follow-up actions during a shipping/fixation process as set forth in Table 1.

TABLE 1

| Warning | Risk/Follow-up Action |
|---|---|
| Temperature exceeds threshold | Potential loss of labile markers; verify that occurrence was related to critical phase of surveillance profile |
| Temperature falls below threshold | Potential loss of sample due to freezing with impact to morphology. Verify that fluid temperatures stayed above freezing point. |
| Package experienced an impact exceeding a threshold | Potential damage to hardware and/or sample integrity; test hardware to ensure proper function and examine sample to ensure it remained sufficiently intact |
| A leak or loss of fixative is detected | Potential operator exposure to fixative and potential impact to sample integrity (e.g. drying and/or uneven fixation) and; exercise caution upon handling and verify fluid contents of container |
| Undertime alarm | Insufficient fixation; Continue to keep sample and datalogger in cold environment until minimum time has been met |
| Overtime alarm | Overfixation and/or loss of labile biomarkers; Review specimen transport data and verify that no other conditions may have compromised sample integrity. |

An exemplary embodiment can provide an exemplary feature including one or more memories to store and/or include details about the sample ID, location relative to Wi-Fi transponders, and/or record date/time, etc.

An exemplary embodiment can provide an exemplary means to communicate via RFID/Bluetooth/NFC/Wireless/Zig Bee or direct connection to a PC/tablet/Cell Phone.

Figure 7A:
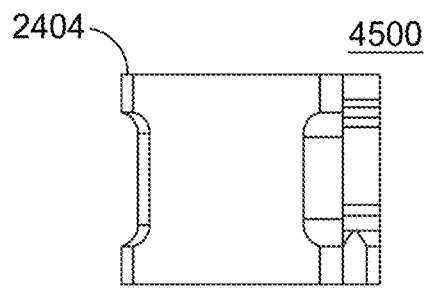
FIGS. 7A-7G are exemplary carrier assemblies.
Figure 7B:
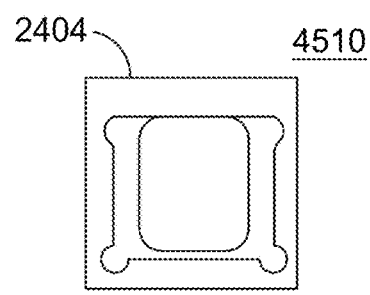
Figure 7C:
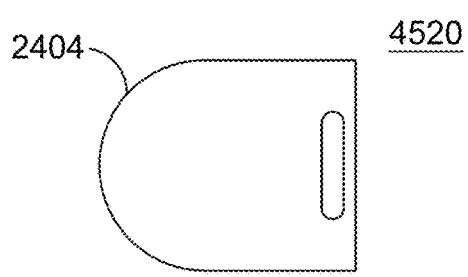
Figure 7D:
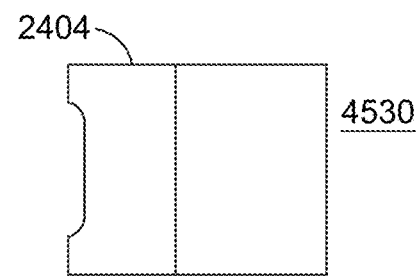
Figure 7E:
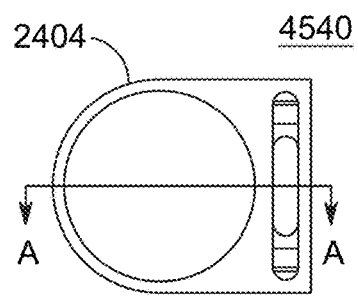
Figure 7F:
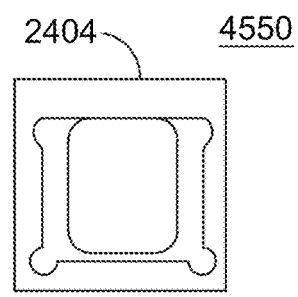
Figure 7G:
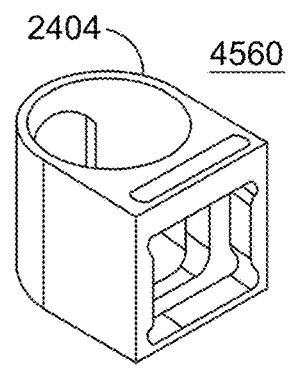

FIGS. 7A-G depict exemplary CRYOPACK carrier assemblies, according to an exemplary embodiment. FIG. 7A depicts a cutaway cross-section orthographic view 4500 of carrier assembly 2404. FIG. 7B depicts a left side orthographic view 4510 of carrier assembly 2404. FIG. 7C depicts a bottom side orthographic view 4520 of carrier assembly 2404. FIG. 7D depicts a front side orthographic view 4530 of carrier assembly 2404. FIG. 7E depicts a top orthographic view 4540 of carrier assembly 2404. FIG. 7F depicts a right side orthographic view 4550 of carrier assembly 2404. FIG. 7G depicts an isometric perspective view 4560 of carrier assembly 2404.

Figure 8A:
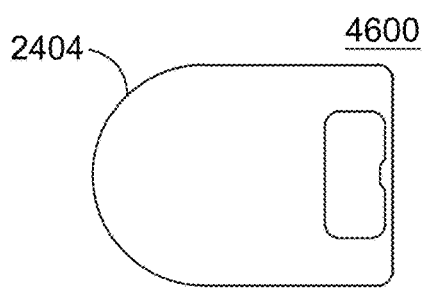
FIGS. 8A-8H are exemplary carrier assembly data loggers.
Figure 8B:
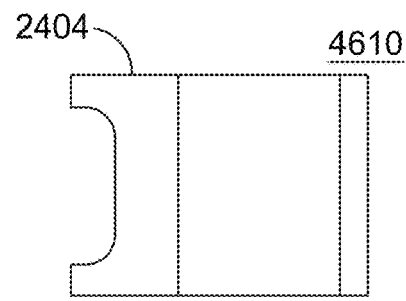
Figure 8C:
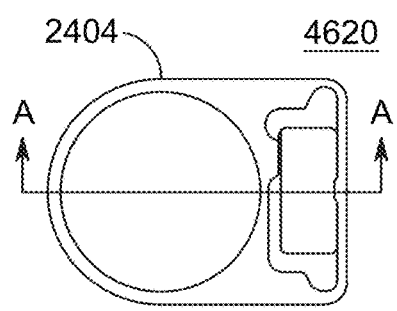
Figure 8D:
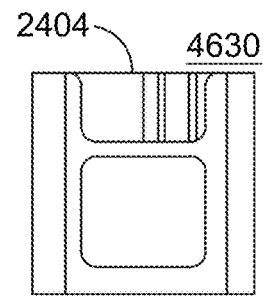
Figure 8E:
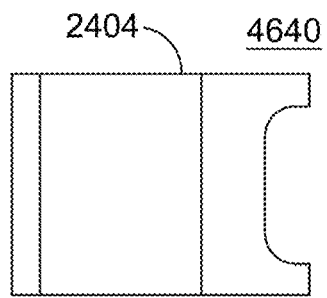
Figure 8F:
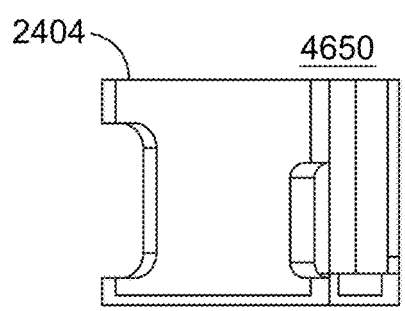
Figure 8G:
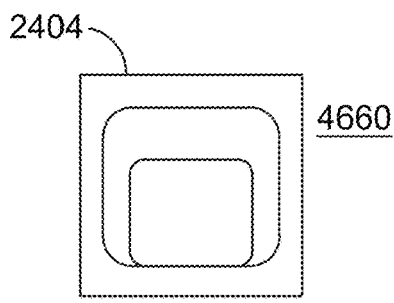
Figure 8H:
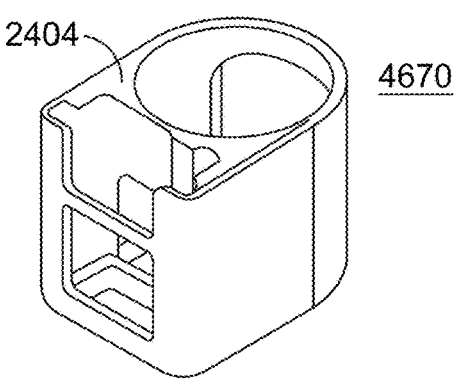

FIGS. 8A-H are exemplary TEMPOD carrier assemblies, according to an exemplary embodiment. FIG. 8A depicts a bottom orthographic view 4600 of carrier assembly 2404. FIG. 8B depicts a front side orthographic view 4610 of carrier assembly 2404. FIG. 8C depicts a top orthographic view 4620 of carrier assembly 2404. FIG. 8D depicts a right side orthographic view 4630 of carrier assembly 2404. FIG. 8E depicts a back orthographic view 4540 of carrier assembly 2404. FIG. 8F depicts a cutaway cross-section orthographic view 4650 of carrier assembly 2404. FIG. 8G depicts a right side orthographic view 4660 of carrier assembly 2404. FIG. 7 depicts an isometric perspective view 4570 of carrier assembly 2404.

FIG. 9A depicts an exemplary front view 4700 of an exemplary CRYOPACK data logger 2408.

FIG. 9B depicts an exemplary side view 4710 of the exemplary data logger 2408.

Figure 10B:
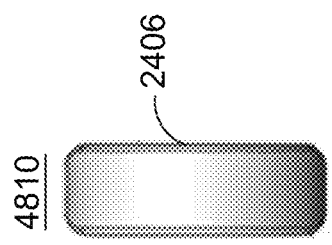
FIG. 10B is another exemplary digital pen and components.
Figure 10A:
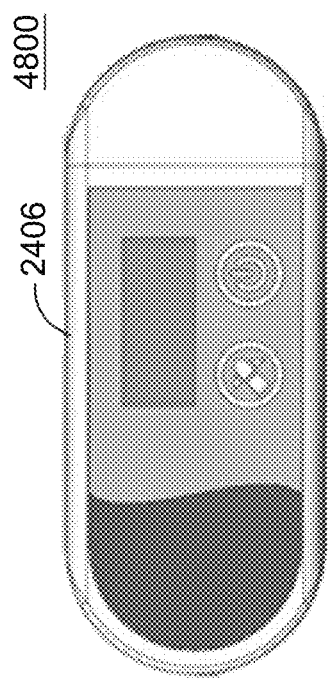
FIG. 10A is an exemplary digital pen with exemplary functionality and components.

FIG. 10A depicts an exemplary front view 4800 of an exemplary TEMPOD data logger 2406.

FIG. 10B depicts an exemplary side view 4810 of the exemplary data logger 2406.

Paper-Based LRF

Figure 5A:
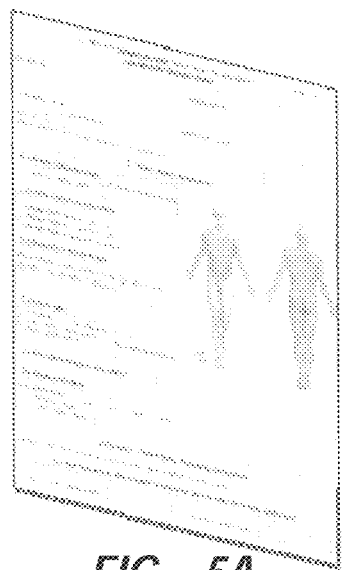
FIG. 5A illustrates an example initial paper-based form.

FIG. 5A illustrates an example initial paper-based form, which can be included in the packet specifically for use with the SCTT system. The SCTT forms are likely to be provided by an external vendor (PharmaForms offers an integrated solution that can be used for this kit) and/or a custom-designed form may be used with the Ventana SCTT solution, according to an exemplary embodiment. Software may be purchased, which may allow the forms to be both designed and printed by the customer, according to an exemplary embodiment.

Data collected may include, according to an exemplary embodiment:

At a beginning of surgery: patient ID, collection Site, responsible party, date of surgery.

1) As samples are collected: a sample identifier, a time of collection (beginning of ischemia), an anatomical site of collection, a type of fixative and/or a fixative concentration.

2) Any comments or anomalies in the collection process may be noted. The date/time of sample shipment can be recorded.

Figure 5B:
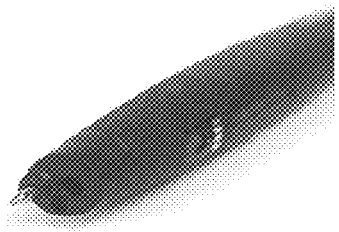
FIGS. 5B and 5C are various exemplary views of an electronic pen.
Figure 5C:
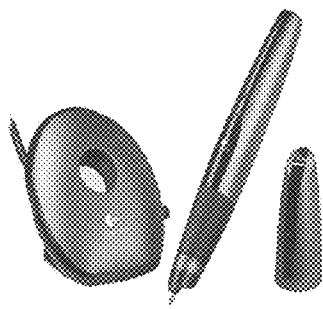

Paper lab request forms (LRF) can be custom designed (using, e.g., but not limited to, www.pharmaforms.com/en, etc.) for the cold tissue transport method, or conventional LRFs may be used either alone, or, optimally, in concert with the eLRF digital pen as shown in FIG. 5B or 5C, which can have Wi-Fi 33 and/or cloud computing capabilities (the exemplary form shown in FIG. 5 is a proprietary Roche LRF.

Digital Pen-Based eLRF (FIGS. 5B and C, and 11A and 11B)

FIGS. 5B and 5C depict various exemplary views of an exemplary electronic pen. Electronic lab request forms (eLRF) can be custom designed, e.g., for the cold tissue transport method, or conventional LRFs may be used either alone, or, optimally, in concert with the eLRF digital pen, which can have Wi-Fi 33 and/or cloud computing capabilities (the exemplary LRF form of FIG. 5A is an exemplary proprietary Roche LRF.

Example external vendors such as, e.g., but not limited to, PharmaForm can also offer digital tracking pens (e.g., ANOTO Pen) based on optical character recognition technology, according to an exemplary embodiment. Similar to the form-design and -printing, process, several options exist for extracting the data from the example ANOTO Pen, according to an exemplary embodiment. The customer may use software on a local personal computer (PC) or other computing device to extract data from the digital pen into a file which can then be emailed or uploaded to interested parties, according to an exemplary embodiment. Alternatively, pen data can be uploaded to a PharmaForms-provided cloud solution where the data can be verified by a PharmaForms representative and then can be made available for download by parties granted access to the site, according to an exemplary embodiment.

The pen may travel with the specimen sample containers and arrive at the operating room at the same time they do, according to an exemplary embodiment. When the samples leave the operating room and travel to the lab, the digital pen can go with the samples, according to an exemplary embodiment. Alternatively, the pen may travel with the individual who is responsible for collecting the samples, according to another exemplary embodiment. When the samples leave the lab, the written form can travel with the samples, but the pen can stay with its owner, according to an exemplary embodiment. The pen's electronic data can be uploaded by the pen's owner after the samples are enroute to the lab, according to an exemplary embodiment.

Figure 11A:
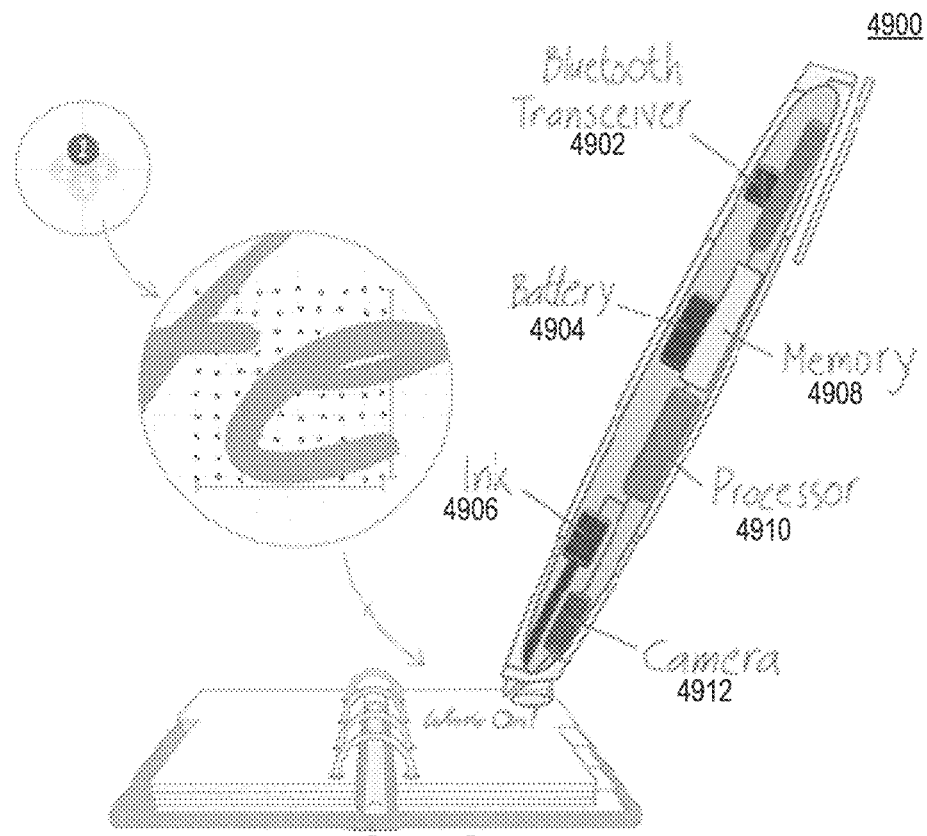
FIG. 11A is an example ANOTO branded digital pen with exemplary functionality and components including, e.g., but not limited to, an example wireless transceiver (e.g., BLUETOOTH, etc.) 4902, an example batter 4904, an example memory 4908, an example processor 4910, example ink 4906, and an example camera 4912, according to an exemplary embodiment.
Figure 11B:
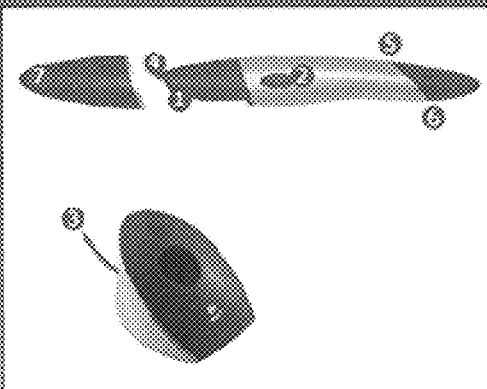
FIG. 11B is an example diagram 4914 illustrating an example LOGITECH 10 branded digital pen and components, with example components including: an example optical sensor 1, an example processor 2, an example universal serial bus (USB) cradle 3, an example ink cartridge 4, an example memory 5 (e.g., for storing up to an example 40 pages), an example battery 6 (e.g., lasting up to 25 pages of writing), and Cap controls 7 (e.g., on/off), according to an exemplary embodiment.

FIGS. 11A and 11B depict exemplary DIGITAL e-LRF PEN (various types possible, including with PharmaForms), as may be used in various embodiments of the claimed invention.

FIG. 11A is an example ANOTO branded digital pen with exemplary functionality and components including, e.g., but not limited to, an example wireless transceiver (e.g., BLUETOOTH, etc.) 4902, an example batter 4904, an example memory 4908, an example processor 4910, example ink 4906, and an example camera 4912, according to an exemplary embodiment.

FIG. 11B is an example diagram 4914 illustrating an example LOGITECH 10 branded digital pen and components, with example components including: an example optical sensor 1, an example processor 2, an example universal serial bus (USB) cradle 3, an example ink cartridge 4, an example memory 5 (e.g., for storing up to an example 40 pages), an example battery 6 (e.g., lasting up to 25 pages of writing), and Cap controls 7 (e.g., on/off), according to an exemplary embodiment.

Figure 12:
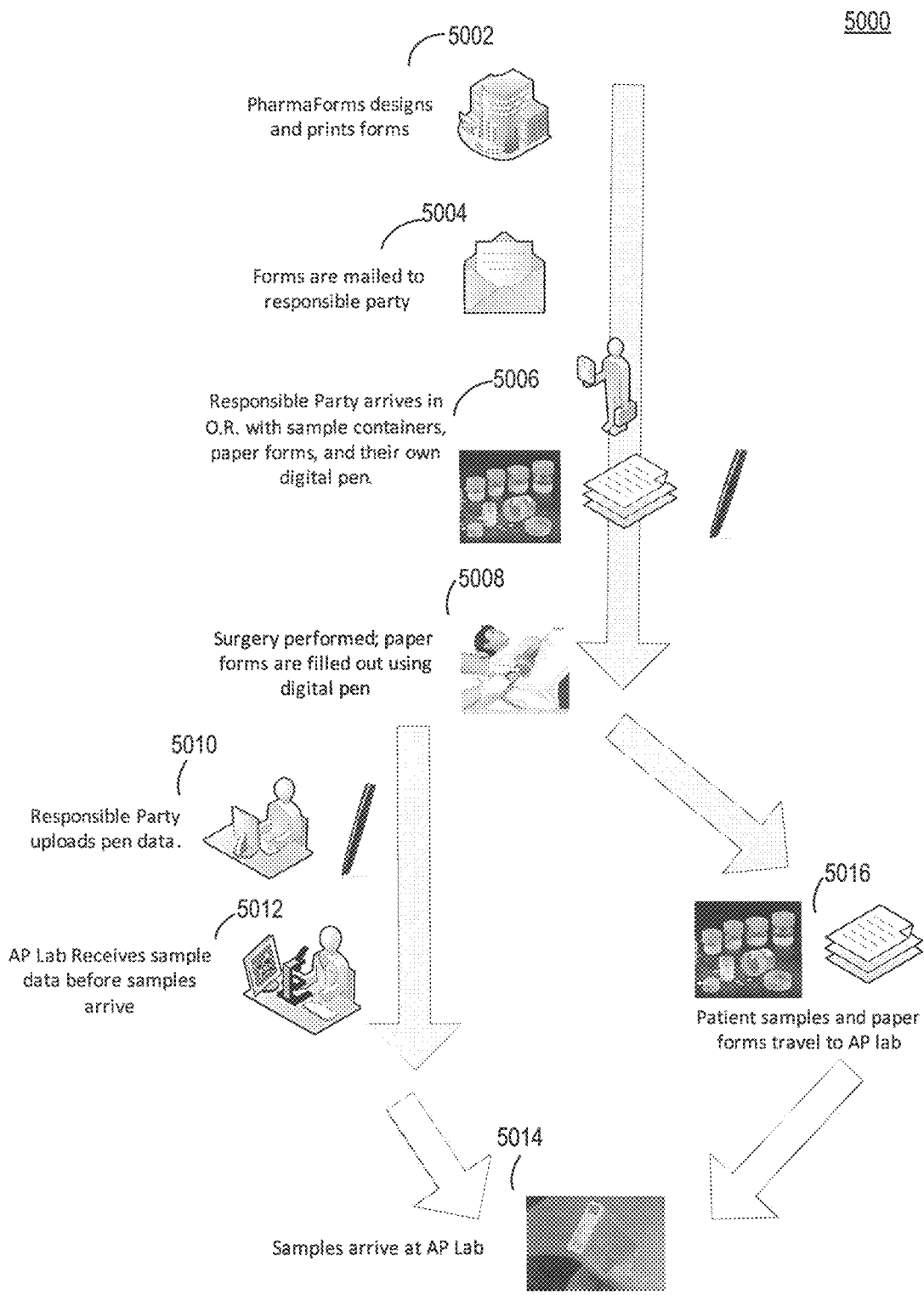
FIG. 12 is an exemplary process flow diagram illustrating an example workflow variation between paper forms and e-LRF pen, illustrating forms created by a responsible party.

FIG. 12 is an example process flow diagram 5000 illustrating an example workflow variation between paper forms and e-LRF pen, illustrating forms created and distributed by PharmaForms, according to an exemplary embodiment.

Flow diagram 5000 can begin with 5002, where PharmaForms designs and prints forms. From 5002, flow diagram 5000 can continue with 5004.

In 5004, forms can be mailed to the responsible party. From 5004, flow diagram 5000 can continue with 5006.

In 5006, the responsible party can arrive in the operating room with sample containers, paper forms, and their own digital pen. From 5006, flow diagram 5000 can continue with 5008.

In 5008, surgery is performed, and paper forms can be filled out using a digital pen. From 5008, flow diagram 5000 can continue with 5010, or 5016.

In 5016, patient samples and paper forms can travel to the AP lab, according to one exemplary embodiment.

In 5010, the responsible partner can upload pen data, according to an example embodiment. From 5010, flow diagram 5000 can continue with 5012.

In 5012, an AP lab can receive the sample data before samples arrive, according to an example embodiment. From 5012, flow diagram 5000 can continue with 5014.

In 5014, samples arrive at the AP lab. From 5014, flow diagram 5000 can end, according to an example embodiment.

Figure 13:
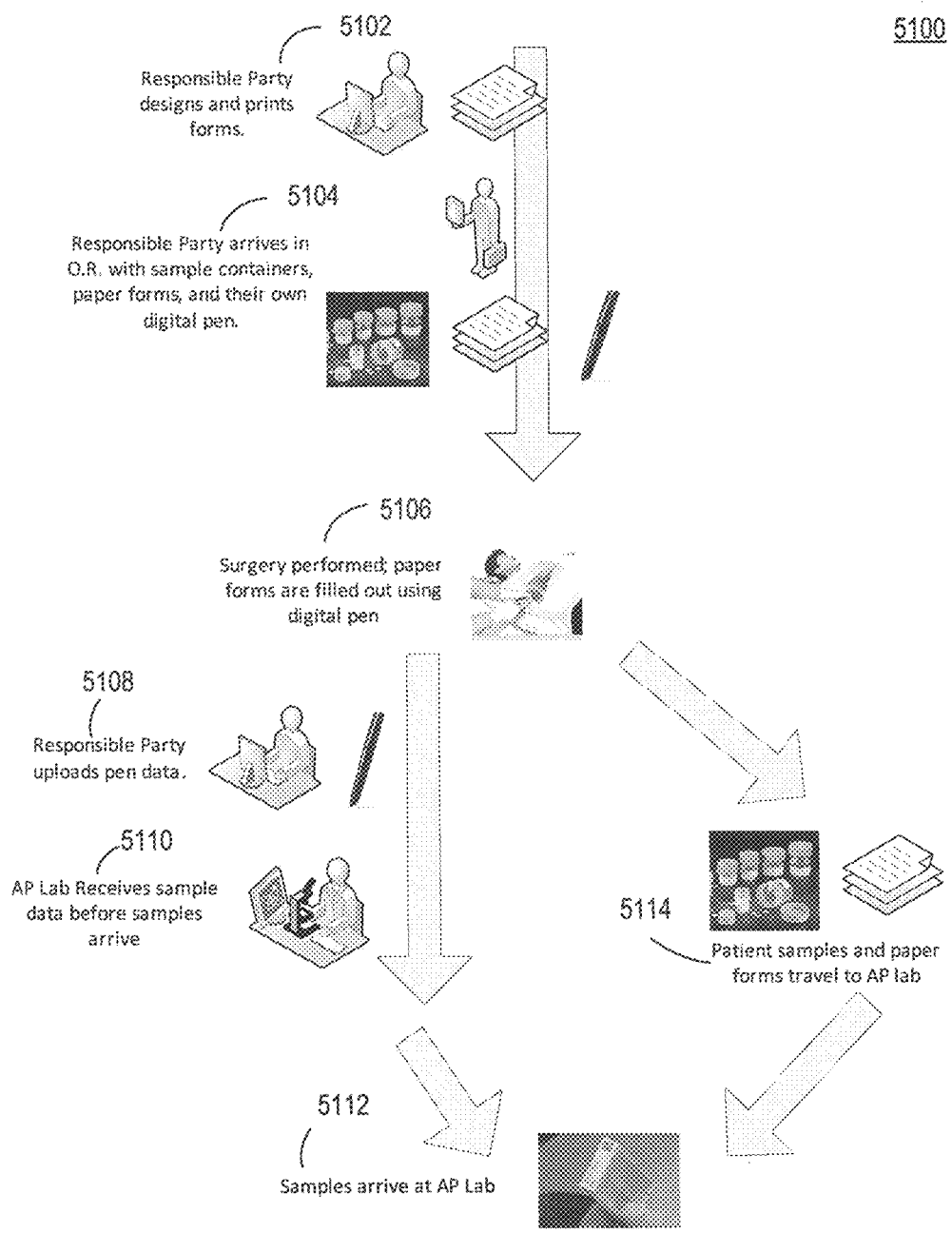
FIG. 13 is an exemplary process flow diagram illustrating an example workflow variation between paper forms and e-LRF pen, illustrating example information flow from pen to laboratory information system (LIS).

FIG. 13 is an example process flow diagram 5100 illustrating an example workflow variation between paper forms and e-LRF pen, illustrating forms created by a responsible party, according to an exemplary embodiment.

Flow diagram 5100 can begin with 5102, where a responsible party designs and prints forms according to an example embodiment. From 5102, flow diagram 5100 can continue with 5104.

In 5104, the responsible party can arrive in the operating room with sample container forms can be mailed to the responsible party, according to an example embodiment. From 5104, flow diagram 5100 can continue with 5106.

In 5106, surgery can be performed, according to an example embodiment. Paper forms can be filled out using an example digital, according to an example embodiment. From 5106, flow diagram 5100 can continue with 5108 or 5114.

In 5108, the responsible party can upload the pen data, according to an example embodiment. From 5108, flow diagram 5100 can continue with 5110.

In 5110, the AP lab can receive the sample data before samples arrive, according to an example embodiment. From 5110, flow diagram 5100 can continue with 5112.

In 5112, the samples can arrive at the AP lab, according to an example embodiment. From 5112, flow diagram 5100 end, according to an example embodiment.

In 5114, patient samples and paper forms can travel to AP lab, according to an example embodiment. From 5114, flow diagram 5100 can continue with 5112, according to an example embodiment.

Figure 14:
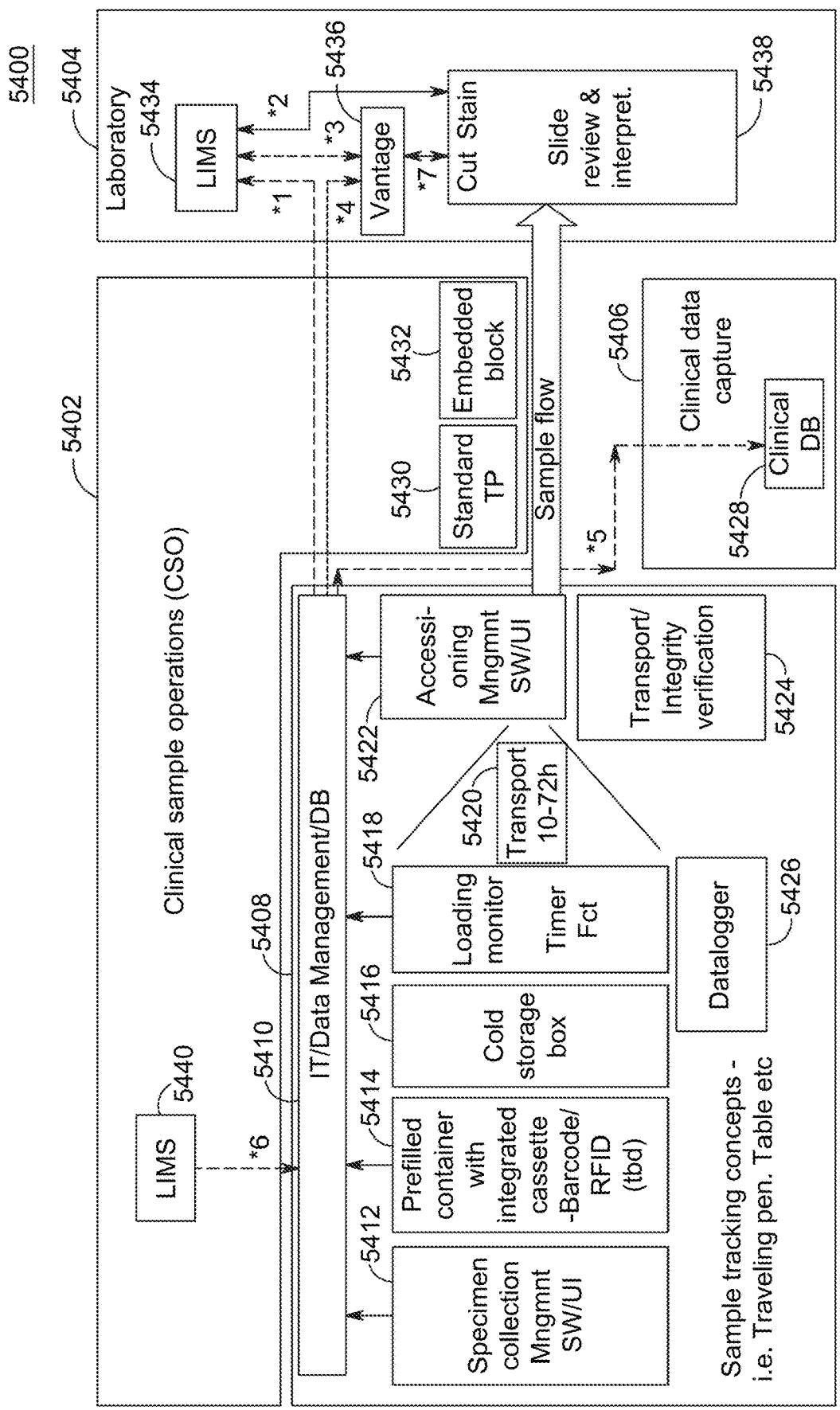
FIG. 14 is an exemplary sample collection and tracking system (SCTS).

FIG. 14 is an exemplary diagram 5400 illustrating an exemplary sample collection and tracking system (SCTS), according to one embodiment. Diagram 5400 can include a clinical sample operations (CSO) component 5402 including LIMS 5440, coupled to IT/Data Management database (DB), which includes sample tracking concepts, i.e., traveling pen, tablet, etc., receives data from specimen collection management 5412, from prefilled container vial 2302, with integrated cassette 2304, 2306 (avoiding barcode or RFID), a cold storage box 5416, loading monitor, data logger 5426, transport 10-72 hours, accessioning management software/user interface 5422, transport/integrity, 5424, standard TP 5430, an embedded block 5432, a clinical data capture 5406 with clinical data, and clinical databank 5428, and in the Laboratory 5405, a LIMS 5434, a vantage process 5436, a slide review and interpret process 5438 using cutting and staining, according to an exemplary embodiment.

Figure 15:
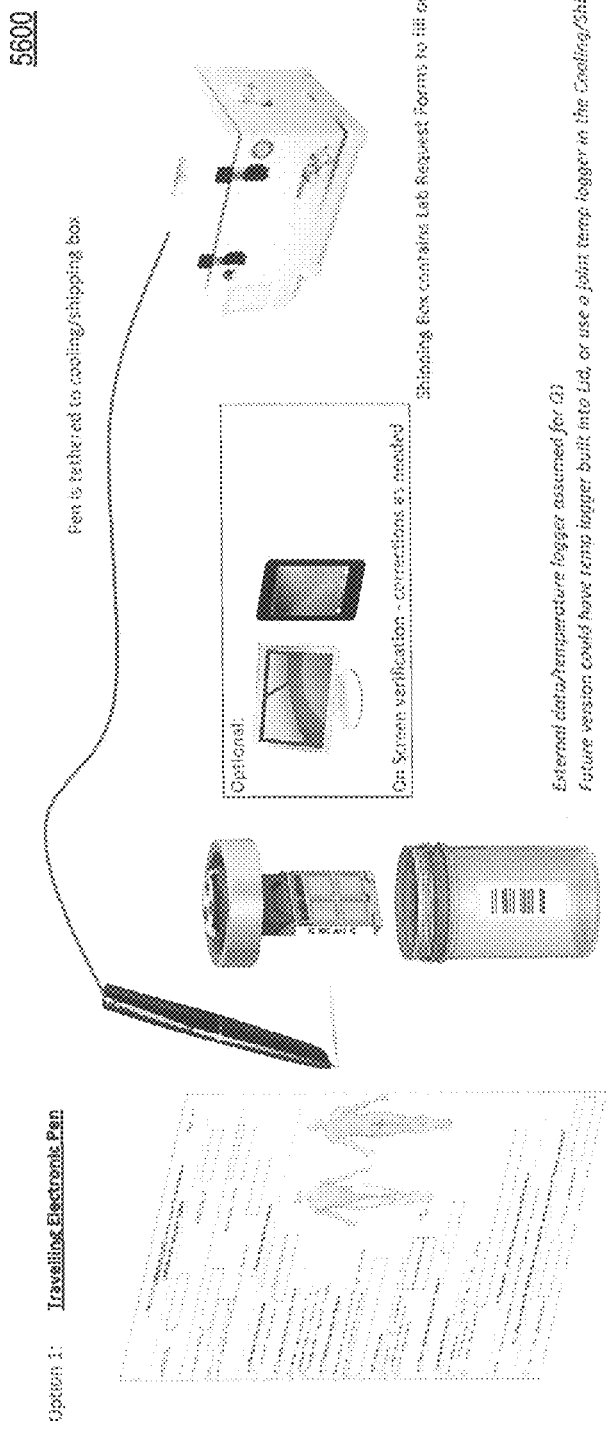
FIG. 15 is an example of tracking via an example electronic pen.

FIG. 15 is an example diagram 5600 of tracking via an example electronic pen. As illustrated various processing can be provided by tracking via electronic pen. The exemplary, but non-limiting process illustrated can include: using an ePen to fill out the lab requisition form (LRF) and can collect electronic data; collecting barcode information from a patient's wristband, container/vial, and cassette; optionally transferring by ePen electronic data to a computing device (e.g., tablet, mobile phone, etc.) for verification and/or correction; all of which can be in the surgical suite/collection site, in an example embodiment. Optionally, the verified electronic data can be uploaded via web/cloud/mobile phone/etc. to LIS, e.g., the pen can stay onsite or with the same user, in an example embodiment. Further, in an example embodiment, the ePen can travel with the specimen in the same cooling box 2200, if upload is not possible. Further, in an example embodiment, the ePen can be received at the accessioning stage in the histology lab for exemplary readout and/or reporting to the LIS; and if needed corrections may be made using, e.g., the paper form, etc.

In an example embodiment, the data logger 2406, 2408 can be readout and integrated into the data uploaded to the LIS.

The process can include, establishing chain-of-custody during specimen collection, integrating data such as patient-ID, location of surgery, day/time, name of surgeon, location of specimen removal; associating with a designated container/cassette barcode ID, recording the insertion time of the specimen into the fixative vial, logging the transport conditions (temp/time profile); and documenting a total time of cold diffusion after which the sample can be safely removed and submitted to a heated formalin step for cross-linking: duplicate capture of handwritten Lab Requisition Form by means of Electronic Data Capture and associating it to a specific Specimen or Cassette via Barcode/RFID, verifying minimum fixation conditions; and/or enabling such data capture for a Clinical Trials, according to an example embodiment.

According to an exemplary embodiment, identifier use processing can include use of a unique identifier (Anoto code) printed onto the label of the container and being part of the capture of the eLRF, including, e.g., the barcode on the cassette could be, i.e., a Vantage compatible preprinted code, that is being inserted into the container; and/or when the container arrives at the accessioning stage, the cassette barcode can be identified by a barcode reader and tied to the patient-ID that was previously associated to the container (Anoto) code, according to an example embodiment.

According to an exemplary embodiment, processing can include use of the container (pot) also having a unique label with Anoto pattern (in little square box), including, e.g., the container can still be picked randomly, and the pen can tie that code electronically to the patient-ID, and can also need a handwritten link as well on paper (some ID that they have to copy from the pot's label onto paper), according to one example embodiment.

Figure 16:
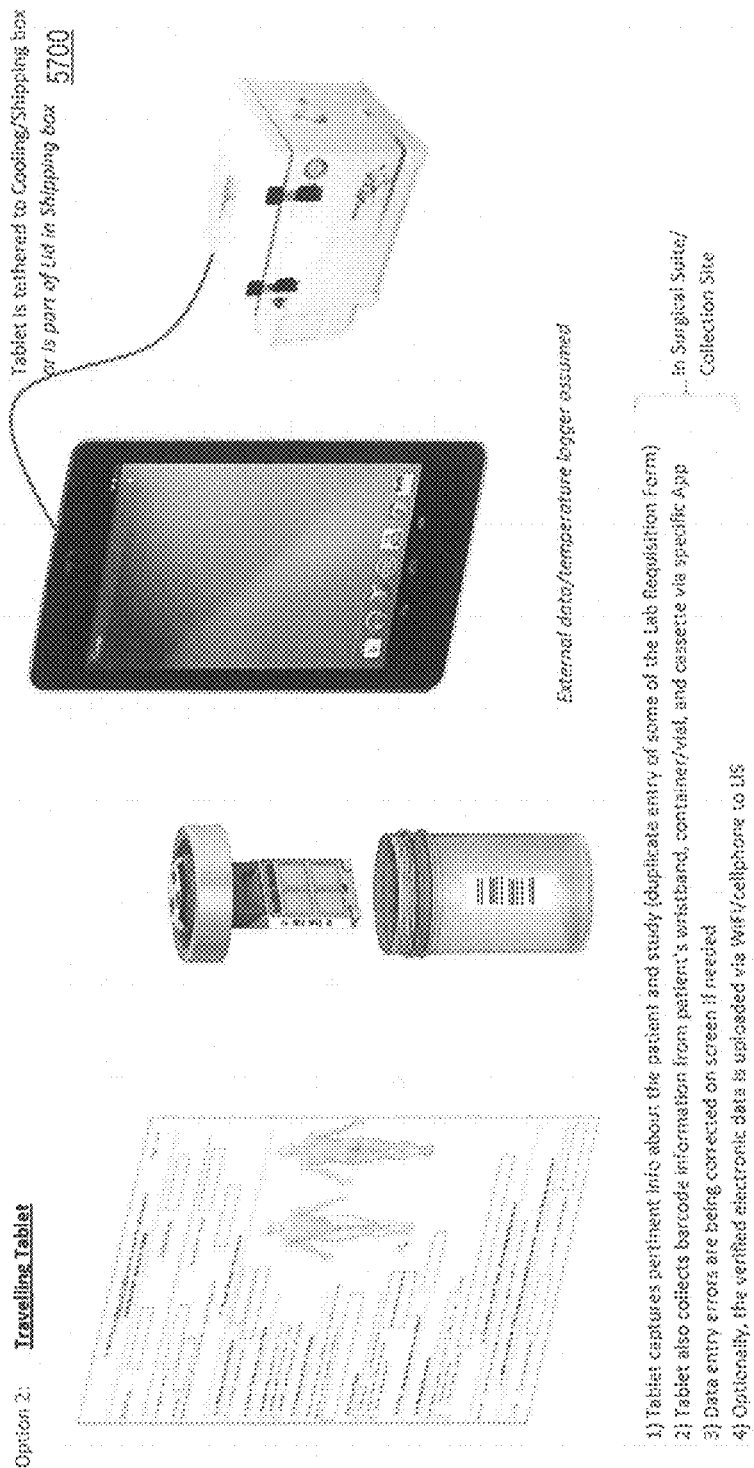
FIG. 16 is an example of tracking via an example electronic tablet device.

FIG. 16 is an example diagram 5700 of tracking via an example electronic tablet device. As illustrated various processing can be provided by tracking via tablet or other portable computing or communications device. The exemplary, but non-limiting process illustrated can include: using a tablet in capturing pertinent information about the patient and study (duplicate entry of some of the lab requisition form (LRF)) and/or to fill out the lab requisition form (LRF) and can collect electronic data; collecting barcode information from a patient's wristband, container/vial, and cassette via, e.g., an external reader, an application ("App"), etc. etc.; optionally transferring by tablet electronic data to a computing device (e.g., tablet, mobile phone, etc.) for verification and/or correction; data entry errors can be corrected, even on screen, if needed; where all of which can be in the surgical suite/collection site, in an example embodiment. Optionally, the verified electronic data can be uploaded via web/cloud/mobile phone/etc. to LIS, e.g., the pen can stay onsite or with the same user, in an example embodiment. Further, in an example embodiment, the tablet can travel with the specimen in the same cooling box 2200, if upload is not possible. Further, in an example embodiment, the tablet can be received at the accessioning stage in the histology lab for exemplary readout and/or reporting to the LIS. In an example embodiment, the data logger 2406, 2408 can be readout and integrated into the data uploaded to the LIS.

The process can include, establishing chain-of-custody during specimen collection, integrating data such as patient-ID, location of surgery, day/time, name of surgeon, location of specimen removal; associating with a designated container/cassette barcode ID, recording the insertion time of the specimen into the fixative vial, logging the transport conditions (temp/time profile); and documenting a total time of cold diffusion after which the sample can be safely removed and submitted to a heated formalin step for cross-linking: duplicate capture of handwritten Lab Requisition Form by means of Electronic Data Capture and associating it to a specific Specimen or Cassette via Barcode/RFID, verifying minimum fixation conditions; additional data capture of barcodes via camera or RFID/NFC tags via built in communication interface; additional capture of image of surgical site; and/or enabling such data capture for a Clinical Trials, in one example embodiment.

Exemplary Use of Wi-Fi MAC Address for Tracking

According to an exemplary embodiment, a device capable of having a MAC address and Wi-Fi communication could be used as a data logger and positional time stamper for sample tracking. According to an exemplary embodiment, any time either the Wi-Fi router or MAC addressed device communicated, the identity of both could be logged. Since the time of contact is known and the location of Wi-Fi router is known, one could use the massive network of free-access Wi-Fi routers to record the location of the MAC device throughout its journey from point A to point B, according to an exemplary embodiment.

Figure 17:
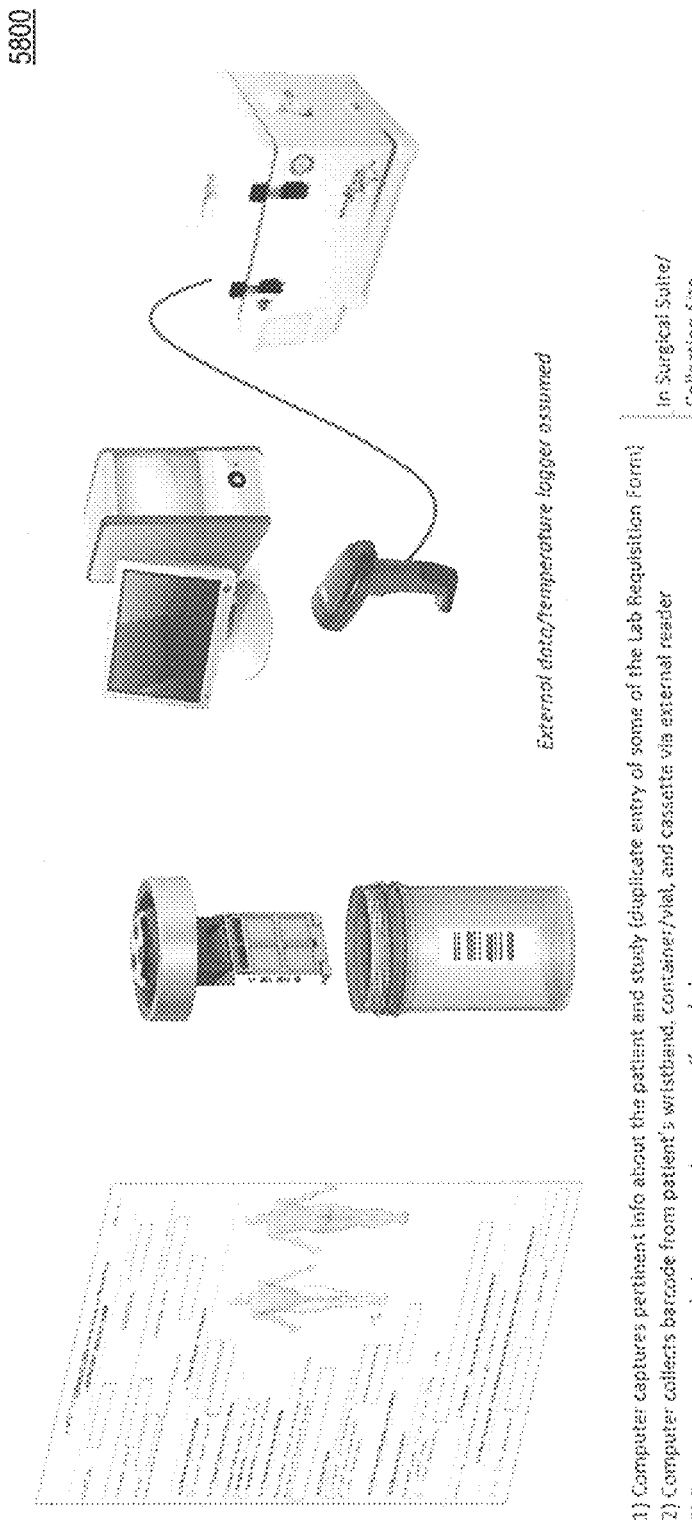
FIG. 17 is an example of tracking via an example static computer at the collection site.

FIG. 17 is an example diagram 5800 of tracking via an example static computer at the collection site. As illustrated various processing can be provided by a stationary, i.e., static computing, or portable computing or communications device. The exemplary, but non limiting process illustrated can include: using a computer using a computer, e.g., PC, in capturing pertinent information about the patient and study (duplicate entry of some of the lab requisition form (LRF)) and/or to fill out the lab requisition form (LRF) or equivalent data, and can collect electronic data; collecting barcode information from a patient's wristband, container/vial, and cassette via, e.g., an external reader, etc.; optionally transferring by internet, electronic data, etc., to a computing device (e.g., tablet, mobile phone, etc.) for verification and/or correction; data entry errors can be corrected, even on screen, if needed; where all of which can be in the surgical suite/collection site, in an example embodiment. Optionally, the verified electronic data can be uploaded via internet/web/cloud/mobile phone/etc. to LIS, e.g., the computer can stay onsite or with the same user, in an example embodiment. Further, in an example embodiment, the computer can travel with the specimen in the same cooling box 2200, if upload is not possible. If LIS connectivity is prohibited, the computer could program the data logger to retain additional information, etc. Further, in an example embodiment, the computer can be received at the accessioning stage in the histology lab, where barcode information can be can be used to reference the sample via LIS query, or for exemplary readout and/or reporting to the LIS. In an example embodiment, the data logger 2406, 2408 can be readout and integrated into the data uploaded to the LIS, in one example embodiment.

The process can include, establishing chain-of-custody during specimen collection, integrating data such as patient-ID, location of surgery, day/time, name of surgeon, location of specimen removal; associating with a designated container/cassette barcode ID, recording the insertion time of the specimen into the fixative vial, logging the transport conditions (temp/time profile); and documenting a total time of cold diffusion after which the sample can be safely removed and submitted to a heated formalin step for cross-linking: duplicate capture of handwritten Lab Requisition Form by means of Electronic Data Capture and associating it to a specific Specimen or Cassette via Barcode/RFID, verifying minimum fixation conditions; additional data capture of barcodes via camera, or radio frequency identifier (RFID)/near field communication (NFC) tags via built in communication interface; additional capture of an image of surgical site using webcam, etc.; and/or enabling such data capture for a Clinical Trials, in one example embodiment.

Figure 18:
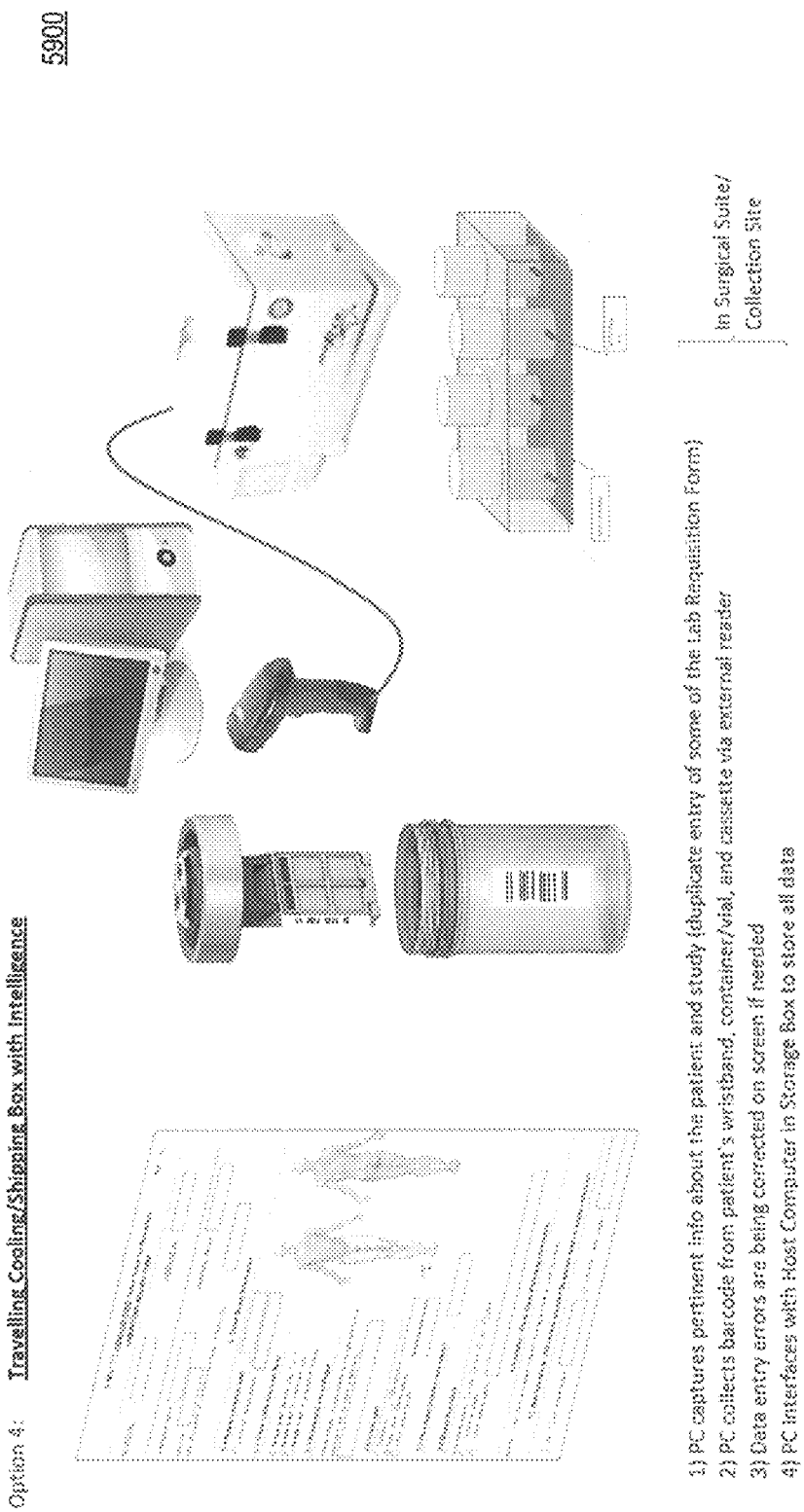
FIG. 18 is an example of tracking via an example travelling cooling/shipping box with intelligence.

FIG. 18 is an example diagram 5900 of tracking via an example travelling cooling/shipping box with intelligence. As illustrated various processing can be provided by a travelling, cooling, shipping box with intelligence, i.e., movable/portable/mobile computing, or portable computing or communications device, etc. The exemplary, but non-limiting process illustrated can include: using a computer, e.g., PC, in capturing pertinent information about the patient and study (duplicate entry of some of the lab requisition form (LRF)) and/or to fill out the LRF, and can collect electronic data; collecting barcode information from a patient's wristband, container/vial, and cassette via, e.g., an external reader, etc.; any data entry errors can be corrected, on screen, if needed, optionally transferring by computer the electronic data to a computing device (e.g., tablet, mobile phone, etc.) for verification and/or correction; data entry errors can be corrected, even on screen, if needed; where all of which can be in the surgical suite/collection site, in an example embodiment. The PC can interface with a host computer in a storage box, etc. to store the data, in an example embodiment. Loading/unloading of samples can be monitored by the host computer built into the cooling box, in the example embodiment, together with logging of times and temperatures. At the accessioning stage, in the histology lab, the host computer can provide all electronic data. Optionally, the verified electronic data can be uploaded via internet/web/cloud/mobile phone/etc. to LIS, e.g., the computer can stay onsite or with the same user, in an example embodiment. Further, in an example embodiment, optionally the computer can travel with the specimen in the same cooling box 2200, if upload is not possible. Optionally, if LIS connectivity is prohibited, the computer could program the data logger to retain additional information, etc. Further, in an example embodiment, the computer can be received at the accessioning stage in the histology lab, where barcode information can be can be used to reference the sample via LIS query, or for exemplary readout and/or reporting to the LIS. In an example embodiment, the data logger 2406, 2408 can be readout and integrated into the data uploaded to the LIS, in one example embodiment.

The process can include, establishing chain-of-custody during specimen collection, integrating data such as patient-ID, location of surgery, day/time, name of surgeon, location of specimen removal; associating with a designated container/cassette barcode ID, recording the insertion time of the specimen into the fixative vial, logging the transport conditions (temp/time profile); and documenting a total time of cold diffusion after which the sample can be safely removed and submitted to a heated formalin step for cross-linking: duplicate capture of handwritten Lab Requisition Form by means of Electronic Data Capture and associating it to a specific Specimen or Cassette via Barcode/RFID, verifying minimum fixation conditions; additional data capture of barcodes via camera, or radio frequency identifier (RFID)/near field communication (NFC) tags via built in communication interface; additional capture of an image of surgical site using webcam, etc.; and/or enabling such data capture for a Clinical Trials, in one example embodiment.

Cooling Box for Specimen Transport

Figure 19:
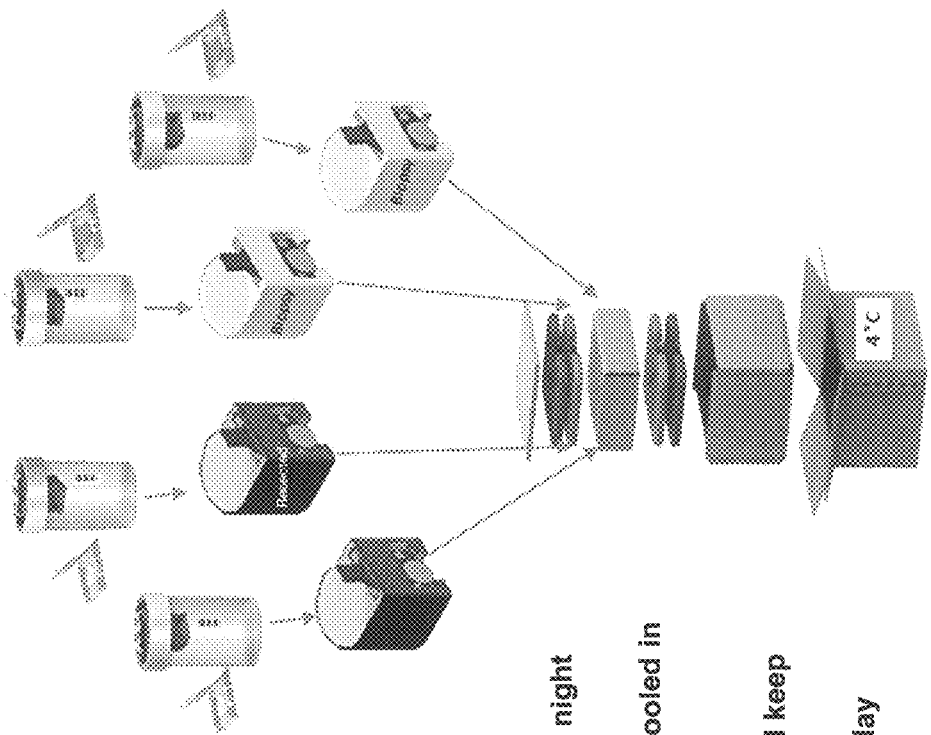
FIG. 19 is an example of an example cooling box for specimen transport.

FIG. 19 is an example diagram 6000 of an example cooling box for specimen transport including cooling elements pre-charged over night for next day surgery, reagent containers/vials kept precooled in a fridge, a box can be configured prior to surgery and transported to surgery location and can keep the reagents cold, and shipping can be initiated at end of surgery day, according to one example embodiment.

Cooling elements can be pre-charged over night for next day surgery, according to one example embodiment.

Reagent Containers/Vials can be kept precooled in fridge, according to one example embodiment.

The box can be configured prior to surgery and transported to surgery location and can be configured to keep reagents cold, according to one example embodiment.

Shipping can be initiated at end of surgery day, or other appropriate time, e.g., when a box is completely filled, according to one example embodiment.

The embodiments disclosed herein can be used with a range of different types of fixatives, including standard tissue fixatives or non-standard tissue fixatives. Non-standard tissue fixatives in accordance with at least some embodiments of the present technology can include formalin having a relatively high grade corresponding to a relatively high formaldehyde concentration. For example, the formalin can have a grade from about 16% to about 80%, from about 22% to about 80%, from about 16% to about 60%, from about 25% to about 60%, or within another suitable range. Furthermore, a non-standard tissue fixative can include a phosphatase inhibitor compound, such as a phosphatase inhibitor compound having a molecular weight less than about 300 Daltons. Suitable phosphatase inhibitor compounds include sodium fluoride, sodium orthovanadate, sodium pyrophosphate, and beta-glycerophosphate, among others. In at least some embodiments, a tissue fixative includes more than one phosphatase inhibitor compound. Non-standard tissue fixatives configured in accordance with at least some embodiments of the present technology include a first phosphatase inhibitor compound, a second phosphatase inhibitor compound, and, in some cases, a third phosphatase inhibitor compound, or more. The first, second, and third phosphatase inhibitor compounds can have molecular weights less than 300 Daltons and can be selected to preferentially inhibit different phosphatases. In some embodiments, the first, second, and third phosphatase inhibitor compounds are selected from the group consisting of sodium fluoride, sodium orthovanadate, sodium pyrophosphate, and beta-glycerophosphate. In other embodiments, one or more of the first, second, and third phosphatase inhibitor compounds can be selected from other suitable groups. These fixatives can be used during transport and/or during the fixation process.

At least some embodiments of the present disclosure monitor tissue samples to improve preservation of biological molecules, tissue morphology, and/or post-translational modification signals. Tissue samples can be pre-soaked by submerging them in pre-cooled fixative. The pre-soaking process can occur while the tissue samples are transported to reduce overall processing times and to provide fast and accurate medical diagnosis. The pre-soaking process can be monitored to obtain information about the pre-soaking process or other information used for subsequent tissue processing, such as a histological processing (e.g., fixing, embedding, dehydrating, infiltrating, embedding, sectioning, and/or staining). The information about the pre-soaking process can be used to determine, for example, (1) diffusion status of tissue samples, (2) target temperatures for fixation, and (3) tissue processing times (e.g., when to remove the tissue samples from fixatives). After fixing the tissue sample, the tissue sample can be removed from the fixative and can be subjected to one or more histological processes performed based, at least in part, on information obtained from the monitoring.

To minimize or limit fixation during shipping of the tissue sample (e.g., shipping from a collection site to a processing site), the pre-cooled fixative can be at a pre-soaking temperature for a pre-soak period of time. The pre-soak process can involve diffusion of cold fixative throughout substantially the entire thickness or cross section of the tissue sample. After desired diffusion is achieved, the tissue sample can be heated to a fixation temperature that is higher than the pre-soak temperature to start and/or promote cross-linking. By inhibiting or preventing fixation during transport, the fixation process can be performed at the processing site to accurately control the fixation process. If the fixative is formaldehyde, cross-linking can occur between formaldehyde molecules and amine containing cellular molecules without significantly compromising the tissue characteristics (e.g., antigenicity, morphology, or both).

Figure 20A:
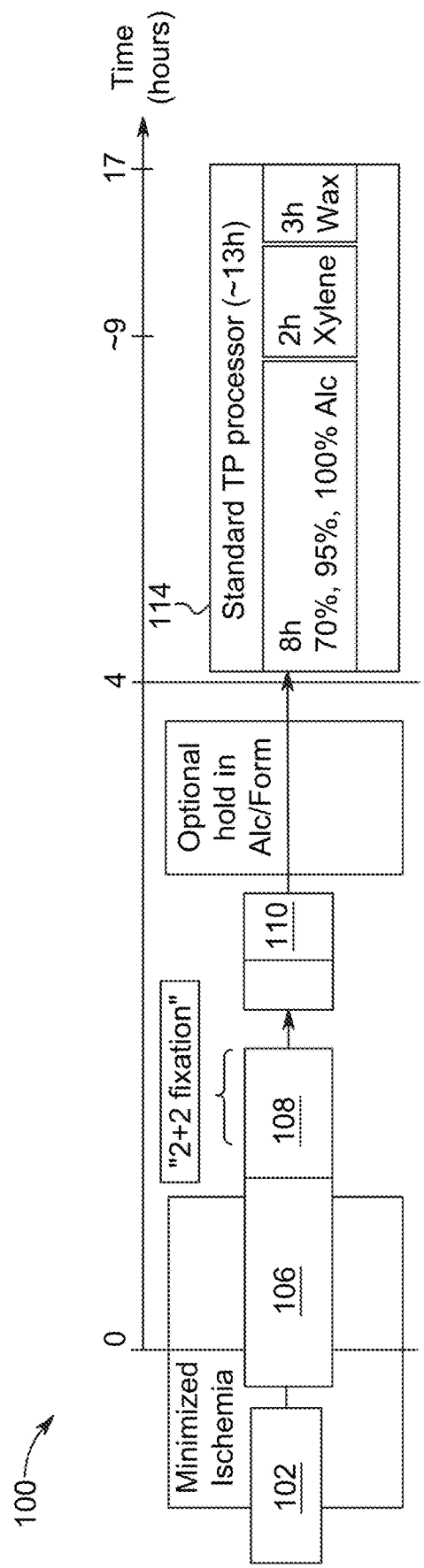
FIG. 20A is a workflow for processing a tissue sample in accordance with one embodiment.

FIG. 20A is a workflow for processing a tissue sample in accordance with one embodiment. Generally, workflow system 100 is used to monitor tissue samples from sample collection through processing. Collected information can be used to perform subsequent histology processing and to generate reports (e.g., reports used for diagnosis, patient monitoring, billing, etc.), an audit trail (e.g., an audit trail of specimen handling steps), a processing parameter log (e.g., a log that could be printed and as a quality record at the end of the processing), or the like.

At 102, a tissue sample is taken from a subject and can be a section of tissue, an organ, a tumor section, a smear, a frozen section, a cytology prep, or cell lines. An incisional biopsy, a core biopsy, an excisional biopsy, a needle aspiration biopsy, a core needle biopsy, a stereotactic biopsy, an open biopsy, or a surgical biopsy can be used to obtain the sample. In some embodiments, the tissue sample can contain genomic DNA, RNA (including mRNA), protein, or combinations thereof. Example tissue samples include, but are not limited to, peripheral blood, urine, saliva, tissue biopsy, surgical specimen, amniocentesis samples and autopsy material. In one example, a sample includes a biopsy of an adenocarcinoma, a sample of noncancerous tissue, and a sample of normal tissue (from a subject not afflicted with a known disease or disorder).

At 106, the tissue sample is placed in a transporter system with media. A freshly removed tissue sample can be pre-soaked by placing the tissue sample in fixative within an appropriate amount of time to prevent or limit an appreciable amount of degradation (e.g., ischemia). In some embodiments, the tissue sample is taken from a subject and placed in the fixative within a relatively short amount of time, for example, less than about 1 minute, 2 minutes, 5 minutes, 30 minutes, 1 hour, 2 hours, or the like. To pre-soak the tissue sample, the tissue sample can be placed into an open transport specimen container containing liquid fixative. The composition and temperature of the fixative can be selected to achieve a desired rate of diffusion and/or cross-linking. The fixative can be formalin solutions of formaldehyde in water used for preservation of biological specimens. Formalin used as a fixative typically is 10% NBF, but other solution concentrations (e.g., 10%-80% NBF) also can be used. The tissue sample can remain immersed in the fixative while it is conveniently transported to another location.

Exemplary transporter systems can include, but are not limited to, packaging, a bottle, a vial, or other object used to hold liquid media and at least one tissue sample. The transporter systems can include machine-readable code (e.g., optical symbology, magnetic pattern or electromagnetic, or electrostatic signal having information content) that may relate to sample identity, patient information, sample origin, sample chain of custody, instructions for processing samples, information regarding the characteristics of samples, test results for samples, images of samples, or other information associated with the tissue sample.

The fixative can be at a pre-soak temperature (or "diffusion temperature") to allow diffusion of the fixative while inhibiting fixation. The pre-soak temperature can be above the freezing point of the fixative solution to about 15° C., preferably greater than 0° C. to an upper temperature to about 10° C., more preferably greater than 0° C. to an upper temperature of about 7° C., and even more preferably from about 3° C. to about 5° C. For some procedures, the pre-soak temperature can be about 4° C. Although some fixing (e.g., cross-linking) may occur during the pre-soaking process, the fixing primarily occurs after the pre-soaking process (i.e., during the fixation process). The pre-soaking process can balance the beneficial properties associated with substantially complete diffusion while minimizing or limiting the effects associated with initializing or promoting cross-linking. In some embodiments, the rate of diffusion of the fixative can be maximized while limiting and minimizing any deleterious effects associated with increased cross-linking rate. In other embodiments, the transporter system can include warm fixative (e.g., room temperature) that simultaneously diffuses through the tissue sample and cross-links.

At 108, the transporter system can be transported to an onsite laboratory or an offsite site laboratory while the fixative diffuses through the tissue sample. The fixative can be kept at or below the pre-soak temperature, thereby allowing for a wide range of delivery times without significantly impacting the state of the tissue specimen. In some procedures, the fixative is formalin with a target pre-soak period of time in a range of about 15 minutes up to about 4 hours, most typically from greater than 15 minutes to about 3 hours, with desirable results typically being obtained by immersing tissue samples for about 1.5 hours to about 2 hours. Tissue samples with different sizes and characteristics can have different target pre-soak periods of time. Increasing the pre-soak period of time to 4 hours or greater may have little beneficial effect for a relatively small tissue sample with a thickness up to 4 mm. If the sample arrives at the processing site before completion of the target pre-soak period of time, the tissue sample can be left in the fixative to complete the diffusion process.

Alternatively, the tissue specimens can be removed from the transporter system and the pre-soaking process can be completed with another fixative.

At 110, the tissue sample can be evaluated to determine whether the fixative has adequately infused the sample tissue. After desired diffusion is achieved, the fixation process can be performed by, for example, heating the tissue sample to a fixation temperature to start and/or promote cross-linking if the rate of cross-linking is temperature dependent. In some procedures, the tissue sample can be removed from the transporter system and delivered to a processing apparatus/system that can perform a fixation process by immersing the tissue sample in warm fixative. If the fixative is formaldehyde, the temperature of the warm formalin can be greater than the ambient temperature and up to at least 55° C., more typically from about 35° C. to about 45° C., as this temperature range may increase the cross-linking kinetics sufficiently to allow relatively quick tissue cross-linking. However, if the temperature is increased above about 50° C., the tissue sample may begin to degrade, which may have a deleterious effect on certain subsequent histological reactions. Thus, the upper temperature and time period of the fixation process can be selected to allow subsequent imaging processes, such as in situ hybridization, IHC, and/or hematoxylin and eosion (H&E) processing. The time period for the fixation process can range from greater than about 15 minutes up to at least about 5 hours, more typically is at least about 1 hour to about 4 hours, and more typically is from about 2 hours to about 3 hours. In certain embodiments, the fixation process can be performed for about 1.5 hour at a temperature of about 45° C. The pre-soak fixative and the cross-linking fixative can be the same or different. As yet another example, entirely different aldehyde fixatives, such as formaldehyde and glutaraldehyde, can be used for the pre-soak process and fixation processes. Additionally, instead of removing the sample from the fixative, the pre-soak fixative can be heated to cause cross-linking. As such, the tissue sample can remain immersed in the same fixative throughout the pre-soak and fixation processes.

Various factors may be considered to determine pre-soaking and fixation processing. These factors can include: sample thickness, which typically ranges from about 1 mm to about 10 mm thick, more typically from about 2 mm to about 8 mm thick, and even more typically from about 4 mm to about 6 mm thick; volume of fixative to tissue sample mass, which typically is from about 10:1 to about 50:1 volume to mass; fixative composition; temperature; and sample immersion time in the fixative. Processing times, fixation history, condition history, tissue characteristics, or other histology information can be used to adjust processing to ensure proper tissue processing.

At 114, the tissue sample can be embedded, sectioned, and transferred onto a microscope slide for subsequent processing and analyses, such as staining, IHC, or in situ hybridization. To section a tissue sample for optical microscope examination, a relatively thin strip of tissue can be cut from a large tissue sample so that light may be transmitted through the thin strip of tissue. A microtome can cut the specimen into thin sections, for example, slices on the order of about 5 microns to about 6 microns thick. Each section can include a portion of the tissue sample and some of the embedding material. The microtome and any other equipment (e.g., a staining station, an embedding station, an oven, etc.) can include communication devices to read and/or write information to the specimen holder. The tissue specimen can be transferred onto a microscope slide, which can include machine-readable code. In some embodiments, the cut sections are floated on water to spread or flatten the sections. If the sections are pieces of paraffin embedded tissue, the sections can be floated on a warm bath to keep the sections in generally flat configurations, thereby reducing or preventing folding, creasing, or bending. A microscope slide is inserted into the warm bath. A front surface of the slide is used to pick up the tissue specimens. To examine multiple tissue samples (e.g., a set of tissue samples, each taken at a different location in a subject) using a single slide, a plurality of the tissue samples may be sequentially floated onto the slide. These wet slides are then dried using the slide dryer and coverslipped. Other standard tissue processing protocols can be used to analyze the tissue samples.

Figure 20B:
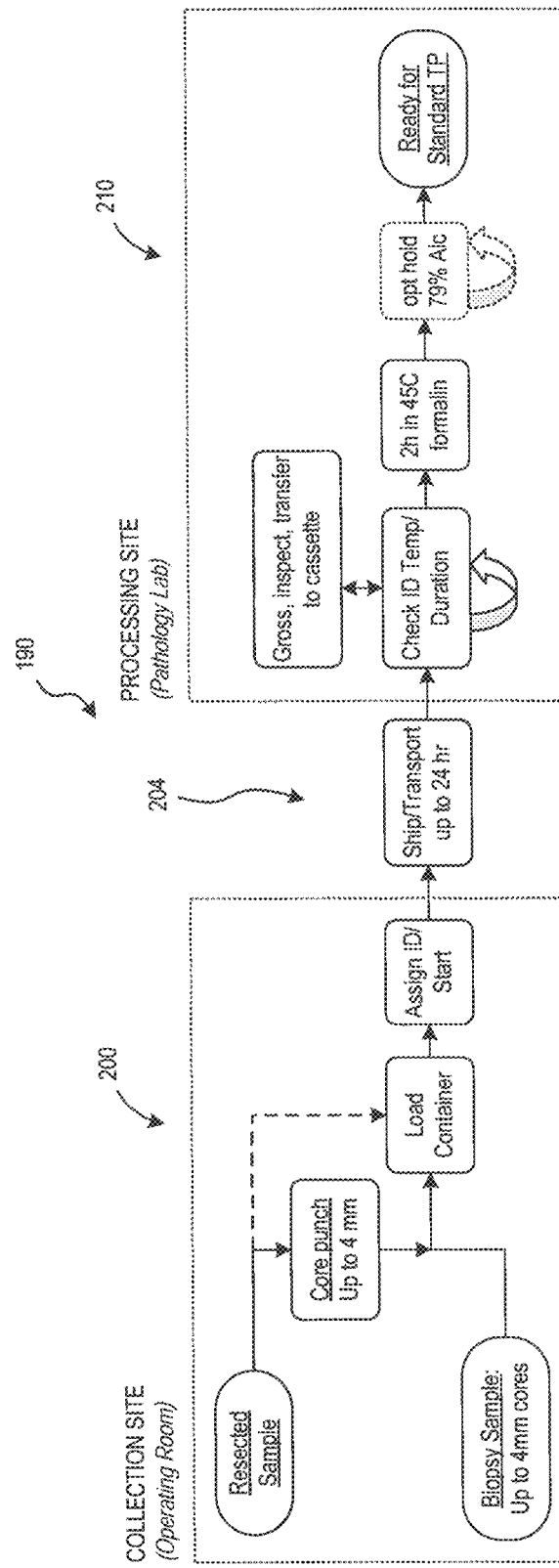
FIG. 20B is a workflow for processing a tissue sample from a collection site to a processing site in accordance with one embodiment.

FIG. 20B is a workflow 190 for tracking tissue samples from a collection site to a processing site. At 200, a tissue sample can be taken from a subject at an operating room and loaded into a specimen container. The specimen container can be assigned identification information and loaded into shipping container, such as a transporter system. At 204, the tissue sample is shipped from the collection site to the processing site (such as an onsite or offsite pathology lab) by, for example, a courier or a runner. The transport time can be less than 24 hours. At 206, information (e.g., temperature condition, temperature versus time information, diffusion state, etc.) from a monitoring system of the transporter system can be used to determine an appropriate fixation protocol. The tissue sample can be fixed, and the fixed tissue sample can be processed using standard tissue processing techniques.

Figure 20C:
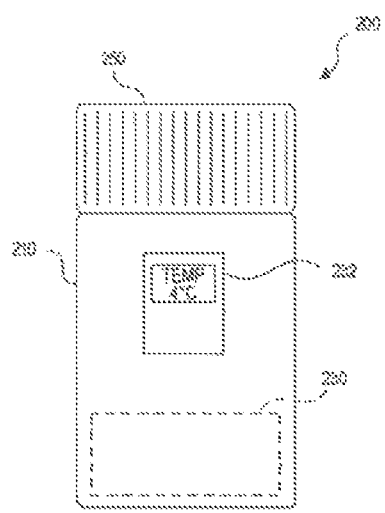
FIG. 20C is a front view of a self-cooling transporter system in accordance with one embodiment.

FIG. 20C is a front view of a self-cooling transporter system 200 ("transporter system 200") in accordance with one embodiment. The transporter system 200 includes a transport or specimen container 210 ("transport container 210"), a cooling device 230, and a monitoring system 232. The cooling device 230 can adjust the temperature of the contents of the transport container 210. The monitoring system 232 can obtain and store information about the contents of the transport container 210. The stored information can be used to determine the condition of tissue sample(s) carried by the transport container 210.

Figure 20D:
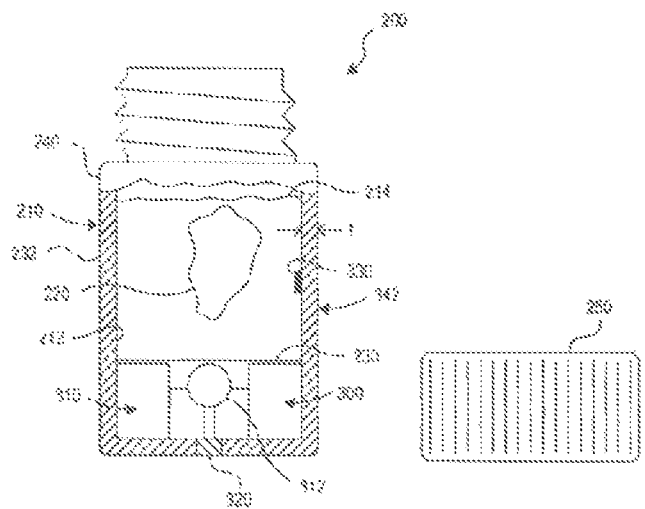
FIG. 20D is a cutaway view of the transporter system of FIG. 20C.

FIG. 20D is a cutaway view of the transporter system 200 of FIG. 20C. The transport container 210 has a holding chamber 212 containing media in the form of fixative 214 and a tissue sample 220. The fixative 214 can be any of the fixatives disclosed herein. The cooling device 230 is operable to reduce a temperature of the fixative 214 before, during, or after placing a tissue sample 220 into the container 210. In some embodiments, the cooling device 230 can be a fixation-inhibiting cooling device that reduces the temperature of the fixative 214 from room temperature (e.g., about 20° C.-about 25° C.) to a pre-soak temperature (e.g., temperature less than about 5° C.) before placing the tissue sample into the transport container 210. The pre-soak temperature can be sufficiently low to inhibit fixation of the tissue sample 220 and can be selected based on the characteristics of the fixative. In some embodiments, the temperature of the fixative 214 can be reduced to a temperature equal to or lower than the pre-soak temperature and/or maintain the pre-cooled state. For example, the cooling device 230 can reduce an average temperature of about 400 ml, 200 ml, or 100 ml of the fixative 214 at least about 25° C. in less than about 5 minutes, 4 minutes, or 3 minutes. In some embodiments, the cooling device 230 reduces a temperature of the fixative 214 at least about 25° C. in less than about 5 minutes and can periodically cool the fixative 214 as needed.

In other embodiments, the transport container 210 can be configured to hold relative large specimens, such as resected material, partial organs, whole organs, or the like Such containers 210 can hold one or more liters of fixative to perform relative long pro-soak procedures of, for example, 6 hours, 1 day, or multiple days, depending on the size of the specimen(s). In some embodiments, transport container 210 is configure to reduce an average temperature of at least one 1 liter of fixative in the specimen container by at least 15°. This cooling can be performed in less than 1 hour, 30 minutes, 10 minutes, or 5 minutes. The holding capacity and cooling capacity of the transport container 210 can be selected based on the size of the specimen, length of pre-soak procedure, and type of fixative.

To cool the fixative 214, the cooling device 230 can be changed from a non-cooling or standby mode to a self-cooling cooling mode to reduce the temperature of the fixative 214 without utilizing external power sources (e.g., electrical outlets), refrigerators, freezers, or the like. The fixative 214 can also be cooled during transport. As such, the transporter system 200 can be conveniently used at a wide range of locations.

The transport container 210 can include a main body 240 and a removable closure 250. The main body 240 can be thermally insulated to inhibit heat transfer between the surrounding environment and the fixative 214. The wall thickness t, thermal characteristics (e.g., thermal conductivity), holding capacity (e.g., 50 ml, 100 ml, 200 ml, 400 ml, etc.), and configuration of the transport container 210 can be selected based on the pre-soak process to be performed. In some embodiments, the transport container 210 can keep the fixative 214 at or below about 10° C. for at least one hour while an ambient temperature surrounding the transport container equal to or higher than 10° C. In one embodiment, the fixative 214 can be kept at less than about 4° C. for at least about 2 hours while the ambient temperature is about 25° C.

The transport container 210 can also be disposable. As used herein, the term "disposable" when applied to a component (or combination of components), such as a container or cassette, is a broad term and means, without limitation, that the component in question is used a finite number of times and then discarded. Some disposable components are used only once and then discarded. Other disposable components are used more than once and then discarded. For example, the transport container 210 can be a single-use container made, in whole or in part, of a relatively inexpensive material suitable for contacting fixative.

The transport container 210 has an open configuration (FIG. 20D) for loading/unloading tissue samples and a closed configuration (FIG. 20C) for sealing the holding chamber 212. The closure 250 can be coupled to the main body 240 to form a seal (e.g., a hermetically seal, a fluidically seal, etc.) to prevent leaking of the fixative 214. In one embodiment, the closure 250 can be a screw cap. In other embodiments, the closure 250 can be a flip cap movable between an open position for accessing the chamber 212 and a closed position for closing the chamber 212.

FIG. 20D shows the cooling device 230 in thermal communication with the fixative 214 and including a first chamber 300, a second chamber 310, and a mixing chamber 312. Substances from the chambers 300, 310 can mix in the mixing chamber 312 in response to the cooling device 230 changing from a non-cooling mode to a cooling mode by depressing a button or an actuator 320. The substances can include, without limitation, agents that react to produce an endothermic reaction or phase change materials. In some embodiments, the chamber 300 holds an activation agent in the form of water and the chamber 310 holds a cooling agent. The cooling agent can include, without limitation, a nitrogen compound, a potassium compound, or a phosphorus compound. Additionally or alternatively, the cooling device 230 can include, without limitation, one or more phase change materials that undergo a phase change when heated so as to cool the fixative 214. For example, the chamber 300 can store a desiccant and the chamber 310 can store a substance that evaporates to cool the fixative 214. In other embodiments, the cooling device 230 can include, without limitation, a refrigeration unit, a thermoelectric cooler unit, or like. The refrigeration unit can operate on a vapor-compression cycle, a vapor-absorption cycle, and the like. Thermoelectric cooler units can include, without limitation, one or more power sources (e.g., batteries) and Peltier devices that operate to cool, or heat, the fixative 214. In other embodiments, the cooling device 230 can allow expansion of gas to cool the fixative. For example, a fluid (e.g., $CO_2$ gas) can pass through a valve opened by a user to change the cooling device 230 from a non-cooling mode to a cooling mode. The fluid can flow through the opened valve and expand to absorb heat, thereby reducing the temperature of the fixative 214. The cooling capacity, configuration, and modes of operation of the cooling device 230 can be selected based on the volume of the fixative 214, pre-soak period of time, predicted ambient temperature range, and/or fixative properties.

Referring to FIGS. 20C and 20D, the monitoring system 232 can include a sensing element 330 positioned in the chamber 212, within a wall of the main body 240, on an outer surface 342 of the main body 240, or at another suitable location for detecting the temperature of the fixative 214. The sensing element 330 can include, without limitation, one or more thermistors, thermocouples, or other temperature sensors configured to periodically or continuously measure temperatures over a period of time. In some embodiments, the monitoring system 232 can further include a temperature data logger to store such measurements and/or a time-temperature indicator device capable of providing a cumulative time-temperature history. In some embodiments, one time-temperature indicator device measures the cumulative time-temperature history of the fixative 214 and another time-temperature indicator device measures the time-temperature history of the ambient environment. Exemplary time-temperature indicator devices can provide visual indications of the time history and may include, without limitation, a timer (e.g., a digital timer), a color changing temperature strip, a timer and/or temperature gauge based on dye diffusion through an absorbent strip, a temperature sensor, or combinations thereof, as well as memory, transmitters, receivers, and other storage or communication elements.

Figure 20E:
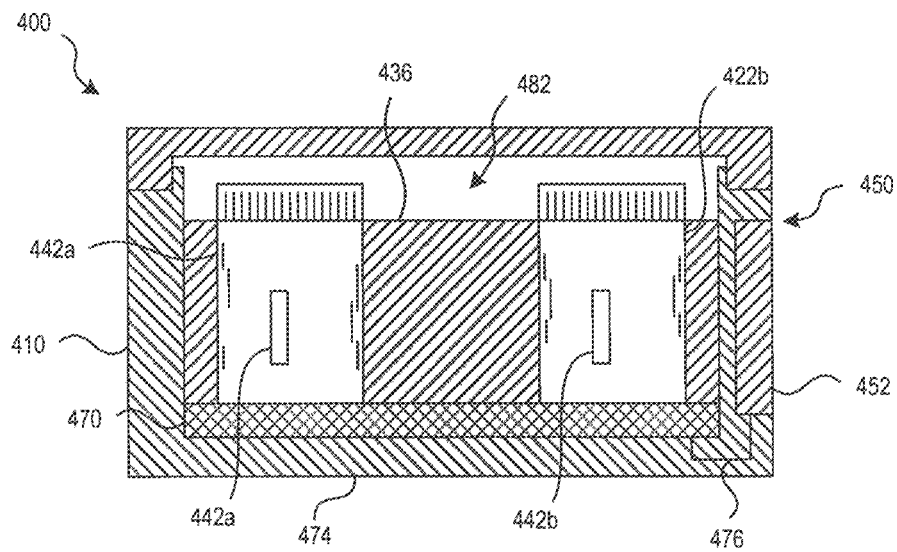
FIG. 20E is a cross-sectional view of the transporter system of FIG. 2.

FIG. 20E is a cross-sectional view of the transporter system 400 of FIG. 2. A cooling device 470 is positioned between the tray 436 and a bottom 474 of the main body 410. The cooling device 470 can include a thermoelectric unit, a cooling plate, or other component capable of actively removing heat from the tray 436, as well as the containers 422. The communication device 452 can provide power via a power line 476. Other types of cooling devices can be used to cool or heat the specimen containers 422.

The controller 450 can include input devices (e.g., a touch pad, a touch screen, a keyboard, or the like), peripheral devices, memory, controllers, processors or processing units, or combinations thereof. To store information, the controller 450 can also include memory that can include, without limitation, volatile memory, non-volatile memory, read-only memory (ROM), random access memory (RAM), and the like. The information can include, but is not limited to, patient information, measurements from the detection devices 442, protocols (including monitoring protocols, tracking protocols, etc.), data (including databases, libraries, tables, algorithms, records, audit trails, reports, etc.), settings, or the like. The measurements can include temperature measurements indicative of the temperature of tissue specimens. Such measurements can include the temperature of the walls of the specimen containers 422 or temperature of the fixative therein. When the transporter system 400 enters the laboratory, the controller 450 can communication information to processing equipment (e.g., tissue processing system) at the laboratory via a network, such as a wireless network at a pathology lab.

In some embodiments, the detectors devices 442 can be TOF sensors for measuring changes in the TOF of sound in tissue samples by, for example, comparing the acoustic waves outputted by the transmitter to the acoustic waves detected by the receiver. This comparison can be repeated any number of times to monitor the fixation state of the tissue samples. In some embodiments, the controller 450 determines a first length of time it takes the acoustic waves to travel through the tissue samples. The controller 450 can then determine a second length of time it takes a subsequently emitted acoustic wave to travel through the tissue samples. The first length of time is compared to the second length of time to determine, without limitation, a change in speed (e.g., acceleration) of the sound waves, an absolute and/or relative change in TOF, or combinations thereof. The TOF measurements can be used to monitor the diffusion process throughout transport.

Figure 20F:
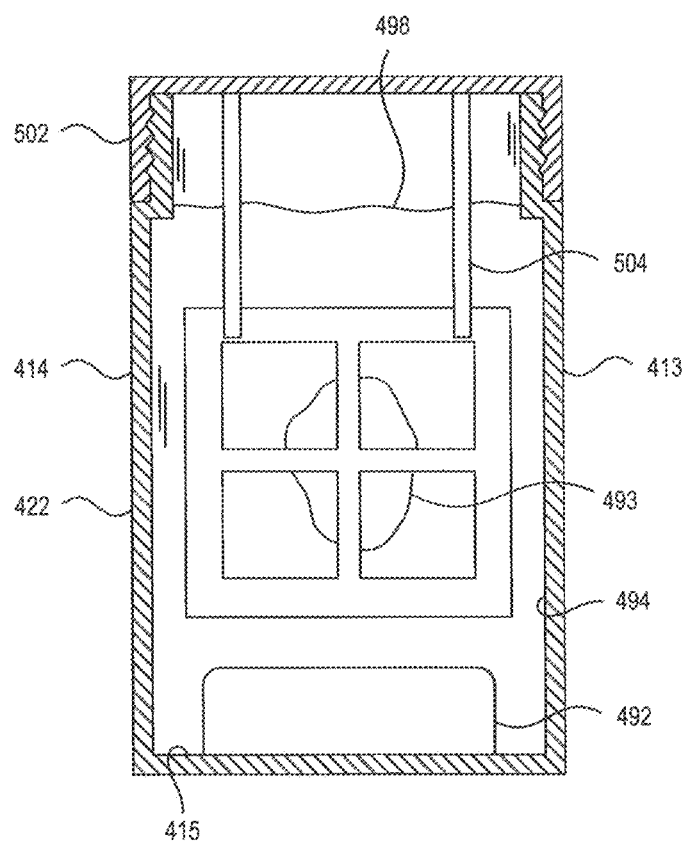
FIG. 20F is a cross-sectional view of specimen container in accordance with one embodiment.

Although the cooling device 470 can be configured to cool or heat the specimen containers 422 (and their contents), the specimen containers 422 can also include cooling devices. FIG. 20F shows a cooling device 492 positioned in a chamber 494. The cooling device 492 can be similar to the other cooling devices discuss herein, such as the cooling device 230. The cooling device 492 can reduce the temperature of a fixative 498 before, during, or after loading the tissue sample 493. In some embodiments, about 100 ml of fixative 498 can be cooled from an elevated temperature (e.g., room temperature of 22° C.–25° C.) to a lowered temperature (e.g., 4° C.) immediately prior to loading of the tissue sample 493. The cooling device 492 can continuously or periodically cool the fixative 498. During transport, the cooling device 492 can help reduce the temperature of the specimen container 422 to reduce thermal loading of the cooling device 492.

FIG. 20F shows the specimen container 422 having a closure 502 with a holder 504 for keeping the tissue sample 493 from contacting a wall 413 and/or bottom 415. In some embodiments, the holder 504 can be a clip. In other embodiments, the holder 504 can be a disposable or reusable cassette coupled to a cap.

Figure 20G:
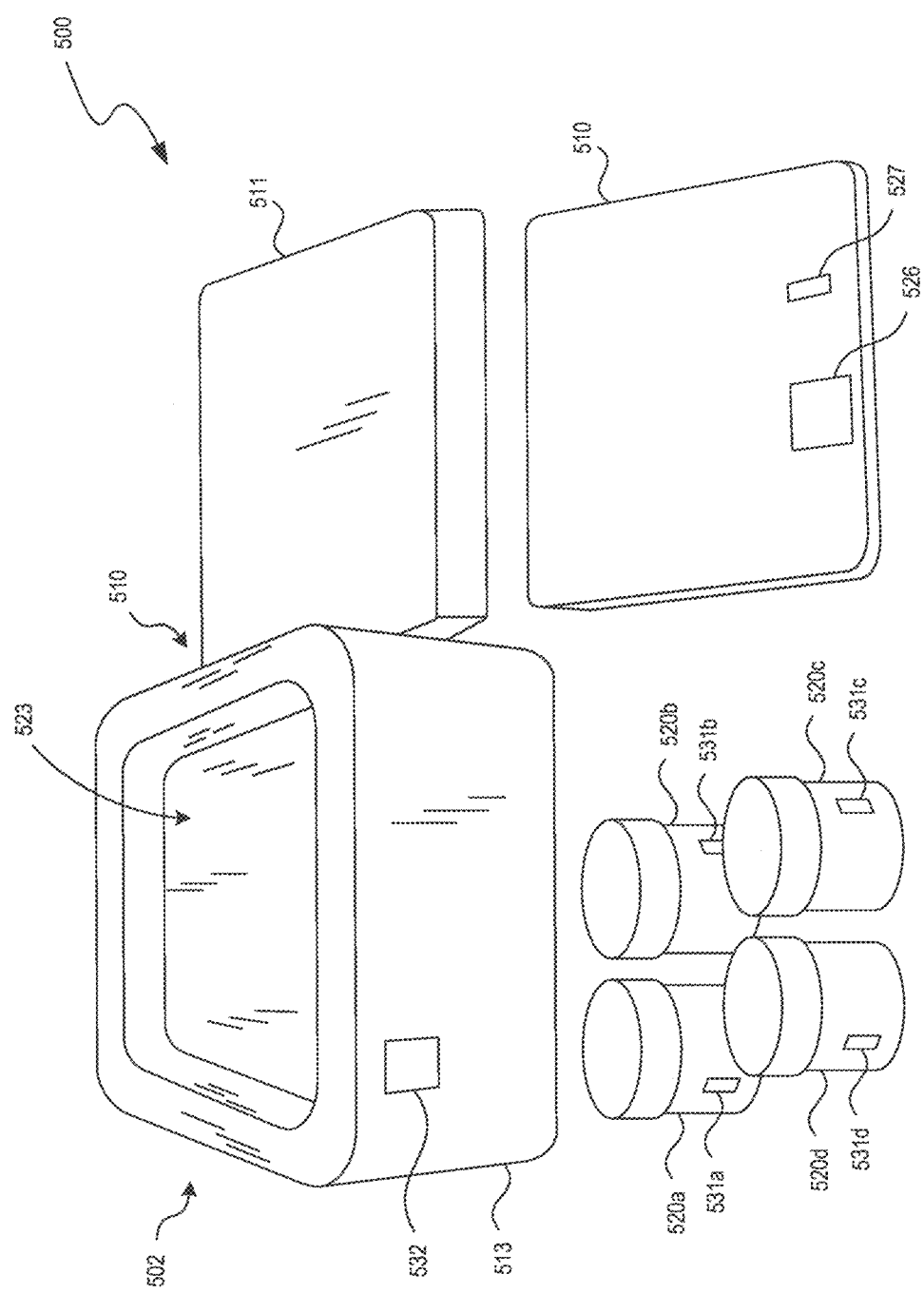
FIG. 20G is a perspective view of a transporter system in accordance with one embodiment.

FIG. 20G shows a transporter system 500 in accordance with another embodiment. The transporter system 500 includes a transport container 502, a cooling element 510, and specimen containers 520 (individually 520a, 520b, 520c, 520d). The containers 502 can be insulated pots pre-filled with fixative and kept in a refrigerator. One example of such a container can be CELLSTOR POT available from CellPath Ltd. (Newtown, Powys, UK). Other types of containers can also be used. The cooling element 510 can be in the form of a heat sink and can be stored in a freezer at a relatively low temperature (e.g., at a temperature less than about −20° C.) but in other embodiments can be a fixation inhibiting cooling device (including self-cooling devices). The transport container 502 can include a closure 511 (e.g., a cover or a lid) and a thermally insulated main body 513. The cooling element 510 can include a datalogger 526 and/or a temperature sensor 527 (e.g., temperature strip) to confirm that the cooling element 510 is at a desired temperature. To ship the sample, the cooling element 510 can be taken from the freezer and placed into a chamber 523. The temperature of the cooling element 510 can equilibrate to about 2° C. to about 4° C. The samples can be placed into the specimen containers 520 pre-filled with fixative and loaded into the main body 513. After loading the patient samples into the individual containers 502, a timer 532 can be activated to track (e.g., to track transport/processing time in formalin) each sample individually. The main body 513 can contain ice and/or chilled liquid to keep the containers 502 at a low temperature. The closure 511 can then be placed on the placed on the main body 513. The packed system 500 is then ready to be shipped or transported to a processing site.

Upon arrival at the processing site, the temperature strip 527 and/or temperature sensors 531 (individually 531a, 531b, 531c, 531d) can be checked to confirm that the fixative and/or tissue samples are within a desired temperature range (e.g., 2° C. to about 8° C.) and, in some embodiments, can be time-temperature strips that can be inspected to verify progression of dye (e.g., a blue dye) of at least 2 hours, but not more than 24 hours. The timer 532 can indicate the length of pre-soaking and/or shipping time. If additional cold time is needed to reach a target pre-soak period (e.g., 2 hours), the specimen containers 520 can be returned to the container 502 or kept in a chiller (e.g., a refrigeration unit) at a temperature of about 4° C. After the fixative has diffused through the tissue samples, the tissue samples can be transferred to a histology cassette and a tissue processor to perform a fixation process. In some fixative procedures, tissue samples are processed for about 2 hours in a fixative (e.g., 10% NBF-40% NBF) at about 45° C. If needed, the tissue samples can be held in alcohol (e.g. a 70% alcohol solution) for extended periods of time.

Figure 20H:
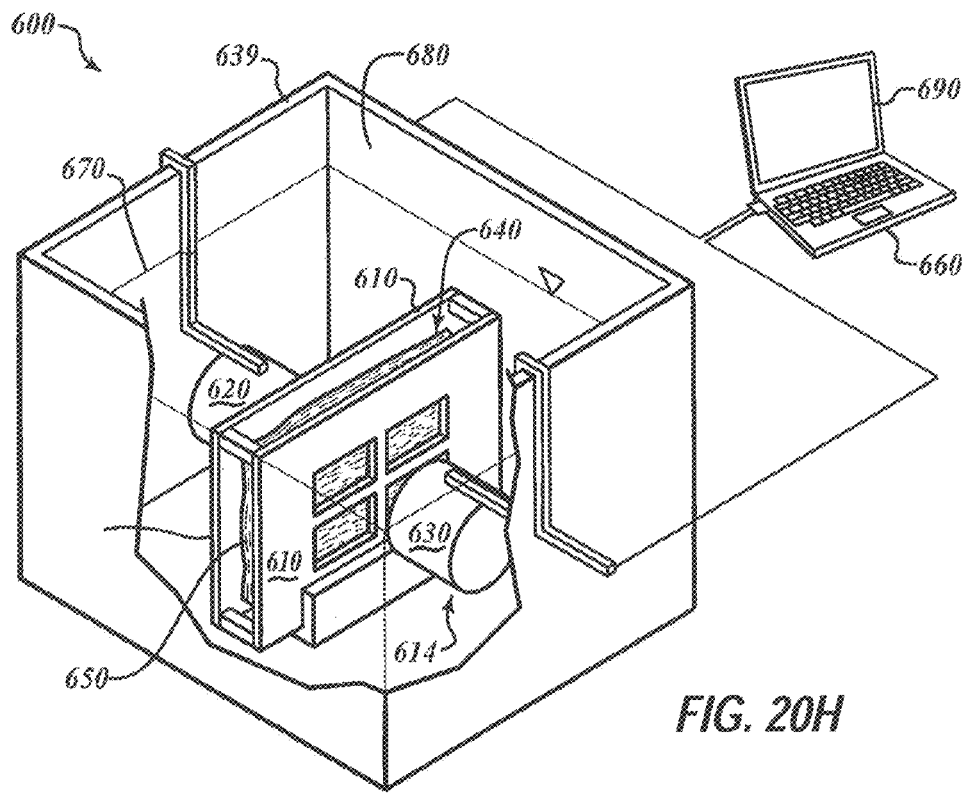
FIG. 20H is an isometric cutaway view of a processing system containing a specimen holder with a tissue sample in accordance with one embodiment.
Figure 20I:
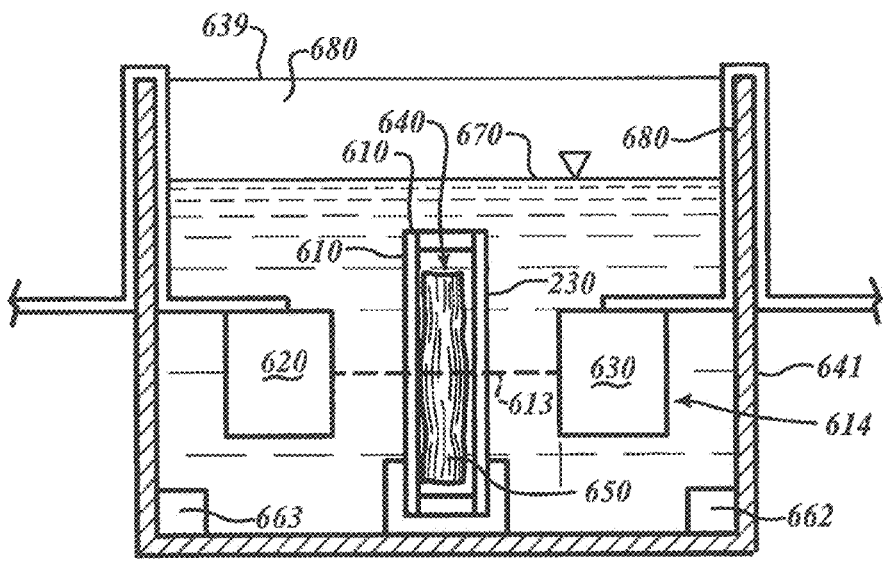
FIG. 20I is a side cross-sectional view of components of the processing system of FIG. 20H.

FIG. 20H shows a monitoring system 600 for analyzing tissue sample 640. FIG. 20I shows the container 639 with a chamber 680 filled with a processing media 670. The processing system 600 includes a specimen holder 610, a container 639 filled with media 670, and an analyzer 614 positioned in the container 641. The analyzer 614 includes a transmitter 620 and a receiver 630. A computing device or controller 660 is communicatively coupled to the analyzer 614. The specimen holder 610, the transmitter 620, and the receiver 630 are submerged in the processing media 670. A thermal device 662 (FIG. 20I) can increase or decrease the temperature of the media 670 to, for example, perform processes at different temperatures. The thermal device 662 can include, without limitation, one or more refrigeration devices, heaters (e.g., resistance heaters, electric heaters, etc.), thermoelectric devices (e.g., Peltier devices), or the like. Additionally or alternatively, a device 663 (FIG. 20I) can include a mixing element (e.g., a mixing rod, a mixer, etc.) for mixing or agitating the media 670.

To pre-soak a tissue sample 650 (e.g., to complete a partially completed pre-soak process), the media 670 can be a cold fixative at a temperature of about 0° C. to about 5° C. The computing device 660 can cause the transmitter 620 to output energy that passes through the tissue sample 650. The receiver 630 can receive the energy and can send signals to the computing device 660 in response to the received energy. The computing device 660 analyzes those signals to monitor processing. After the desired level of diffusion is achieved, the thermal device 662 can increase the average temperature of the media 670 to promote cross-linking. Once fixation is achieved, the sample 650 can be removed from the media 670. In other embodiments, the processing system 600 is used to only perform a fixation process.

In some embodiments, the transmitter 620 can output acoustic waves (e.g., infrasound waves, audible sound waves, ultrasound waves, or combinations thereof) such that propagation of the acoustic waves through the specimen 650 change because of changes to the tissue sample 650. During diffusion, the acoustic properties of the tissue sample 650 can change as the media 670 infuses the tissue sample 650. During cross-linking, mechanical properties (e.g., an elastic modulus) of the tissue sample 650 may change significantly as cross-linking progresses through the tissue. The change in elastic modulus may alter the acoustic characteristics of the tissue sample 650. Acoustic characteristics include, without limitation, sound speeds, transmission characteristics, reflectance characteristics, absorption characteristics, attenuation characteristics, or the like. To evaluate transmission characteristics, a time of flight of sound (e.g., audible sound, ultrasound, or both), the speed of sound, or the like can be measured. The TOF is a length time that it takes for acoustic waves to travel a distance through an object or substance. In some embodiments, the TOF is the length of time it takes acoustic waves to travel through a specimen in comparison to the time to travel through the medium displaced by the specimen. In some embodiments, the time of flight of the medium and the measurement device (e.g., the holder) may be recorded prior to insertion of the sample and stored for later reference so that it can be used for temperature compensation, evaporative losses, compensation protocols, predictive modeling, or the like. The thickness of the specimen 650 can be sufficiently large to produce a measurable change in the TOF. In reflectance embodiments, the TOF can be the length of the time the acoustic waves travel through a portion of the tissue sample. For example, the TOF may be the length of time that the acoustic waves propagate within a portion of the tissue sample. Thus, the TOF can be calculated based on acoustic waves that travel through the entire specimen, acoustic waves reflected by the tissue sample, or both.

The computing device 660 can evaluate the change in the TOF of sound in the tissue sample 650 by, for example, comparing the acoustic waves outputted by the transmitter 620 to the acoustic waves detected by the receiver 630. This comparison can be repeated any number of times to monitor the state of the tissue sample 650. In some embodiments, the computing device 660 determines a first length of time it takes the acoustic waves to travel through the tissue sample 650. The computing device 660 then determines a second length of time it takes a subsequently emitted acoustic wave to travel through the tissue sample 650. The first length of time is compared to the second length of time to determine, without limitation, a change in speed (e.g., acceleration) of the sound waves, an absolute and/or relative change in TOF, change in distance between the transmitter 620 and the receiver 630, change in temperature and/or density of the processing media 670, or combinations thereof. The computing device 660 can use different types of analyses, including a phase shift analysis, an acoustic wave comparison analysis, or other types of numerical analyses.

To store information, computing device 660 can also include memory. Memory can include, without limitation, volatile memory, non-volatile memory, read-only memory (ROM), random access memory (RAM), and the like. The information includes, but is not limited to, protocols, data (including databases, libraries, tables, algorithms, records, audit trails, reports, etc.), settings, compensation schemes, or the like. Protocols include, but are not limited to, baking protocols, diffusion protocols, fixation protocols, tissue preparation protocols, staining protocols, conditioning protocols, deparaffinization protocols, dehydration protocols, calibration protocols, frequency adjustment protocols, decalcification protocols, or other types of routines. Protocols that alter or impact tissue density or sound transmission can be used to control the components of the computing device 160, components of the analyzer 614, microscope slide processing units, stainers, ovens/dryers, or the like. Data can be collected or generated by analyzing the specimen holder 610, the processing media 670, the tissue sample 650, or it can be inputted by the user.

Figure 20J:
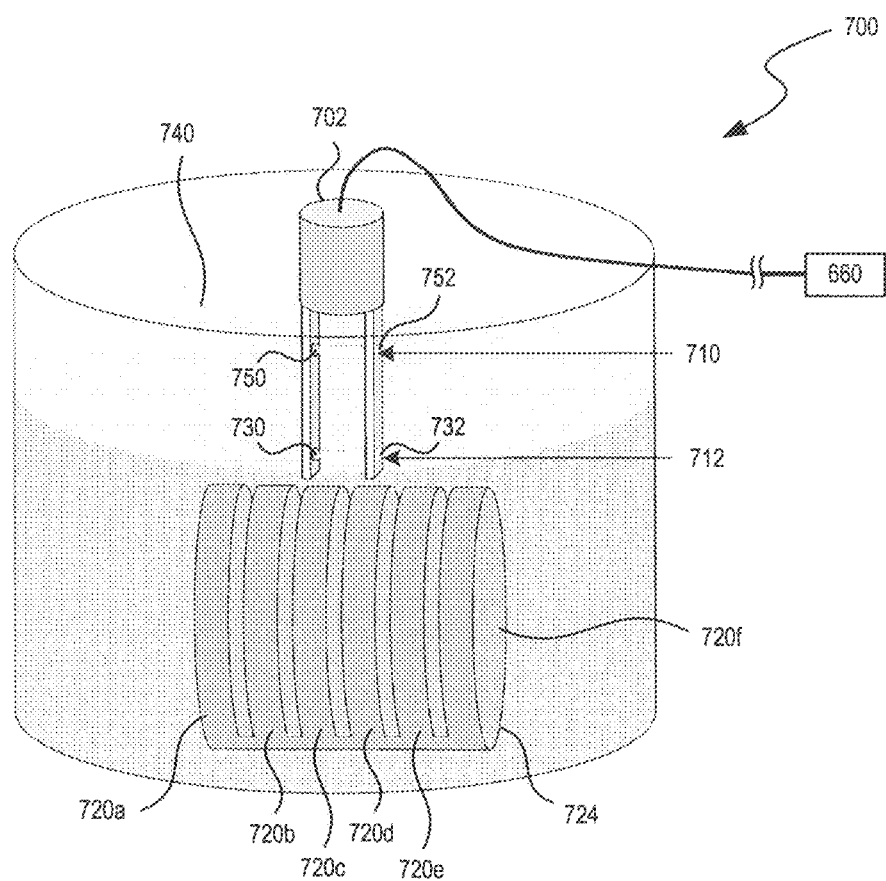
FIG. 20J is a schematic illustration of a monitoring system for analyzing a tissue sample in accordance with one embodiment.

FIG. 20J shows a monitoring system 700 that includes an analyzer 702 with a reference sensor 710 and a specimen sensor 712. The analyzer 702 can be moved to position one of the sections or portions 720 (individually 720a-f) between a transmitter 730 and receiver 732 of the specimen sensor 712, and the reference sensor 710 includes a transmitter 750 and a receiver 752. The computing device 660 can evaluate the characteristics of the portion 720 based on the output from the sensors 710, 712 and can compensate for temperature fluctuations.

Figure 20K:
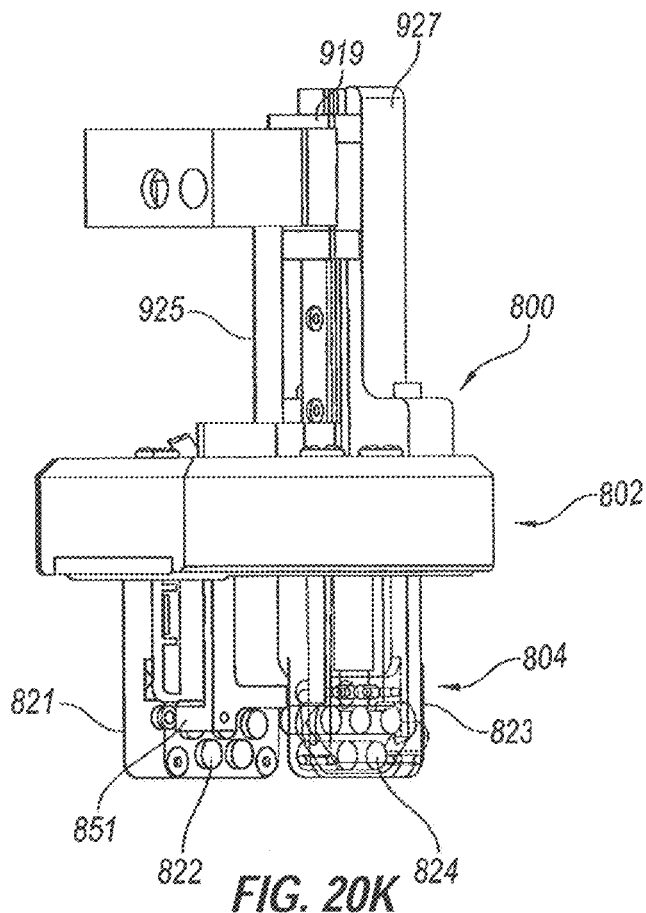
FIG. 20K is a front left side view of an analyzer in accordance with one embodiment.
Figure 20L:
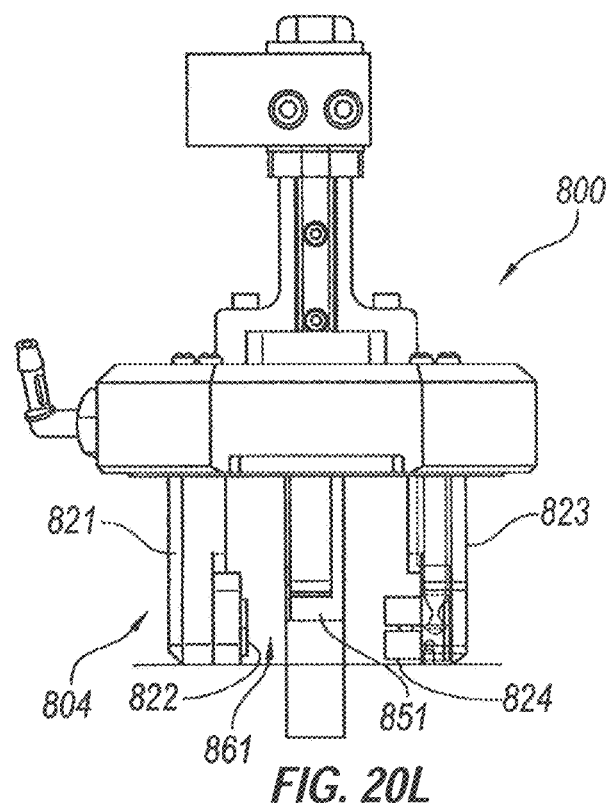
FIG. 20L is a front view of the analyzer of FIG. 20K.

FIG. 20K shows an analyzer 800 including a carrier assembly 802 with an acoustic sensor assembly 804. The sensor assembly 804 can include a transmitter unit 821 and a receiver unit 823. The transmitter unit 821 can include transmitters 822 (with one transmitter labeled 822). The receiver unit 823 can include receivers 824 (with one transmitted labeled 824) that receive acoustic waves from respective transmitters 822. The pattern, position, and spacing of the transmitters 822 and receivers 824 can be selected based on the tissue specimens to be analyzed. FIG. 20L shows the carrier assembly 802 further including a specimen holder 851 positioned to hold a tissue sample at a detection zone 861. In some embodiments, the specimen holder 851 can hold a cassette or other type of holder.

Figure 21A:
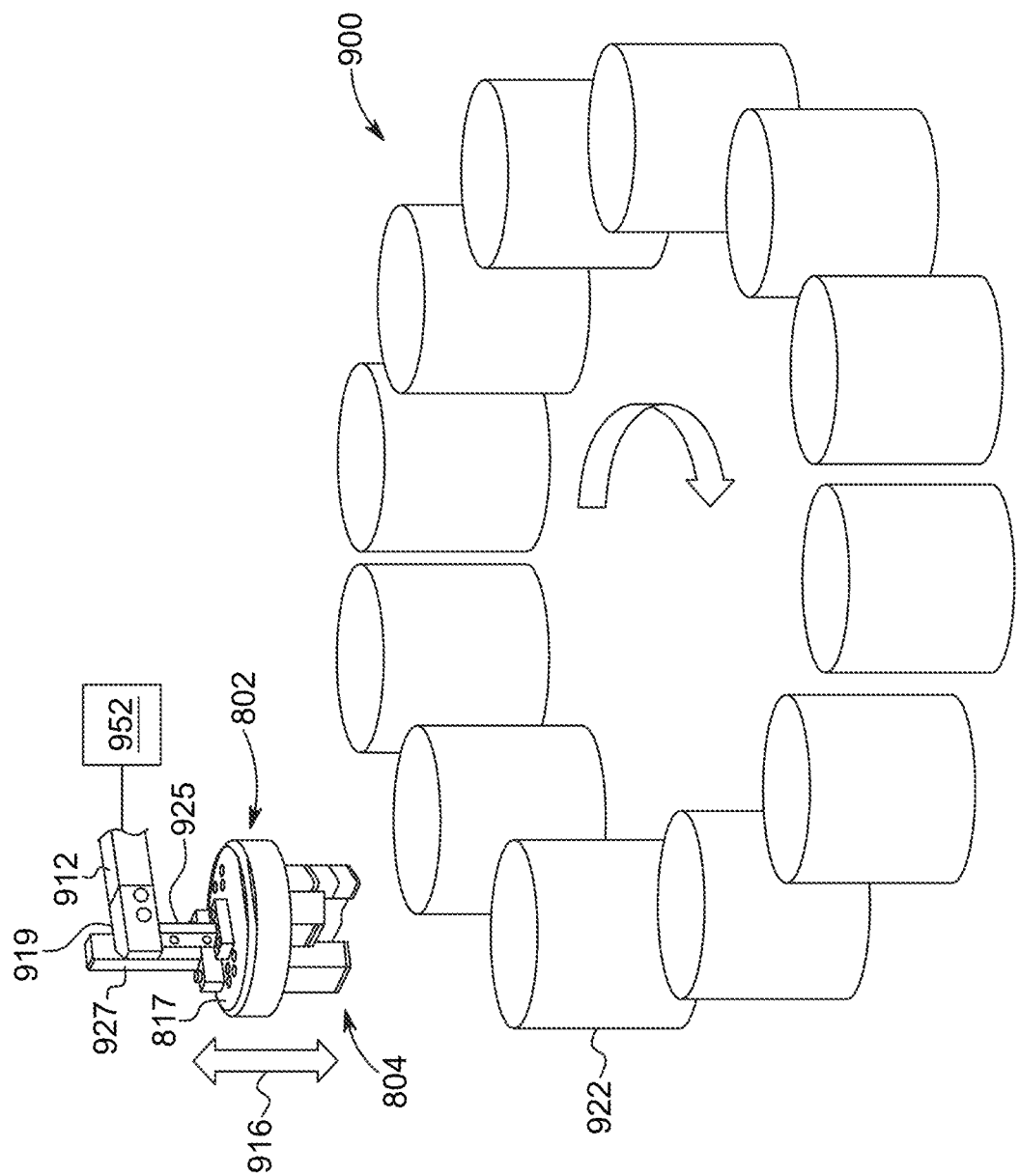
FIG. 21A is an elevational view of a processing system capable of performing multiple treatments on tissue samples in accordance with one embodiment.

FIG. 21A is an isometric view of a tissue processing apparatus 900 including containers (one container is labeled 922) holding reagents. A transport mechanism 912 can move the carrier assembly 802, as indicated by arrow 916, to submerge the sensor assembly 804 and tissue sample in reagent baths. The transport mechanism 912 can include, without limitation, a 3-axis handling robot or other type of robotic equipment. A carriage 919 can be moved along a rail 927 to lower the carrier assembly 802, such that a cover 817 closes the container 922. A sealing member can be used to form a seal between the cover 817 and the container 922. A shaft 925 can be moved to move the specimen holder 851 relative to the sensor assembly 804. For example, the specimen holder 851 can be moved from a first position (shown in FIG. 20L) to a lowered position (shown in phantom line in FIG. 20L). After the carrier assembly 802 is moved from a raised position to a lowered position, the sensor assembly 804 can analyze the submerged tissue specimen and sequentially scan multiple positions in the vertical direction, thus allowing to the sensor assembly 804 to obtain a 2-dimensional image or impression of the sample and its related TOF profile. A computing device 952 is communicatively coupled to the sensor assembly 804 and can evaluate the specimen based on time of flight changes. In some embodiments, including the illustrated embodiment, one container 922 can hold a fixative, and other containers can include other processing media, such as clearing agents (e.g., xyline or the like), infiltrations, dehydration agents, or reagents. After fixing, the specimens can be sequentially delivered to other containers.

Figure 21B:
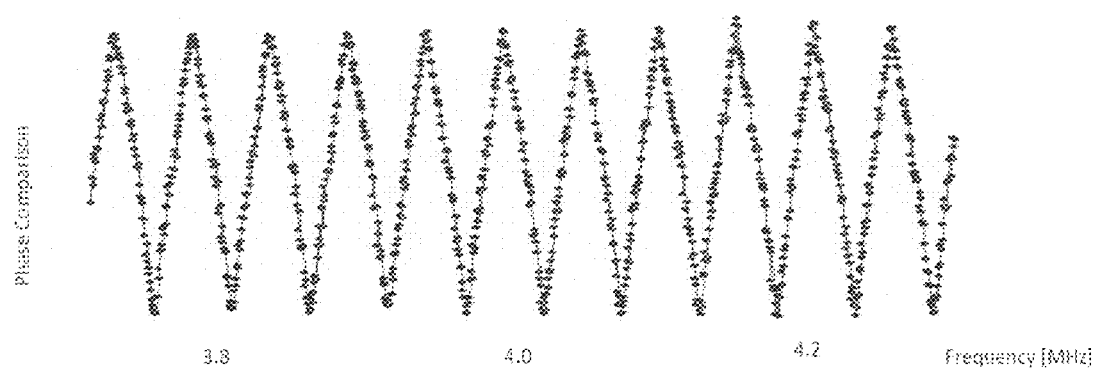
FIG. 21B is a plot of frequency versus phase comparison in accordance with one embodiment.

FIG. 21B is a plot of frequency versus phase comparison in accordance with one embodiment. A programmable function generator can generate many sine waves at different frequencies. By measuring the phase difference at each frequency, we can reconstruct the actual time-of-flight. A comparison can be performed as a function of frequency to unique time of flights. As shown in FIG. 21B, the comparison wave can be a generally triangle wave with a slope corresponding to the time-of-flight. TOF can also be determined based on techniques disclosed in U.S. application Ser. No. 13/372,040, filed on Feb. 13, 2012, and incorporated by reference in its entirety.

Figure 21C:
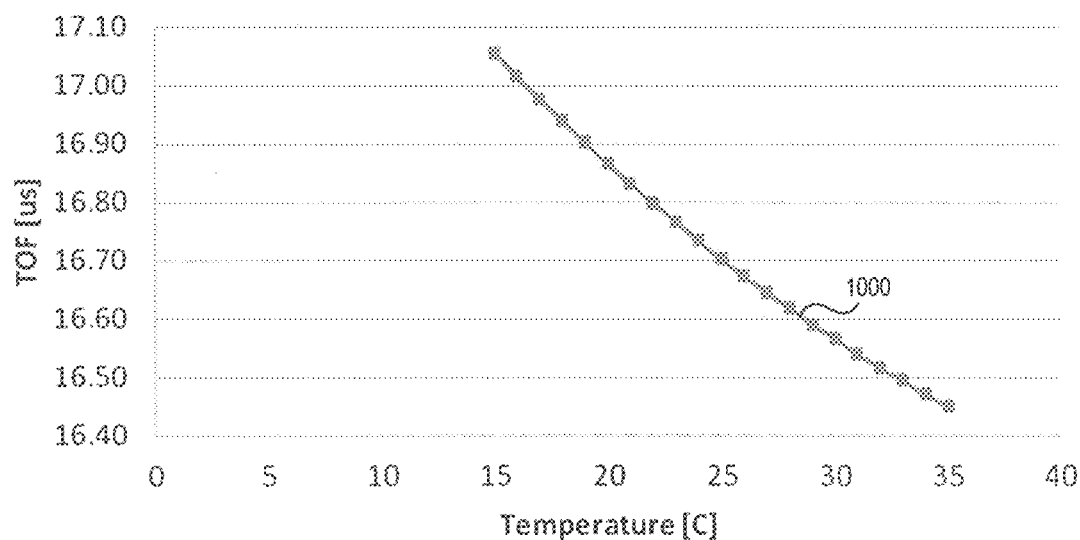
FIG. 21C is a plot of temperature versus time of flight in a media.

FIG. 21C is a plot of temperature versus time of flight in media. The curve shows the media time of flight gradually decreasing as the temperature of the media increases. As such, temperature changes can cause significant changes to time of fight. In some fixation medias, every degree (e.g., every ° C.) of change can change the target signal by about 30 nanoseconds in a 25 mm acoustic path. The 25 mm acoustic path can include 20 mm of media (i.e., the distance through the media) and 5 mm through the tissue sample. Because the length of the acoustic path is longer in the media (i.e., the media path of 20 mm is greater than the 5 mm thickness of the tissue sample), the changes in the media's time of flight can be minimized or limited by controlling the temperature of the media. In some embodiments, the temperature of the media can be held at a generally constant temperature to minimize or limit changes in time of flight caused by temperature changes.

Figure 21D:
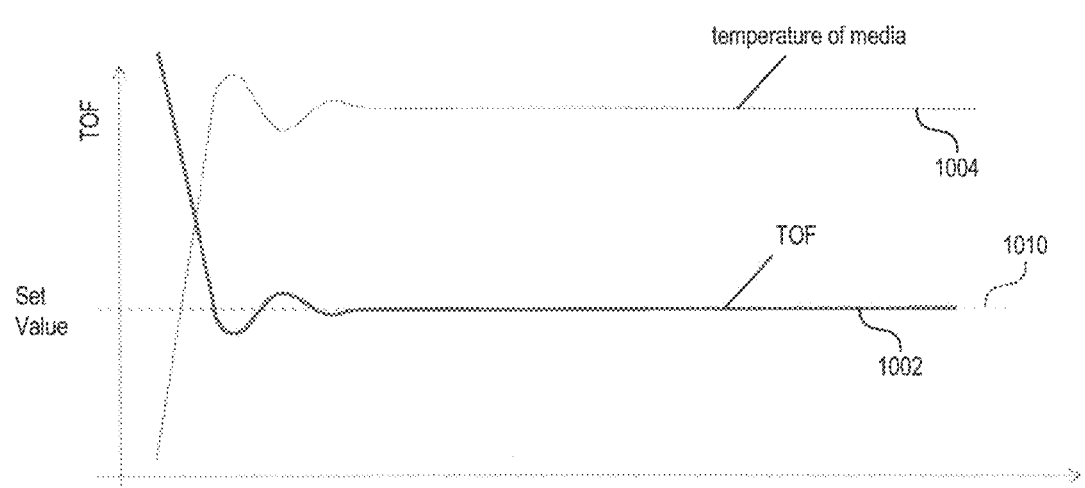
FIG. 21D is a plot of time versus time of flight for a tissue sample and time of flight for media.

Different schemes can be used to compensate for environmental conditions. FIG. 21D shows a tissue sample time of flight curve 1002 and a media temperature curve 1004. In one compensation scheme, a reference path time of flight readout is used in a control scheme. For example, a controller can operate on a proportional-integral-derivative (PID) control loop using a set value 1010 of the total time of flight. The set value 1010 can be close to the target temperature. The controller can also apply a proportional term correction to achieve temperature control of the media on the order of $\frac{1}{100}$° C. relative precision. This can result in time of flight variation of the media of less than 1 nanosecond, thereby allowing better interpretation of the true time of flight of the target tissue. Other compensation schemes can also be used to compensate for temperature changes, as well as other environmental conditions (e.g., temperature fluctuations during shipping).

Figure 21E:
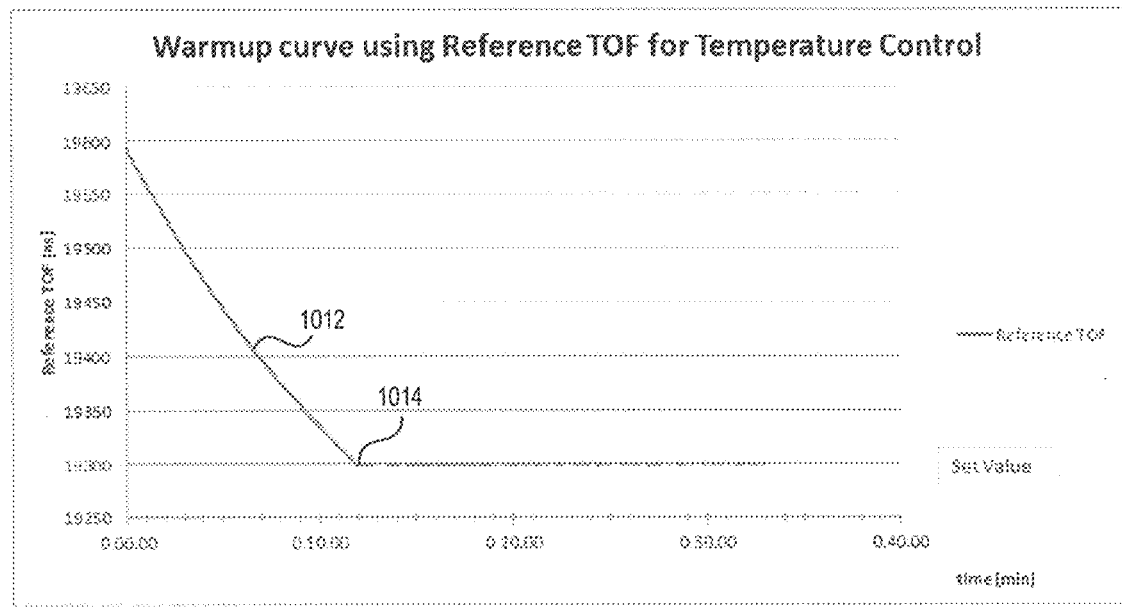
FIG. 21E is a plot of time versus a reference time of flight.

FIG. 21E is a plot of time versus a reference time of flight. Curve 1012 is a warmup curve using a reference time of flight for temperature compensation. The reference time of flight gradually decreases until reaching a generally constant time of flight 1014 at a steady state temperature.

Figure 21F:
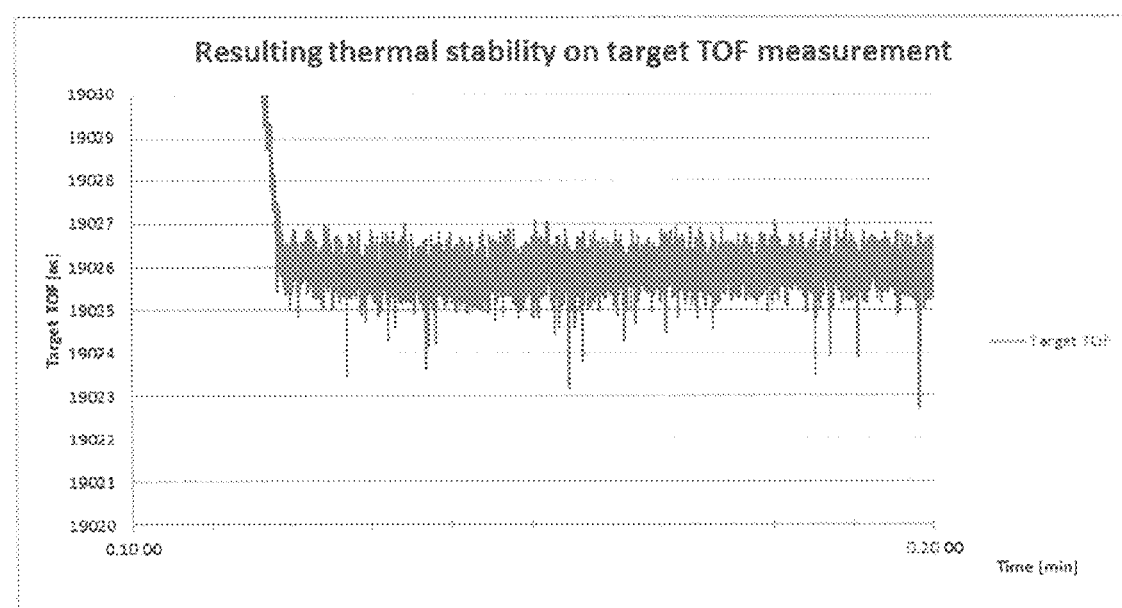
FIG. 21F is a plot of time versus a target time of flight.

FIG. 21F is a plot of time versus a target time of flight. The curve is a thermal stability curve for a target time of flight of a target sample. The curve can be obtained using the analyzers, systems, and techniques disclosed herein. The general shape of the curve of FIG. 21F is driven by the media TOF changes associated with temperature changes.

Figure 21G:
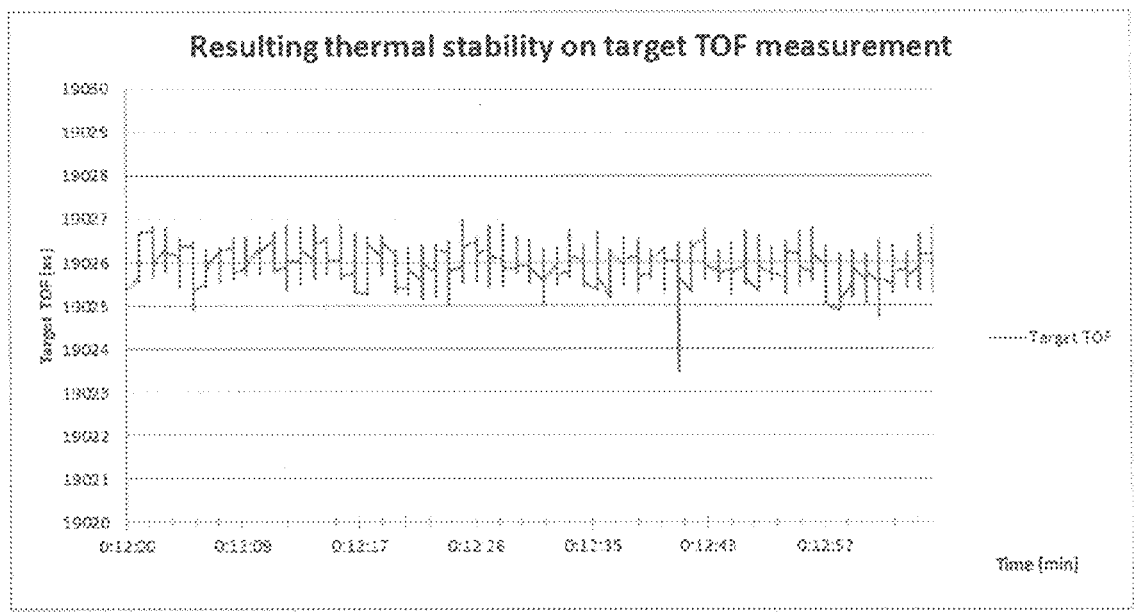
FIG. 21G is a plot of time versus time of flight for a tissue sample.

FIG. 21G is a plot of time versus the target time of flight using the curve 1012 (FIG. 21E) to compensate for temperature changes. The systems disclosed herein can include different data sets, curves, curve fitting algorithms, and compensation algorithms or schemes to minimize or limit changes in time of flight caused by temperature changes of the media. The curve of FIG. 21G corresponds to the time of flight of the target sample where the temperature contribution is eliminated. As such, temperature changes associated media (e.g., temperature changes associated with transport or shipping) can be eliminated. The target signal to noise ratio can be increased by applying various methods, such as averaging, filtering, Fourier analysis, and/or elimination of periodic signals. Other techniques can be used to enhance signal detection.

Exemplary Two-Temperature Formalin Fixation Methodology

Two-temperature formalin fixation has been identified as a novel solution to the problem posed by traditional formalin fixation methodologies. Longitudinal research has indicated that heat-assisted formalin fixation, which dramatically reduces fixation time and has become the gold-standard of laboratories worldwide, can compromise the quality of histology samples, resulting in downstream diagnostic errors, especially in biomarker-based applications (including phosphoprotein assays). In addition, as the field of companion diagnostics (which necessitates multi-site, multi-institutional cooperation) expands, continued variation in fixation protocols from lab to lab has been identified as a significant impediment to accurate pathological analysis, and to the development of properly targeted diagnostics and therapies.

Ventana Medical Systems, Inc. has developed a two-temperature, rapid formalin fixation protocol that reduces fixation time and is optimized for use across a broad range of tissue types through better preservation of histomolecular features, according to an exemplary embodiment. The two-temperature process involves soaking the tissue specimen in precooled formalin for up to five minutes and then letting the sample soak for two hours at 4° C., and another two hours at 45° C., according to an exemplary embodiment. This can be generally performed on standard laboratory equipment such as an ice bucket or heating plate, in an exemplary embodiment. Finally, dehydration, clearing, paraffinization, embedding and sectioning are generally performed in an automatic standalone tissue processor (such as, e.g., but not limited to, Leica, Sakura, Avantik, etc.), according to an exemplary embodiment.

Exemplary Sample Collection, Transport and Tracking Solution

Ventana Medical Systems Inc. has devised an integrated specimen collection and transport solution that ensures specimens are optimized for subsequent staining and analysis using a cold packing method that can include the first half of the two-temp fixation process, according to an exemplary embodiment. By the time the pack is opened at the anatomical pathology (destination) laboratory, the specimen has been properly fixed at the appropriate cold temperature, according to an exemplary embodiment. The specimen can then be heated up, using, e.g., but not limited to, standard laboratory equipment or specialized Ventana hardware, etc., for the requisite two hours, and can be subsequently ready for tissue processing, according to an exemplary embodiment.

The integrated system can also provide digital tracking, in the form of specimen temperature and time recording that can enable pathology professionals to monitor conditions that may affect subsequent processing or analysis, according to an exemplary embodiment. The system is designed for use with either paper-based laboratory request forms, or a digital e-LRF pen that accompanies the specimen throughout its journey and allows for paperless routing, as well as enhanced specimen tracking that can be synced to wireless devices or uploaded for cloud computing, according to an exemplary embodiment.

Methodological and Logistical Problems of Conventional Transport and Tracking

Some of the problems with conventional best-practice histology sample, collection, and transport methodologies include the following:

Current room-temperature fixation protocols do not preserve phosphomarkers sufficiently.

Tissue storage after removal is not sufficiently standardized with respect to phosphomarker preservation; this can result in some specimens even being left without formalin over the weekend in a refrigerator. The lack of rigid adherence to set protocols across institutions and sites often results in widely varying degrees of histomolecular degradation. This compromises downstream processing, especially in samples subjected to a variety of biomarker-based diagnostics.

Current, standard specimen collection containers general contain a single, initially-submerged tissue sample that does not stay in place during transport. This results in the tissue often floating up to the surface, or adhered to the side of the wall of the container, thus compromising the amount of contact each sample has with the fixative fluid, the perfusion of which is critical for proper preservation and subsequent processing of the sample.

Fixative fluid spills as a result of inversion or jostling.

Variations in ambient temperature during transport, which has been known to affect efficacy of fixative.

Operator exposure to caustic fumes during handling.

Exemplary problems with conventional standardized tracking methodologies include:

General best-practices may vary intra- and inter-institutionally in spite of barcode labeling.

Current methodologies rely heavily on paper and individualized computer input which may also vary from institution to institution; chain of custody is established through a series of signatures.

Real-time tracking of the computer specimen is paper-based and cannot provide an up-to-the-minute accounting of temperature, location and transport time.

The end result of these challenges is questionable sample quality (phosphomarker preservation may not correctly reflect the original state of the tissue) and lack of traceability during processing. These are unacceptable risks when dealing with oncology patients.

An Exemplary Embodiment of the Solution

According to an exemplary embodiment, a sample collection, transport and tracking system is an integrated solution for the above-referenced challenges. In an exemplary embodiment, the example sample collection, transport and tracking (SCTT) system can provide superior, digitized packing that can begin the process of optimized formalin fixation without supervision by a laboratory technician. The cold part of the fixation process can happen while the specimen is in transit, according to an exemplary embodiment. By beginning the cold part of the fixation process in transit, then once the specimens reach their destination anatomic pathology laboratory, the specimens need only be heated the requisite 2 hours (at 45° C.) to achieve substantially higher quality (for biomarker-based diagnostics and treatment) fixation for subsequent processing, staining and analysis, according to an exemplary embodiment.

According to an exemplary embodiment, the container itself can offer jostle- (and potentially spill-, as discussed further herein in FIGS. 28, 35, 37, 38, 39A and B, 40A-D, 41A-D, 42A and B, 43A-C, and 44A-E) proof, fully submerged tissue transport that can minimize operator contact and can ensure (e.g., but not limited to, through monitoring and feedback alarms, etc.) steady thermal conditions. The entire process, according to an exemplary embodiment, can be recorded and/or monitored, with, e.g., but not limited to, real-time feedback to wifi-connected tablet, and a digital pen that can establish a chain-of-custody from surgery/excision, through transport and handling, to laboratory processing and subsequent analysis. In an exemplary embodiment, the digital pen can be based on optical character recognition technology and can accompany the tissue handling pod (containing an exemplary four samples, in an exemplary embodiment, as illustrated in FIG. 3), which can enable surgeons, technicians, transporters, pathologists to pull up complete tissue data (e.g., but not limited to, tissue donor, testing protocol, temperature and/or time log, etc.) at any point along the specimen's journey, in an exemplary embodiment.

This integrated solution, according to an exemplary embodiment, therefore can result in, e.g., but not limited to, 1) superior formalin fixation results for a broader range of biomarker-based diagnostics, including, e.g., novel phosphomarker preservation previously only possible in fresh frozen specimens; 2) a processing time that is compatible with standard fixation protocols (depending on tissue type); 4) cold preservation of volatile markers for up to 72 hours; 4) error-free, fully electronic tracking establishing chain of custody that can be readily accessed from digital tablets and/or uploaded for cloud computing; 5) a unique tissue suspension system that keeps specimens fully, properly submerged with fluid fixative in spite of potential inversion or jostling; 6) a real-time recording of thermal conditions and time that can be used to gauge whether additional measures will be necessary at destination to ensure optimal processing, including staining.

Exemplary Kit Inventory

The specimen collection kit, according to an exemplary embodiment, can be, and should be, assembled before going to the sampling site to collect the specimen and should contain the following items: (See FIG. 26 for an exemplary full cold tissue kit and FIG. 3 for an exemplary cold tissue assembly; and for full room temperature tissue kit and assembly, the assembly of FIG. 3, the depicted kit and assembly, except without cooling components 2206, 2208, 2214, and 2216)

3) 4 vials filled with 10% (alternatively, 30%) NBF;

4) 4 total pods with Tempod dataloggers (alternatively, with cryopack dataloggers);

5) 1 GreenBox with phase change blocks and vacuum insulated panels;

6) 1 cardboard shipping box for each GreenBox;

7) (Paper option) 4 Lab Request Forms (one for each Specimen); and 8) (Electronic option) Digital pen and associated software (for all specimens).

Figure 22:
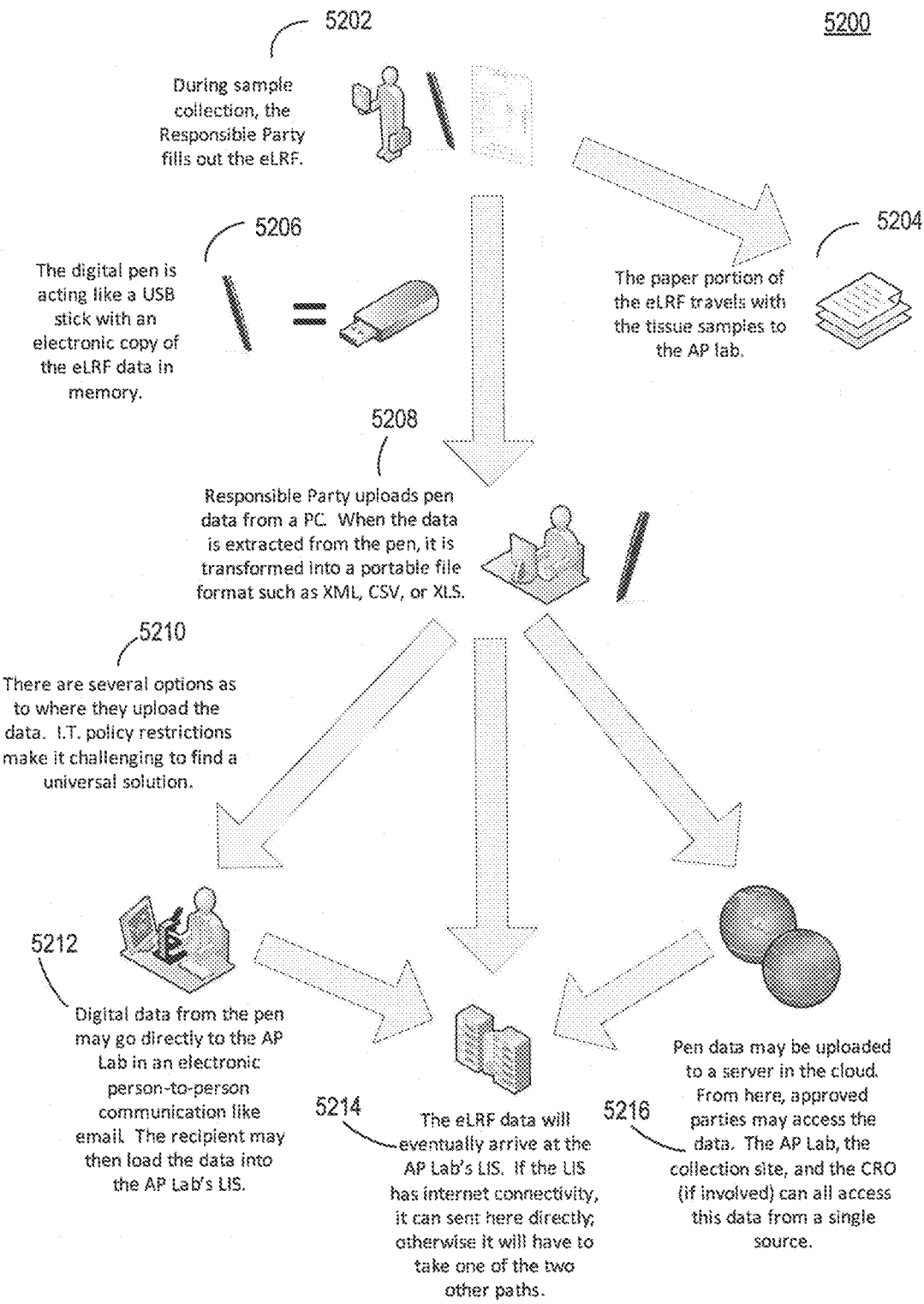
FIG. 22 is an example process flow diagram illustrating an example workflow variation between paper forms and e-LRF pen, illustrating example information flow from pen to laboratory information system (LIS).

How the Exemplary Components Work Together:

FIG. 22 is an example process flow diagram 5200 illustrating an example workflow variation between paper forms and e-LRF pen, illustrating example information flow from pen to laboratory information system (LIS), according to an exemplary embodiment.

Flow diagram 5200 can begin with 5202, where during sample collection, the responsible party can fill out the eLRF, according to an example embodiment. From 5202, flow diagram 5200 can continue with 5204, or 5206, according to example embodiments.

In 5204, the paper portion of the eLRF can travel with the tissue samples to the AP lab, according to an example embodiment. From 5204, flow diagram 5200 can end.

In 5206, the digital pen can act like an USB stick with an electronic copy of the eLRF data in memory, according to an example embodiment. From 5206, flow diagram 5200 can continue with 5208.

In 5208, the responsible party can upload the pen data from a PC, for example, according to an example embodiment. When the data is extracted from the pen, the data can be transformed into a portable file format such as, e.g., but not limited to, extensible markup language (XML), CSV, or XLS. From 5208, flow diagram 5200 can continue with 5210, 5214, or 5216.

In 5210, there can be several options as to where the responsible party can upload the data, and information technology (IT) policy restrictions can make it challenging to find a universal solution, according to an example embodiment. From 5210, flow diagram 5200 can continue with 5212.

In 5212, the digital data from the pen may go directly to the AP laboratory in an electronic person-to-person communication like email, according to an example embodiment. The recipient may then load the data into the AP Lab's LIS, according to one embodiment. From 5212, flow diagram 5200 can continue with 5214, according to an example embodiment.

In 5214, the eLRF data can eventually arrive at the AP Lab's LIS, according to an example embodiment. If the LIS has internet connectively, the LIS can send the eLRF data directly; or the eLRF data can take one of the other paths to 5214, according to an exemplary embodiment. From 5214, flow diagram 5200 can end, according to an example embodiment.

In 5216, pen data can be uploaded to a server in the cloud, according to an example embodiment. From this uploaded data, approved parties can access the data. The AP Lab, the collection site, and the CRO (if involved) can all access this data from a single source, according to an exemplary embodiment. From 5216, flow diagram 5200 can continue with 5214, according to an example embodiment.

NBF vials (e.g., FIGS. 28, 35A-I, 37, 38, 39A and B, 40A-D, 41A-D, 42A and B, 43A-C, and 44A-E)

Figure 23A:
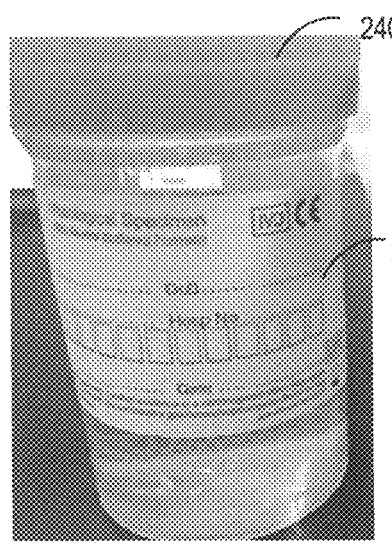
FIG. 23A is an exemplary sample vial.

FIG. 23A illustrates an exemplary sample vial 2302, according to an exemplary embodiment. The exemplary sample vials 2302 can be filled with 10% neutral buffered formalin (NBF), according to one exemplary embodiment. The exemplary specimen vials 2302 may also contain the 30% NBF for an exemplary further acceleration/optimization of the fixation process, according to one exemplary embodiment. The sample vials have mini-cassettes clamped to the underside of the specimen lid. This is the mechanism whereby tissues are suspended upside-down in fluid. This orientation and cap design allow tissue to remain submerged in spite of any vial or box manipulations/inversions.

FIG. 23A is an exemplary sample vial 2302, shown in illustration with an exemplary specimen lid 2402 affixed thereon using an exemplary threaded screw coupling.

Figure 23B:
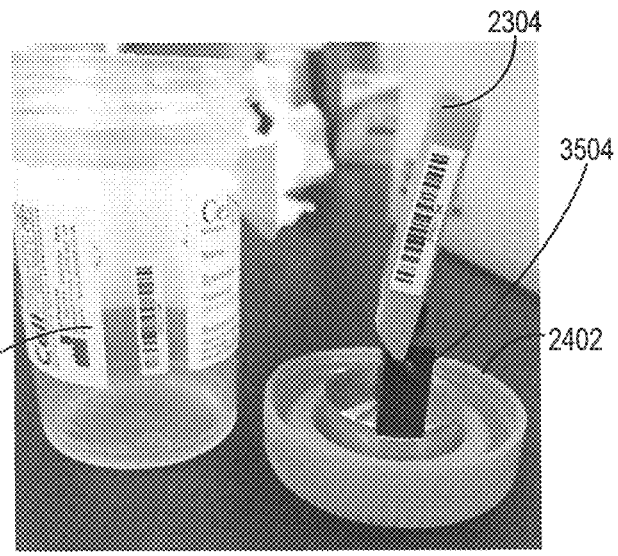
FIG. 23B is an example vial along with an example specimen lid with clip and a cassette clipped to the lid.

FIG. 23B depicts an example vial 2302 with exemplary screw threading, along with an example specimen lid 2402 (discussed further herein with reference to FIG. 4) with exemplary clip 3504 (discussed further below with reference to FIG. 35) coupled thereto, and an exemplary cassette 2304 (discussed further below with reference to FIG. 23) clipped to the lid 2402 via the clip 3504, according to an exemplary embodiment.

Figure 23C:
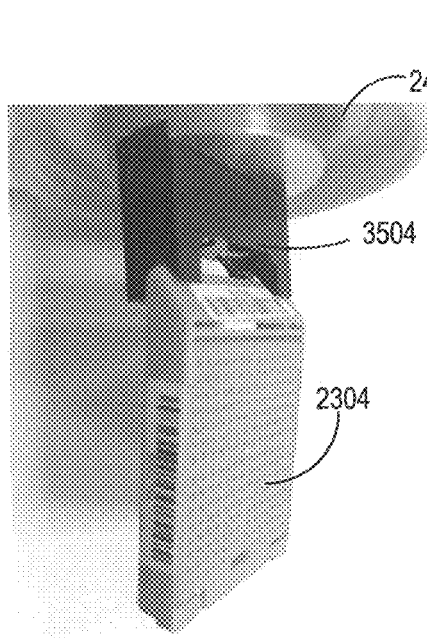
FIG. 23C is another view of the cassette being inserted into the clip coupled to the specimen lid.

FIG. 23C is another view of the cassette 2304 being inserted into the clip 3504 coupled to the specimen lid 2402, according to an exemplary embodiment.

Figure 23D:
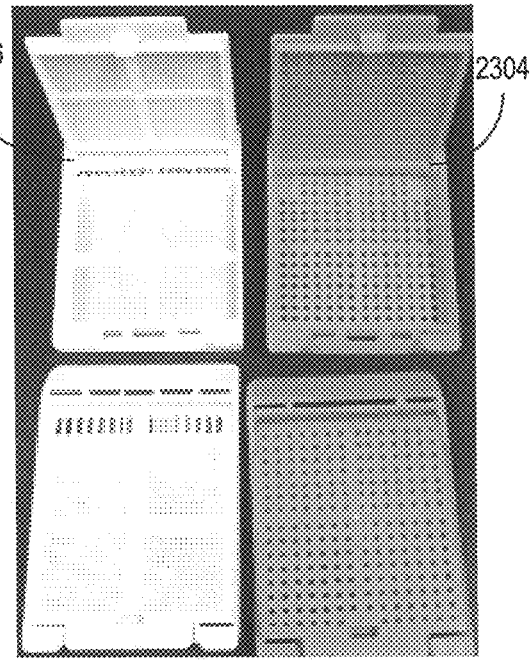
FIG. 23D illustrates exemplary cassettes in open and closed positions.

FIG. 23D depicts exemplary cassettes 2304, 2306 in an open position, and a closed position, according to an exemplary embodiment.

Figure 24:
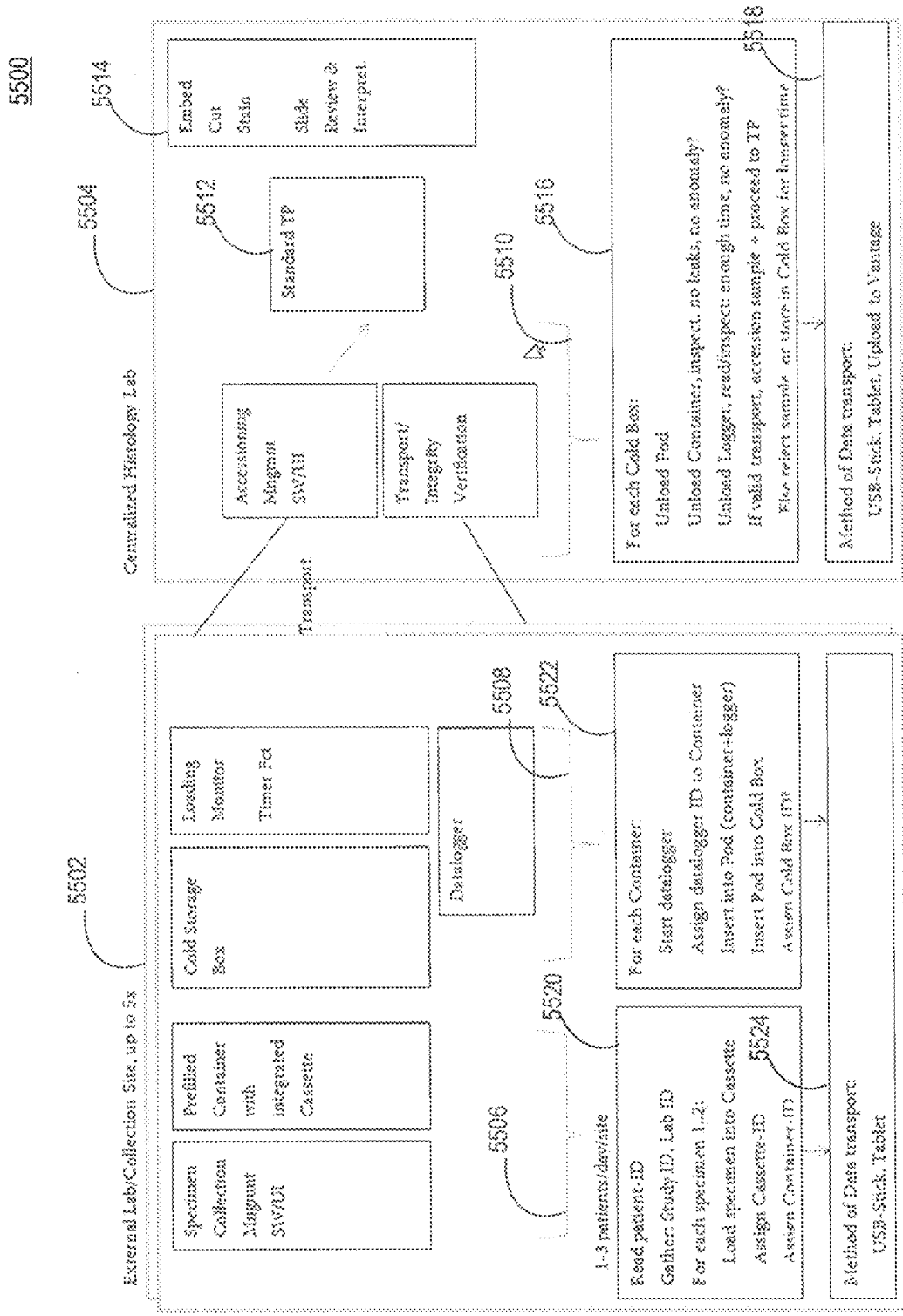
FIG. 24 is an expected interactions process before processing.

FIG. 24 is an example diagram 5500 of expected interactions process before processing, according to an exemplary embodiment. Diagram 5500 illustrates external lab/collection site, of up to five, or more sites 5502, may then be transported to an example centralized histology lab 5304, in an example embodiment. Collection site 5502 can include, in combination 5506, a specimen collection management software and user interface, as well as a prefilled container with integrated cassette 2218. As noted, combination 5506, for 1-3 patients/day/site, processing can be provided, or various data gathered 5520 (such as, e.g., but not limited to, patient-ID, Study-ID, LabID, and for each specimen, load the specimen into a cassette 2304, assign a cassette-ID, assign a container-ID to vial 2302 of pod 2404, etc.) and can be provided to a method of transport 5524, according to an exemplary embodiment. Collection site 5502 can also include, in combination 5508, a cold storage box 2200, as well as a loading monitor and a datalogger 2406, 2408, in an example embodiment. As noted, from combination 5508, processing can be provided 5522, including, e.g., but not limited to, for each container or pod 2404, starting a datalogger 2406, 2408, assigning a datalogger-ID to vial 2302, container or pod 2404, inserting into pod 2404, and can be provided to a method of transport 5524, in an exemplary embodiment. The centralized histology lab 5504 can include combination 5510, including accessioning management software and/or user interface, and transport/integrity verification processing, in an example embodiment. The accessioning management software, in an example embodiment, can provide standard transport (TP) 5512, and embed, cut, stain, slide review and interpretation processing 5514, in an example embodiment. Combination 5510 can provide output to processing 5516, which can, for each cold box, provide processing including, e.g., but not limited to, unloading pod, unloading container, inspecting for no leaks and/or no anomaly, unloading logger, reading/inspecting for enough time, and/or no anomaly, and if valid transport, accession sample and proceed to TP, or else reject the sample, or store in the cold box 2200 for a longer time, in an example embodiment. From 5516, output can be provided to 5518 including a method of data transport, such as, e.g., but not limited to, USB-stick, tablet, uploading to vantage, etc., in an example embodiment.

Figure 25:
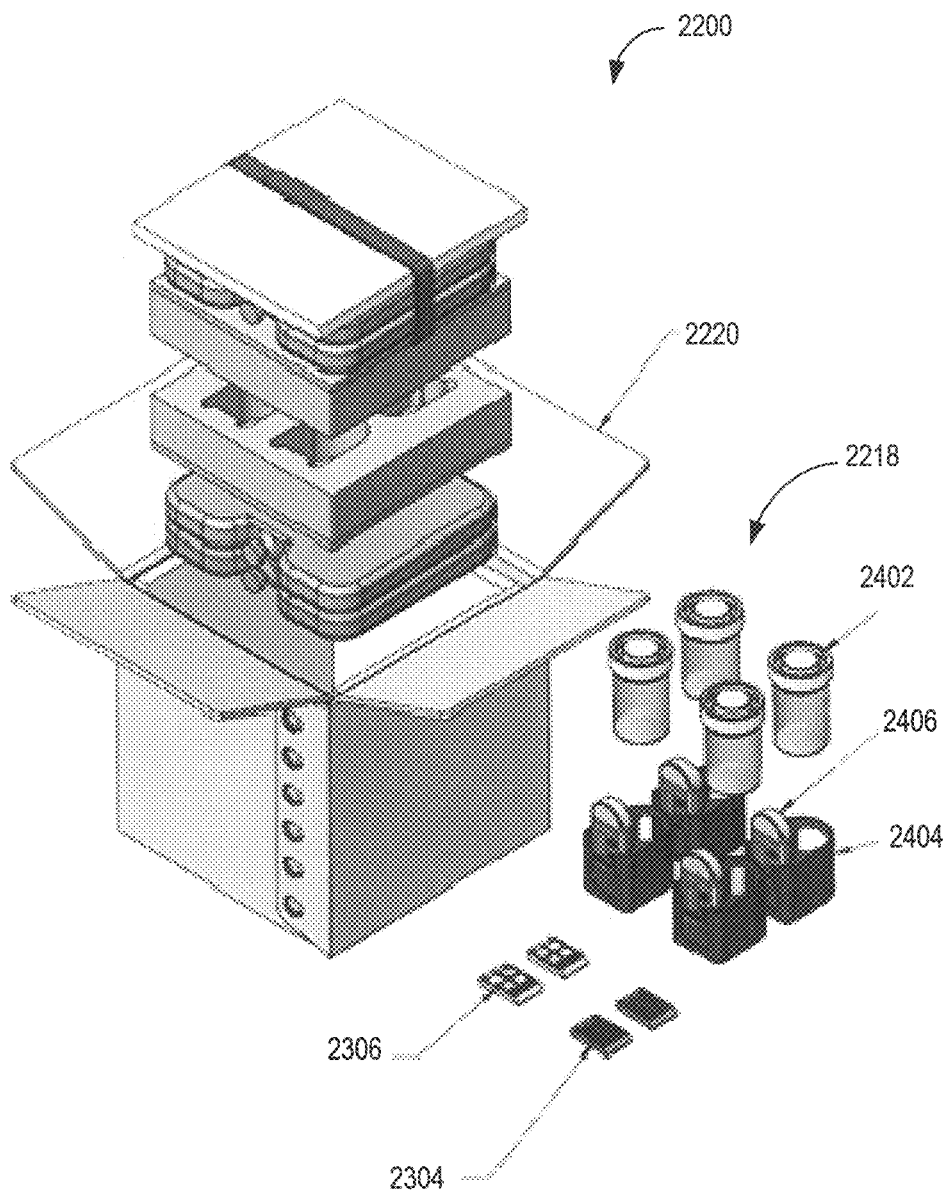
FIG. 25 is an exemplary cold tissue kit including an exemplary box kit assembly, shown with, the specimen vials, specimen lids, a TEMPOD casing, and datalogger, separate, without being inserted yet into the foam inserts, along with cassettes, according to an exemplary embodiment.

FIG. 25 depicts an exemplary cold tissue kit including, e.g., but not limited to, an exemplary box 2220 kit 2200, shown with, the specimen vials 2402, specimen lids 2402, pod casings 2404 (discussed with reference to FIG. 4A), and exemplary TEMPOD datalogger 2406 (discussed with reference to FIG. 4B) separate, without being inserted yet into the foam inserts 2210, 2212 (shown, but not labeled, discussed further with reference to FIG. 3), along with cassettes 2304, 2306, according to an exemplary embodiment.

Figure 26A:
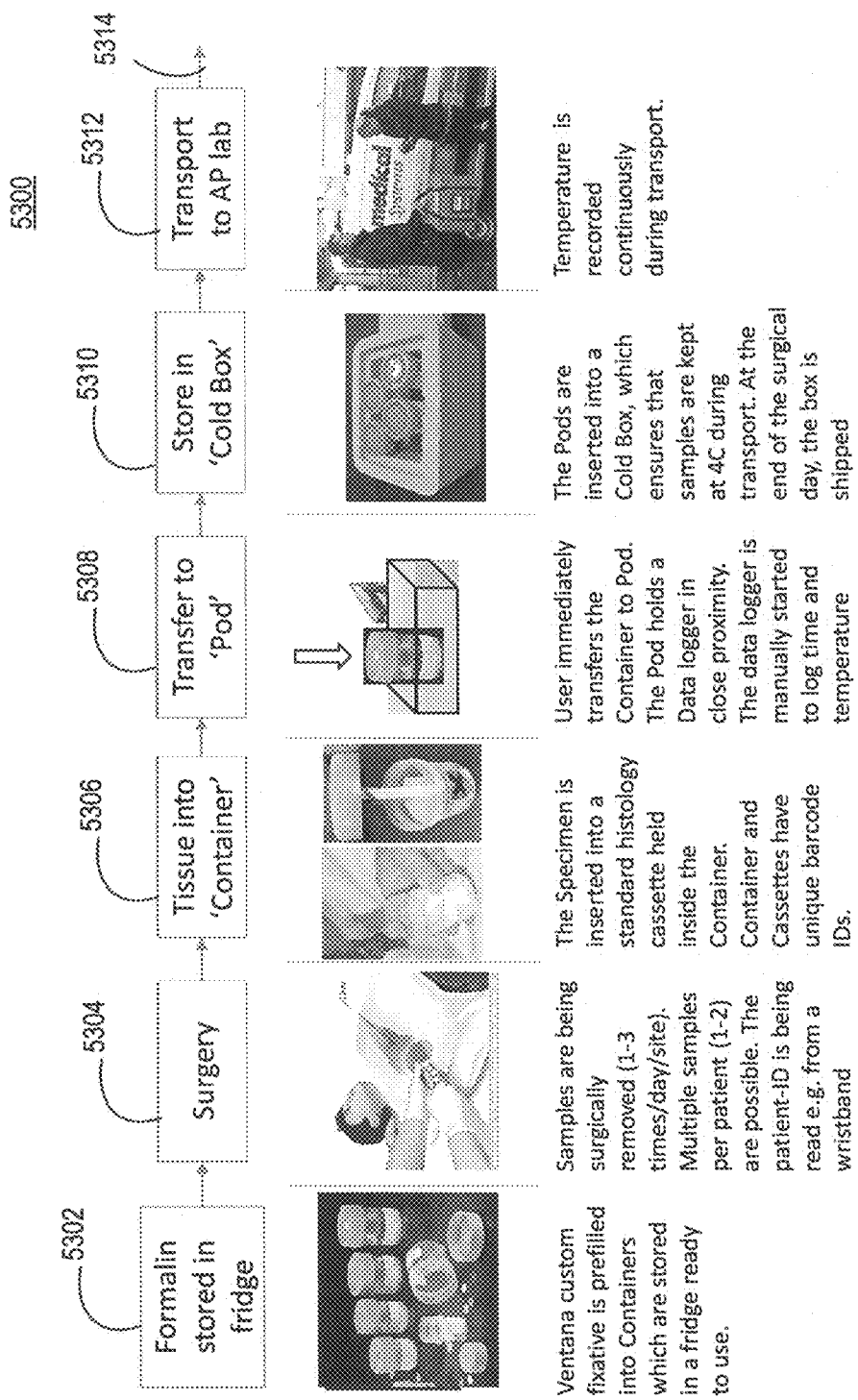
FIG. 26A and FIG. 26B are an example operating room system workflow and an example AP Lab workflow, respectively.
Figure 26B:
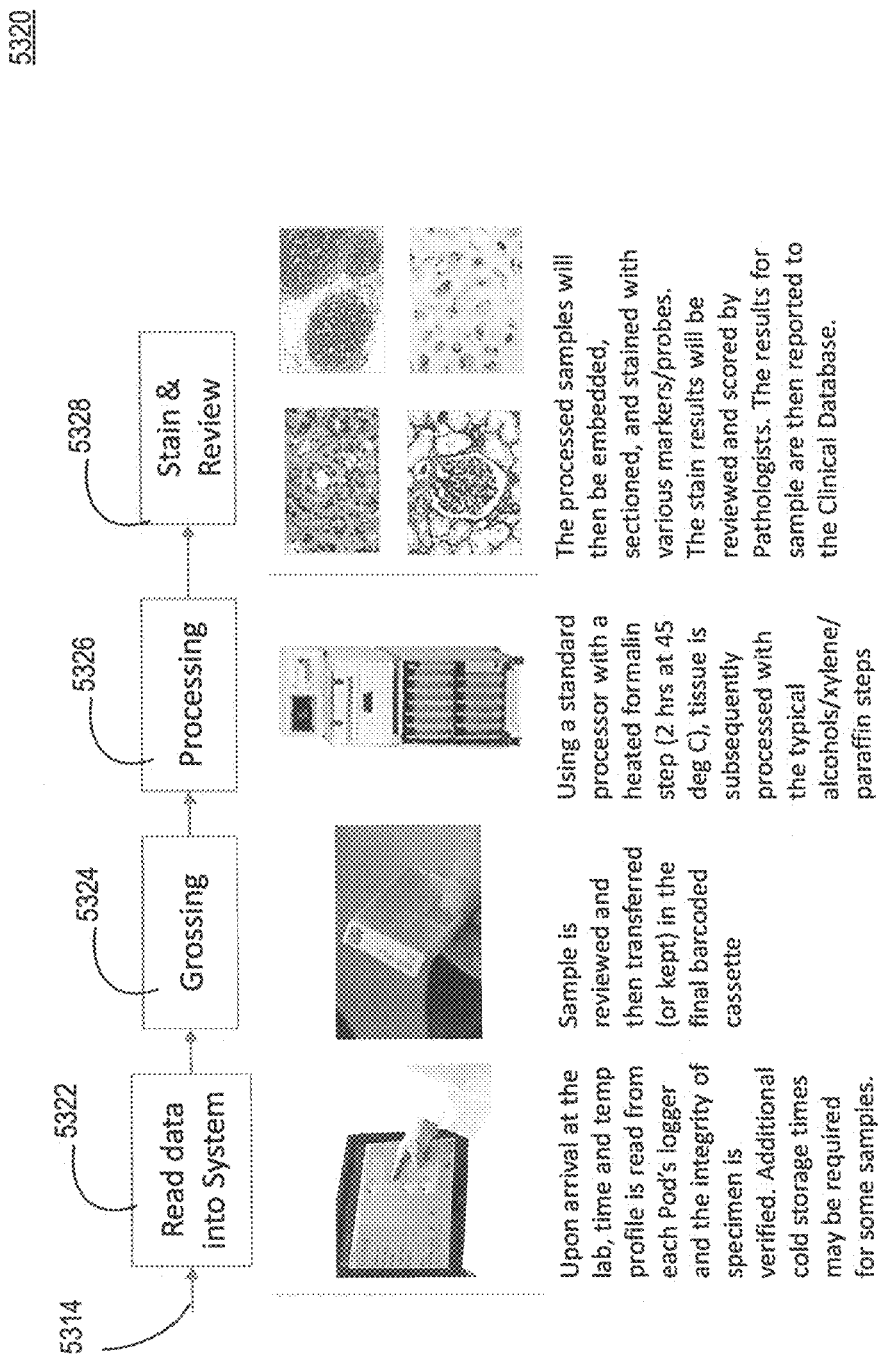

FIG. 26A and FIG. 26B are an example operating room system workflow 5300 and an example AP Lab workflow 5320, respectively, according to an exemplary embodiment.

FIG. 26A illustrates an example system workflow 5300 for an operating room beginning with 5302. In 5302, formalin is stored in a refrigerator, in an exemplary embodiment. Formalin, a custom fixative is available from Ventana, and may be prefilled in containers such as vials 2302 with lids 2402, and which may be stored in a cold temperature controlled area such as a refrigerator to be ready for use, in an exemplary embodiment. From 5302 workflow 5300 can continue with 5304.

In 5304, during surgery in the operating room, samples can be surgically removed (e.g., 1-3 times/day/site), in an exemplary embodiment. Up to multiple samples per patient (e.g., but not limited to, 1-2, or more) are possible, in an exemplary embodiment. A patient-identifier (ID) can be read, e.g., but not limited to, from a patient's wristband, in an exemplary embodiment. From 5304, workflow 5300 can continue with 5306.

In 5306, tissue can be placed into the container or vial 2302, 2402, in an exemplary embodiment. The specimen can be inserted into a standard histology cassette 2306, and the cassette 2306 can then be placed inside and held inside the vial 2302, 2402 container, in an exemplary embodiment. Each container (vial 2302, with lid 2402) and cassette 2306 can have a unique barcode identifier (ID), in an exemplary embodiment. From 5306, workflow 5300 can continue with 5308.

In 5308, the sample container (vial 2302 with lid 2402) can be transferred to a pod 2404, in an exemplary embodiment. The user of the container can immediately transfer the vial 2302 with closed lid 2402 to the pod 2404 as shown in FIG. 4A. The pod 2404 can also hold an exemplary datalogger 2406 in close proximity. The data logger 2406 can be manually started to log time and temperature, in an exemplary embodiment. In another exemplary embodiment, the data logger can automatically start, e.g., but not limited to, at insertion into the slot in the pod, etc. Together, the pod 2404, vial 2302 (with lid 2404) and datalogger 2406 can be referred to as pod 2218. From 5308, workflow 5300 can continue with 5310.

In 5310, the pod 2218 can be inserted into an exemplary cold box 2220 for storage, as illustrated in diagram 2200 of FIG. 26, in an exemplary embodiment. Storage in the box 2220 ensures that samples are kept at a desired temperature (e.g., but not limited to 4° C.) during transport, according to an exemplary embodiment. At the end of a surgical day, in one embodiment, the box of diagram 2200 may be shipped. From 5310, workflow 5300 can continue with 5312.

In 5312, the box 2220 with complete assembly can be transported to an AP lab, and temperature can be recorded continuously during transport to ensure requisite conditions of the sample are maintained, in an exemplary embodiment. From 5312, workflow 5300 can continue with 5314.

FIG. 26B illustrates an exemplary AP lab system workflow 5320, and may begin with 5314 and may continue immediately with 5322, in an exemplary embodiment.

In 5322, data may be read into the AP lab system, in an exemplary embodiment. In an exemplary embodiment, upon arrival at the lab, a time and temperature profile may be read from each pod's 2218 datalogger 2406 an the integrity of the specimen can thereby be verified. Additional cold storage times may be required for some samples, depending on desired processing, in one embodiment. From 5322, workflow 5320 can continue with 5324.

In 5324, exemplary grossing can be performed, wherein the sample can be reviewed and then transferred, or kept, in a final cassette with barcode for identification, in an exemplary embodiment. From 5324, workflow 5320 can continue with 5326.

In 5326, exemplary processing of the sample can be performed, using an exemplary standard processor with an exemplary heated formalin step (e.g., but not limited to, 2 hours at 45° C.), tissue can be subsequently processed with typical alcohols/xylene/paraffin steps, according to an exemplary embodiment. From 5326, workflow 5320 can continue with 5328.

In 5328, exemplary stain and review can be performed, in an exemplary embodiment. According to an exemplary embodiment, the processed samples can be embedded, sectioned, and stained with various markers/probes. The stain results can be reviewed and scored by pathologists, in an exemplary embodiment. Results for an example sample can then be reported to a clinical database, according to an exemplary embodiment. From 5328, workflow 5320 can end, according to an exemplary embodiment.

Figure 27A:
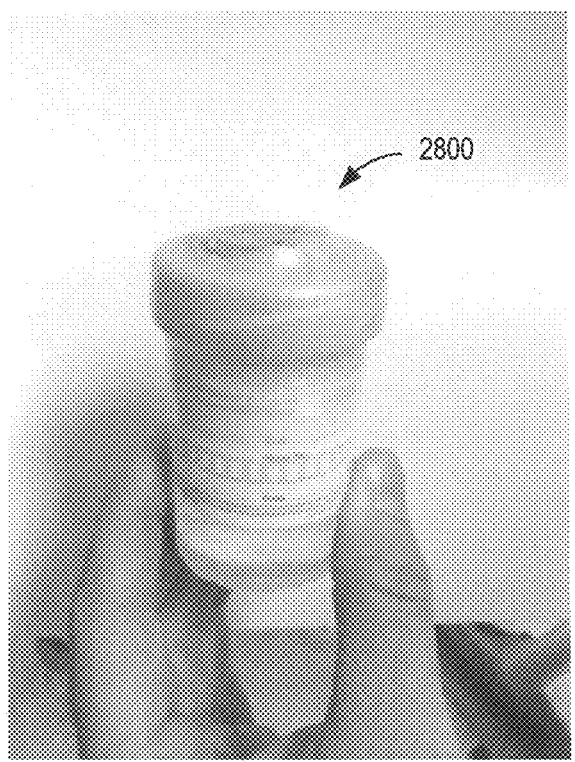
FIGS. 27A and 27B illustrate exemplary sealing options and variations for an exemplary specimen cup, including a wrap cup in parafilm, and/or fume reduction concept including inserting a cassette through an exemplary septum of a membrane seal, respectively.
Figure 27B:
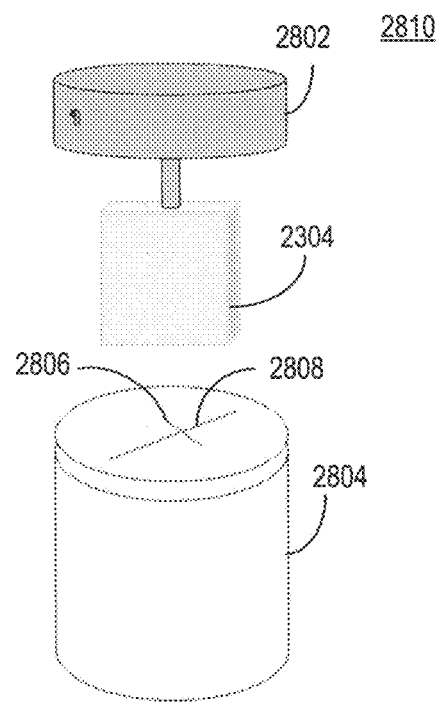

FIGS. 27A and 27B illustrate two exemplary sealing options and variations for an exemplary specimen cup.

FIG. 27A a wrap cup in parafilm 2800.

FIG. 27B illustrates in diagram 2810 a spill-protected sample insertion through a split septum, in the exemplary embodiment. In FIG. 27B, an exemplary fume reduction concept 2810 can include inserting an example cassette 2304 coupled to a lid through an exemplary septum having one or more slot(s) 2806, 2808 of a membrane seal to be placed in the fixative of an example vial 2804, according to an exemplary embodiment. According to exemplary embodiments of FIGS. 6A, 6B, an exemplary means to insert and retain an example standard histology cassette can be provided, such that the cassette upon insertion into a vial 2302 is submersed in fluid independent of the orientation of the vial 2302 or pod 2404, according to an exemplary embodiment.

An exemplary clip feature 3504 (discussed further with reference to FIGS. 31A-31C, 32A-32B, 33A-33D, and 35A-35I) can be used to hold and retain cassettes 2304 with a corresponding feature 3504, according to an exemplary embodiment.

An exemplary carrier feature or cassette holder of FIGS. 33A-33D allows a cassette 2304 to slide in and retain a cassette, according to an exemplary embodiment.

An exemplary embodiment can include an example dual sided lid, set forth in FIGS. 28, 29, 30A-30E, 31A-31C and 32A-32B, can hold an unused cassette upward to avoid contamination with fixative prior to sample insertion, and easy handling, according to an exemplary embodiment. The other side of the lid sealing the fluid inside the vial during transport/handling and to avoid spills/fumes, according to an exemplary embodiment. After sample insertion into the cassette 2304 the lid can be reversed and screwed onto the vial with the fluid/fixative, according to an exemplary embodiment.

Figure 28:
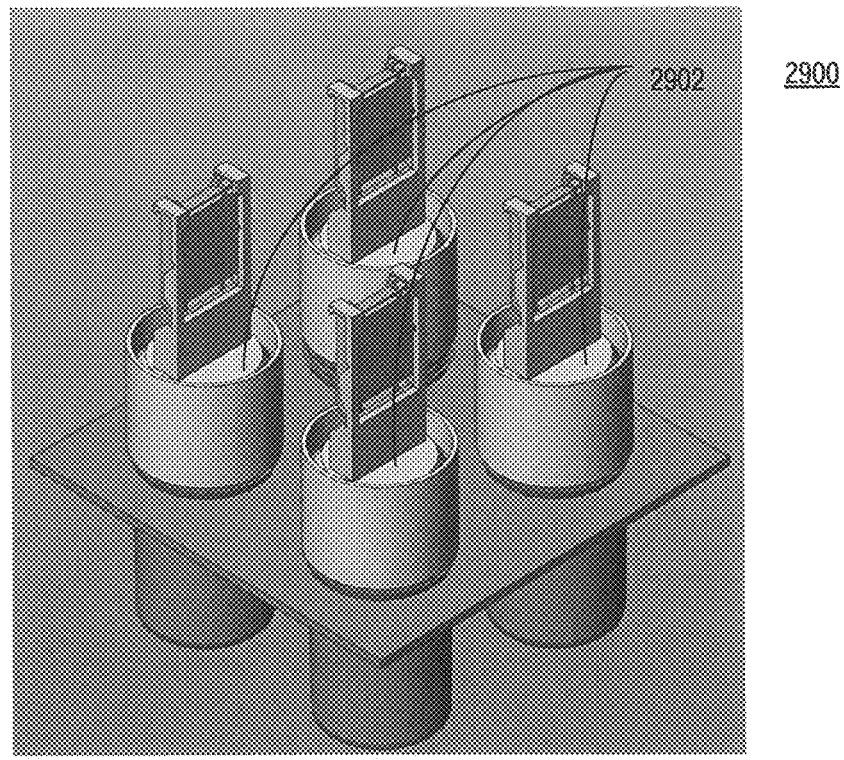
FIG. 28 is an illustration of an integrated cup design in ship-to-hospital position.

FIG. 28 is an illustration 2900 of an integrated cup design including an exemplary two sided lid 2902 shown with a cassette vertical orientation, in an exemplary embodiment. According to an exemplary embodiment, a carrier and a cup cap can be a single part (shown as different shades of color), including a vial base portion, and a cap with cassette coupled to the cap, in an exemplary embodiment. According to an exemplary embodiment, a single piece 4 well cup insert can be provided, however different numbers of well cups may also be provided, in an exemplary embodiment. An exemplary double cap concept is shown in "ship-to-hospital" position (i.e., with no tissue samples loaded in the cassettes yet), in an exemplary embodiment. An exemplary protective sheath (not shown) around the cassette can be provided to protect against contamination and/or dust, in an exemplary embodiment.

Figure 29:
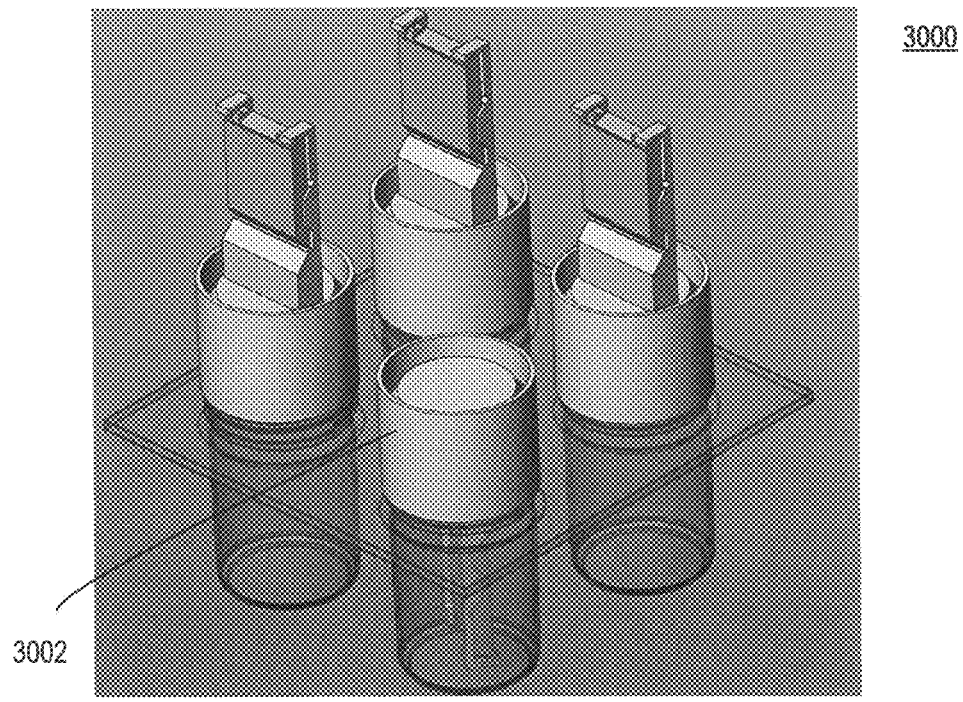
FIG. 29 is an illustration of an integrated cup design illustrating a reversed cap direction immersing a sample cassette in fixative in the vial.

FIG. 29 is an illustration 3000 of an integrated cup design illustrating, in the foreground, a reversed cap 3002 direction immersing a sample cassette 2306 in fixative (e.g., formalin in an exemplary embodiment) in the vial 2302.

The exemplary unit can be shipped with fixative (e.g., formalin), already in cups with caps, in an exemplary embodiment. According to an exemplary embodiment, the technician can remove protective sheath (not shown), and can unscrew the two sided lid and can load the sample into cassette. In an example embodiment, the unit does not require the cassette to be removed from the cap. Once the cassette is loaded, the technician can reverse the cap direction and can screw onto the cup immersing the sample in formalin, in an exemplary embodiment. The technician can tell at a glance which cups have samples and which do not, in an exemplary embodiment. The cap, in an exemplary embodiment, is tall enough (in its outer periphery) for label/barcode to be applied. The example sample cup cannot be left outside cold box, in an exemplary embodiment.

Figure 30A:
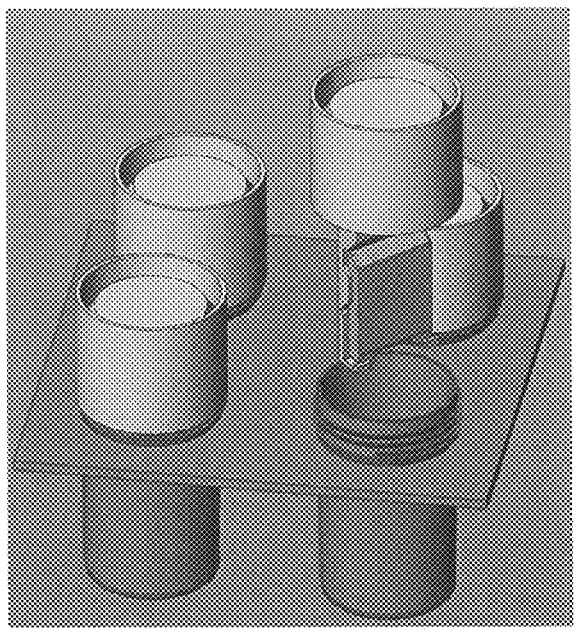
FIG. 30A illustrates a method of use of the unit of FIGS. 29 and 30.

FIG. 30A illustrates a method of use 3100 of the unit of FIGS. 29 and 30, showing the last sample being loaded, according to an exemplary embodiment.

Figure 30B:
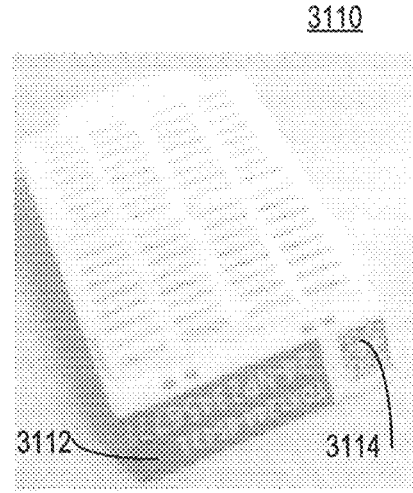
FIG. 30B illustrates a cassette with a slanted portion for labeling.

FIG. 30B is an image 3110 illustrating an example cassette 2306, 2308 with a slanted portion for labeling. In one example embodiment, the cassettes can be coupled to the cap in the vertically opposite way than shown in FIG. 30A, for the barcode reader to more easily scan the slanted area, that is, with slanted side of the cassette facing down into the vial during insertion, according to an exemplary embodiment.

Figure 30C:
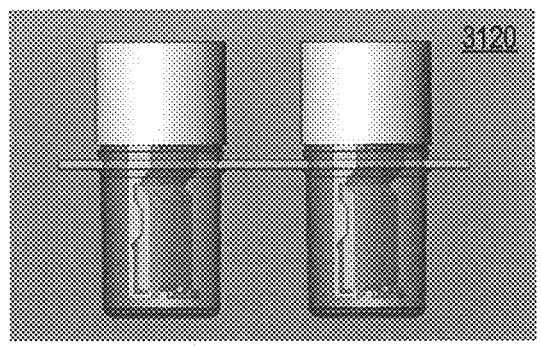
FIG. 30C is an illustration of samples loaded and ready for shipment to a lab.

FIG. 30C is an illustration 3120 of samples loaded and ready for shipment to a lab, according to an exemplary embodiment.

Figure 30D:
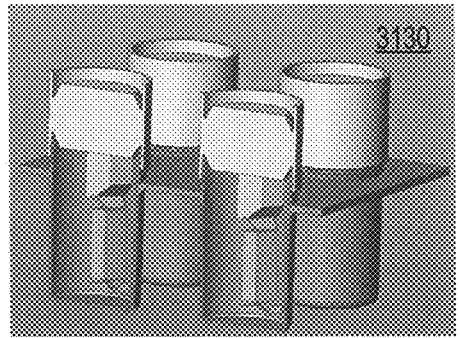
FIG. 30D is a partial cutaway view of the image of FIG. 31C.

FIG. 30D is a partial cutaway view 3130 of the image of FIG. 30C, according to an exemplary embodiment.

Figure 30E:
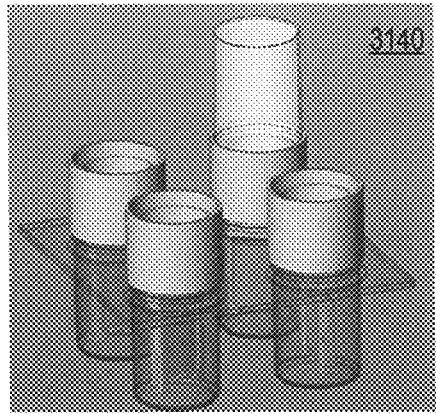
FIG. 30E is a protected version of the vial container.

FIG. 30E is a protected version 3140 of the vial container, according to an exemplary embodiment. A formalin filled cup can stay attached and can be pre-filled (fits in the insert for shipment), according to an exemplary embodiment. A membrane that gets punctured when you screw it into the carrier insert, gets the same type effect, according to an exemplary embodiment. The formalin from the now upside down cup can flow into the lower insert cup, according to an exemplary embodiment. The lower container can then protect the cassette from contamination, according to an exemplary embodiment.

FIG. 31A illustrates individual components of an exemplary cassette holder 3200 (with top view 3202, and bottom perspective view 3204 showing a cassette clip/holder 3204, an exemplary o-ring 3208 (e.g., solvent compatible), and one or a plurality (e.g., four) snap clips (e.g., male) 3206.

FIG. 31B illustrates an exemplary cassette receiver 3210, with a vial screw top including in a top view a pierceable septum 3212, one or a plurality (e.g., 4) of snap clip receivers (female), and in a bottom view a threading (e.g., female) 3218 for mating with the vial, and an o-ring (e.g., solvent compatible).

FIG. 31C illustrates a fixative vial 3220, with threaded vial top (e.g., male) 3222, a void volume 3224 of approximately the volume of the cassette, and a fixative (e.g., a formalin solution) 3226. The vial 3220 and cassette receiver 3210 can be combined prior to shipping, as illustrated.

FIG. 32A illustrates a user receiving 3220 the cassette holder 3200.

FIG. 32B illustrates in diagram 3240 the cassette receiver/vial assembly 3240 of cassette receiver 3210, and vial 3220. The septum lid can be covered during shipment to protect from undesired piercing, according to an exemplary embodiment. In one embodiment, the cover can be a disposable clip-on lid or protected shipping conditions.

FIG. 33A illustrates an exemplary process 3300 of attaching the cassette 3302 to the cassette holder 3200 at holder 3204, forming a cassette assembly.

FIG. 33B illustrates an exemplary process 3310 of piercing with the cassette assembly of FIG. 33A, the septum of the cassette receiver 3210/vial 3220 assembly 3240.

FIG. 33C illustrates an exemplary process 3320 of completely sealing a vial to be ready for transport.

FIG. 33D illustrates an exemplary process 3330 of having the receiving lab unscrew the cassette holder/receiver assembly and removing the cassette assembly from the vial, as shown. The process of the series of process steps of FIG. 33A-33D include that most parts can be plastic molded, that there is reduced exposure to formalin vapors, that the cassette remains completely submerged during transport, that the container can ship ready to use, and that the process is compatible with generic cassettes.

Figure 34A:
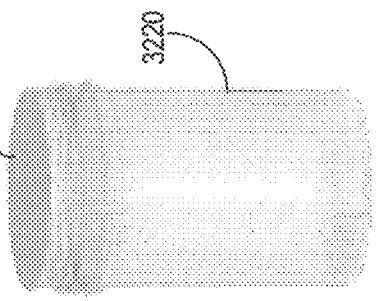
FIGS. 34A and 34B illustrate a first state with a sample in the air exposed to the environment with a wedge arm that breaks a membrane; and a fixative vial with a breakable membrane, respectively.

FIG. 34A illustrates a first state with a sample in the air, exposed to the environment, with a wedge arm 3402, lid 3200, and cassette 3302, with protective cylinder 3404, where the wedge arm 3402 can break a membrane when the sample is placed into the vial 3220.

Figure 34B:
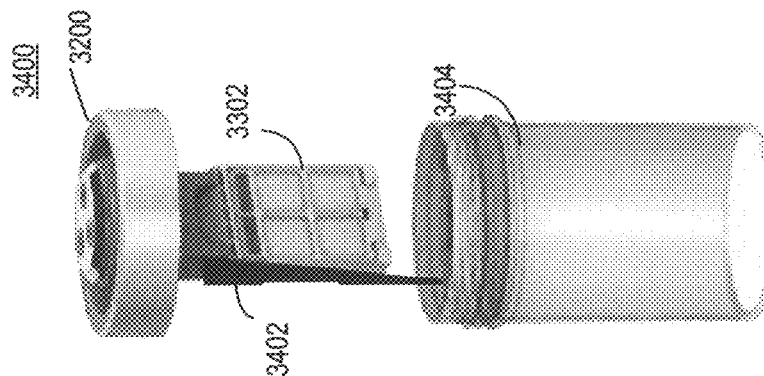

FIG. 34B illustrates in diagram 3410 a fixative vial 3220 with a breakable membrane 3412.

FIGS. 34C and 34D illustrate in 3420 and 3430, respectively, a continuation of the first state of FIGS. 34A and 34B with the sample container lid 3200 of FIG. 34A affixed to the protective cylinder 3404, and with the fixative container vial 3220 of FIG. 34D still isolated and with membrane 3412 still intact. The inner diameter of 3404, is slightly greater than the outer diameter of vial 3220, to permit placing one atop the other as shown in FIG. 34E.

FIG. 34E illustrates in diagram 3440 a transition to a second state. By screwing the sample container 3200, 3404 over and around the fixative container 3220, isolating the sample from the environment, the fixative will still remain isolated prior to the arm breaking the membrane 3412 by the arm 3402 when inserting the cassette 3302 into the vial 3220.

FIGS. 35A-35I illustrate an exemplary fume reduction feature explained, with an exemplary cassette cover in an exemplary dry implementation.

FIG. 35A includes a diagram 3500 including a tissue container vial 3520 with a cassette septum 3510 membrane for isolating the fixative, with an example split septum 3514, a tissue container lid 3502 with an example concave portion 3506 for receiving an example cassette clip 3504, which couples a tissue cassette 3302 to the lid 3502, and a cassette cover 3508 which can isolate the tissue cassette 3302 by covering the cassette and coupling with an edge 3510 about a rim of tissue container lid 3502, in an example embodiment.

FIG. 35B depicts a diagram 3510 illustrates a cassette 3302 is dry and sterile above the lid 3502 and the container 3520, which can be pre-filled with fixative, such as, e.g., formalin, in an example embodiment.

FIG. 35C depicts a diagram 3520 illustrates a cassette cover can be removed and discarded breaking a sterile seal between the cover 3508 and lid 3502 at edge 3510 of the lid.

FIG. 35D depicts a diagram 3530 a cassette 3302 and clip 3504 unscrewed from the lid, together, in an example embodiment. In an example embodiment, the clip 3504 may be threaded and mate with inner threads of concavity 3506 of lid 3502. In another embodiment, the clip can be screwed to the lid 3502, or snapped into the lid 3502, in an example embodiment.

FIG. 35E depicts a diagram 3540 illustrating tissue being inserted into an example cassette 3302 coupled to cassette clip 3504, in an exemplary embodiment.

FIG. 35F depicts a diagram 3550 illustrating removing tissue container lid 3502 from tissue container vial 3520, and then screwing/coupling the cassette clip with tissue cassette into the inside of an example double sided lid with threads inside, as well as outside of lid 3502, in an exemplary embodiment.

FIG. 35G depicts a diagram 3560 illustrating inserting the tissue cassette 3302, clip 3504 and lid 3502 cassette assembly into the container 3520 through cassette septum 3512 into the container 3520, in an exemplary embodiment.

FIG. 35H depicts a diagram 3570 illustrating the tissue and cassette placed sealed in the tissue container vial 3520 filled with fixative (e.g., formalin), in an exemplary embodiment.

FIG. 35I depicts a diagram 3580 illustrating the septum 3512 can be removable with the cassette 3302, clip 3504, and lid 3502 to provide a splash-free, easy to access to the cassette 3302 system, in an exemplary embodiment.

FIGS. 36A-36I (collectively, FIG. 36) is an exemplary preanalytical workflow beginning with FIG. 36A diagram 3600.

FIG. 36A depicts a diagram 3600 illustrating a tissue container with formalin fixative stored at 4° C., in an exemplary embodiment.

FIG. 36B depicts a diagram 3610 illustrating tissue collection, in an exemplary embodiment.

FIG. 36C depicts a diagram 3620 illustrating a start or initiation of data collection, in an exemplary embodiment.

FIG. 36D depicts a diagram 3630 illustrating pairing tissue with data collection, in an exemplary embodiment.

FIG. 36E depicts a diagram 3640 illustrating preparing multiple samples for shipping, in this case an example four pods at a time, in an exemplary embodiment.

FIG. 36F depicts a diagram 3650 illustrating packaging in example cold box transport box 2200 (also shown in FIG. 26), in an exemplary embodiment.

FIG. 36G depicts a diagram 3660 illustrating shipping to central facility for processing, in an exemplary embodiment.

FIG. 36H depicts a diagram 3670 illustrating data collection hand-off of the datalogger and sample cassette for central processing, in an exemplary embodiment.

FIG. 36I depicts a diagram 3680 illustrating an example fixation processor collects transport data, performs any desired final fixation steps included in a fixation protocol, and provides a comprehensive fixation quality report for each tissue sample, in an exemplary embodiment.

FIGS. 37-44, 7 and 8 illustrate example specimen vials, lids, clips, and cassettes, of various example embodiments.

Figure 37:
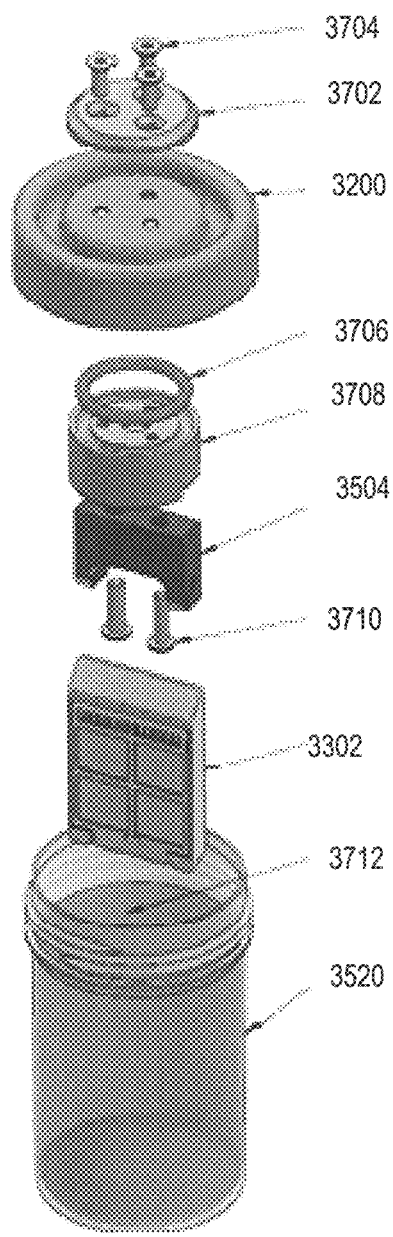

FIG. 37 is an exemplary exploded view 3700 of an exemplary tissue pot with lid, and exemplary 10% NBF. The container vial 3520 can include fixative 3712 therein. As shown, formalin 10% NBF can be pre-filled and cooled to a desired temperature. The cassette 3302 can be coupled to clip 3504. Clip 3504 can be screwed in, as shown in diagram 3700 and can couple the clip 3504 to cylinder 3708, which can be screwed to lid 3200 with o-ring 3706 and cap 3702 with screws 3704 through lid 3200.

Figure 38:
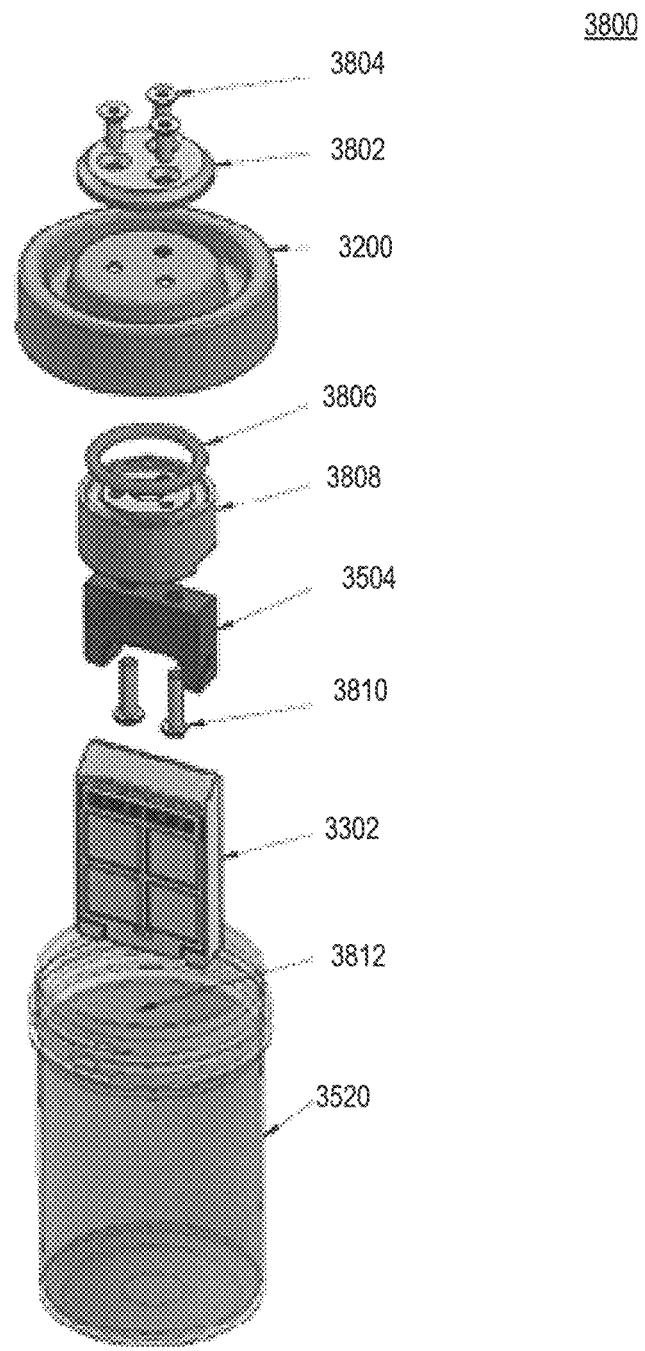

FIG. 38 is an exemplary exploded view of an exemplary tissue pot with lid, and exemplary 30% NBF. The container vial 3520 can include fixative 3812 therein. As shown, formalin 10% NBF can be pre-filled and cooled to a desired temperature. The cassette 3302 can be coupled to clip 3504. Clip 3504 can be screwed in, as shown in diagram 3800 and can couple the clip 3504 to cylinder 3808, which can be screwed to lid 3200 with o-ring 3806 and cap 3802 with screws 3804 through lid 3200.

Figure 39A:
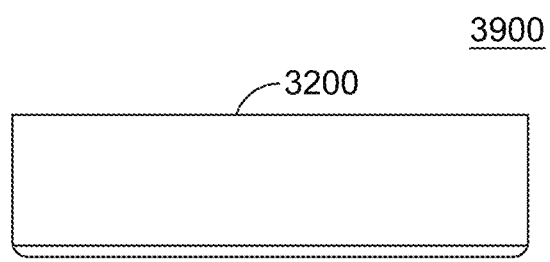
FIG. 39A is a side view and FIG. 39B is a top view of an exemplary CELLSTOR lid modification, of an exemplary specimen lid.
Figure 39B:
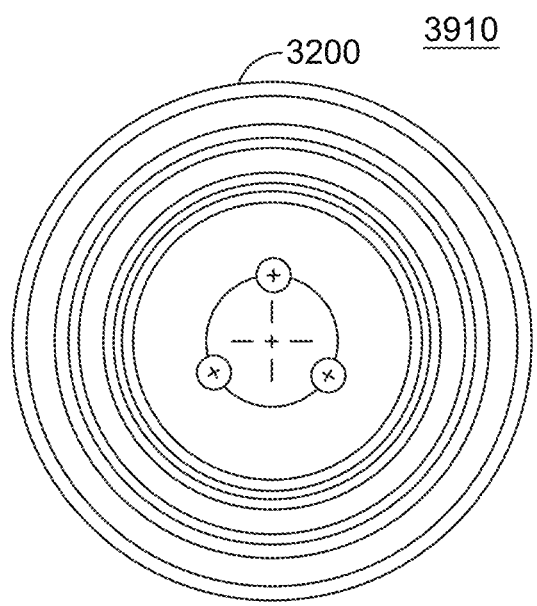

FIG. 39A is a side view 3900 and FIG. 39B is a top view 3910 of an exemplary CELLSTOR lid 3200 modification, of an exemplary specimen lid 3200 with exemplary three screw holes there through, in an example embodiment.

Figure 40A:
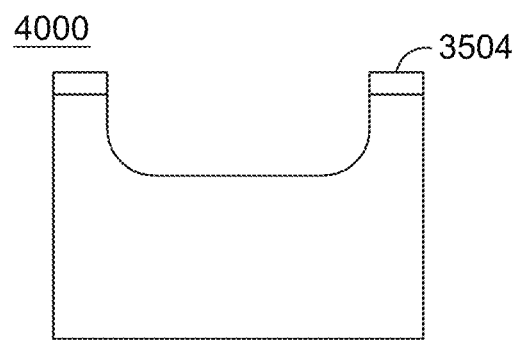
FIGS. 40A-40D are various views of an exemplary cell block cassette clip, having an exemplary angled slot for clipping to an exemplary cassette.
Figure 40B:
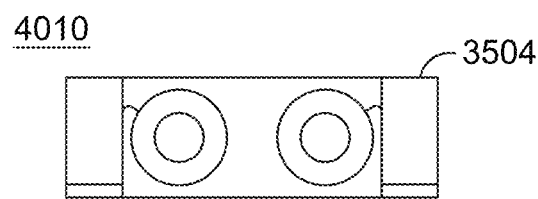
Figure 40C:
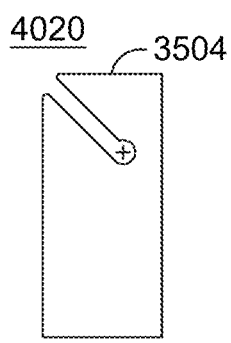
Figure 40D:
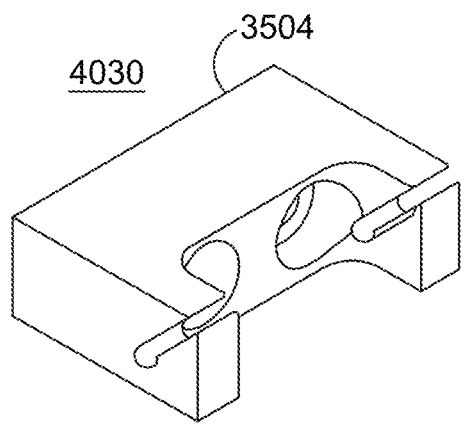

FIGS. 40A-40D are various views of an exemplary cell block cassette clip 3504, having an exemplary angled slot for clipping to an exemplary cassette. FIG. 40A is a front side orthographic view 4000, FIG. 40B is an example top orthographic view 4010 of the clip 3504. FIG. 40C is an example right edge side orthographic view 4020. FIG. 40D is an example isometric perspective view 4030 of clip 3504.

Figure 41A:
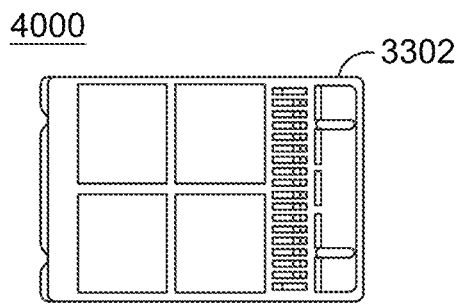
FIGS. 41A-41D, and 42A-42B are various views of an exemplary cell block cassette.
Figure 41B:
Figure 41C:
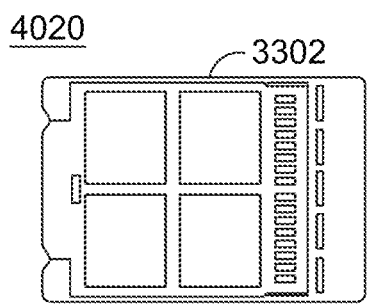
Figure 41D:
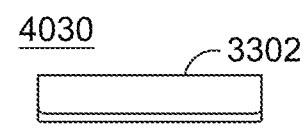

FIGS. 41A-41D, and 42A-42B are various views of an exemplary cell block cassette. FIG. 41A is a bottom orthographic view 4000 of cassette 3302. FIG. 41B is a side edge orthographic view 4010 of cassette 3302. FIG. 41C is a top orthographic view 4020 of cassette 3302. FIG. 41D is a right side edge orthographic view 4030 of cassette 3302.

Figure 42A:
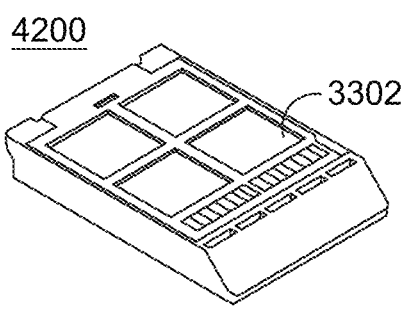

FIG. 42A is a top isometric perspective view 4200 of cassette 3302.

Figure 42B:
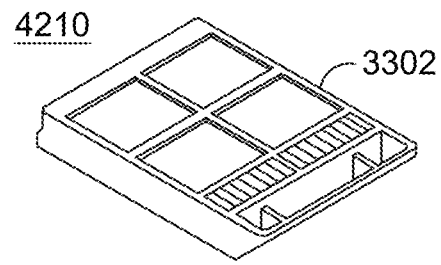

FIG. 42B is a bottom isometric perspective view 4210 of cassette 3302.

Figure 43A:
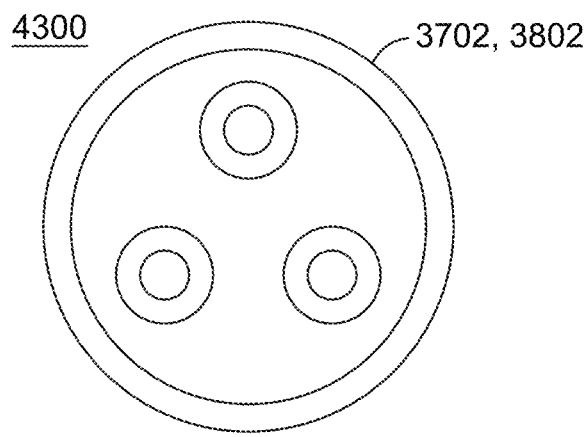
FIGS. 43A-43C are various views of an exemplary cell transport cap plate, configured as a cap for the specimen lid.
Figure 43B:
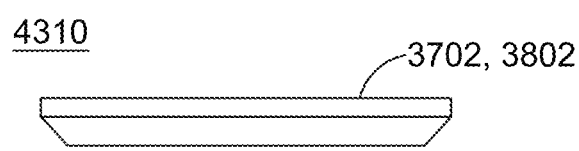
Figure 43C:
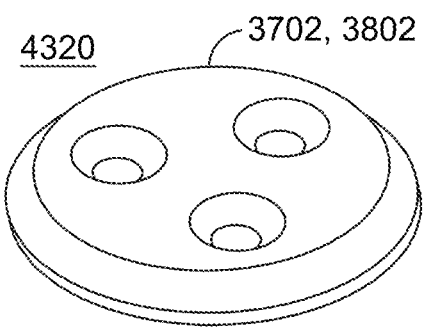

FIGS. 43A-43C are various views of an exemplary cell transport cap plate 3702, 3802, configured as a cap for the specimen lid 3200. FIG. 43A is a top orthographic view 4300 of cap plate 3702, 3802. FIG. 43B is a top edge orthographic view 4310 of cap plate 3702, 3802. FIG. 43C is a front isometric perspective view 4320 of cap plate 4320.

FIGS. 44A-44E are various views of an exemplary cell transport seal block 3708, 3808, which resembles a straight screw head, including an exemplary slotted cassette clip of one embodiment, as can be used in the process set forth in FIGS. 35A-35I.

Figure 44A:
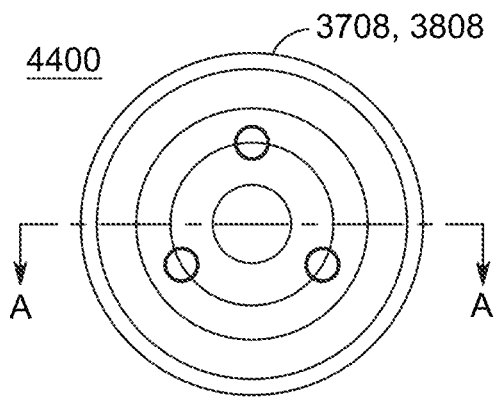
Figure 44B:
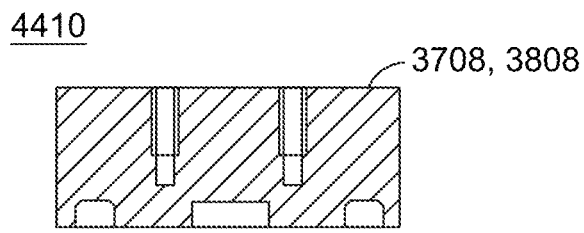
Figure 44D:
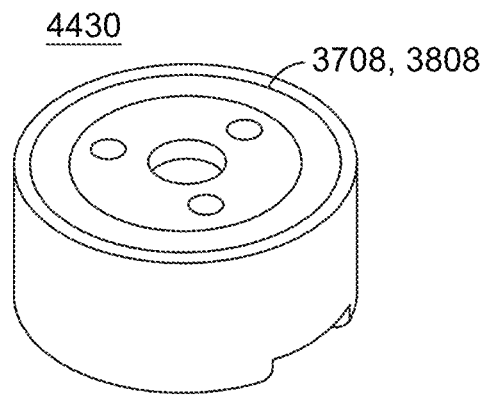
Figure 44C:
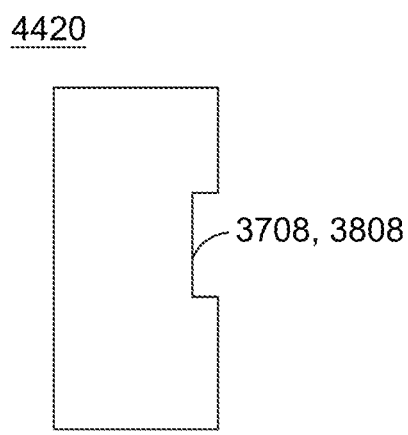
Figure 44E:
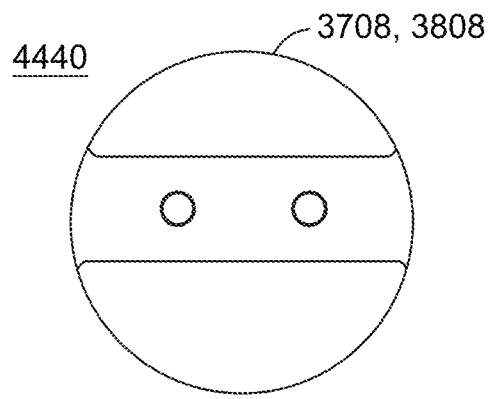

FIG. 44A is a front orthographic view 4400 of cell transport seal block 3708, 3808. FIG. 44B is a top orthographic view 4410 of cell transport seal block 3708, 3808, with partial cutaway cross-section A-A. FIG. 44C is a right side orthographic view 4420 of cell transport seal block 3708, 3808. FIG. 44E is a back orthographic view 4440 of cell transport seal block 3708, 3808. FIG. 44D is an isometric perspective view 4430 of exemplary cell transport seal block 3708, 3808.

Another exemplary embodiment can include a single sided version of the lid, where the cassette is held separately until the sample is ready for insertion, according to an exemplary embodiment.

An exemplary embodiment can include data logging electronics 2406, 2408, which can be held separately from the vial 2302 via a POD 2404 construct, with thermal communication to allow monitoring by the data logger 2406, 2408 of the vial and its sample contents.

An exemplary embodiment can provide an exemplary timer/clock function associated with the insertion of the container, and can log other times and/or temperatures of events, or at specific and/or periodic times.

An exemplary embodiment can provide an exemplary feature having a means to indicate completion of a predetermined time after the insertion or manual start were established.

An exemplary embodiment can provide an exemplary display, monitor or indicator (such as, e.g., with an indicating/monitoring/displaying and/or storing system and/or method LED/LCD).

An exemplary embodiment can provide an exemplary feature having a temperature recording capability.

An exemplary embodiment can provide an exemplary feature of having a means to record and indicate temperature excursions against preprogrammed thresholds (heating, freezing), indicating with LED/LCD.

An exemplary embodiment can provide an exemplary feature having a means to monitor temperature excursions and time after sealing of the container, and can indicate successful completion per LED/LCD against preprogrammed thresholds.

An exemplary embodiment can provide an exemplary feature including one or more memories to store and/or include details about the sample ID, location relative to WiFi transponders, and/or record date/time, etc.

An exemplary embodiment can provide an exemplary means to communicate via RFID/Bluetooth/NFC/Wireless/Zig Bee or direct connection to a PC/tablet/Cell Phone.

Finally, for an overview of the pre-analytical workflow, the reader is directed further to the detailed discussion with reference to FIGS. 36A-36I, above, according to one example embodiment.

Figure 46A:
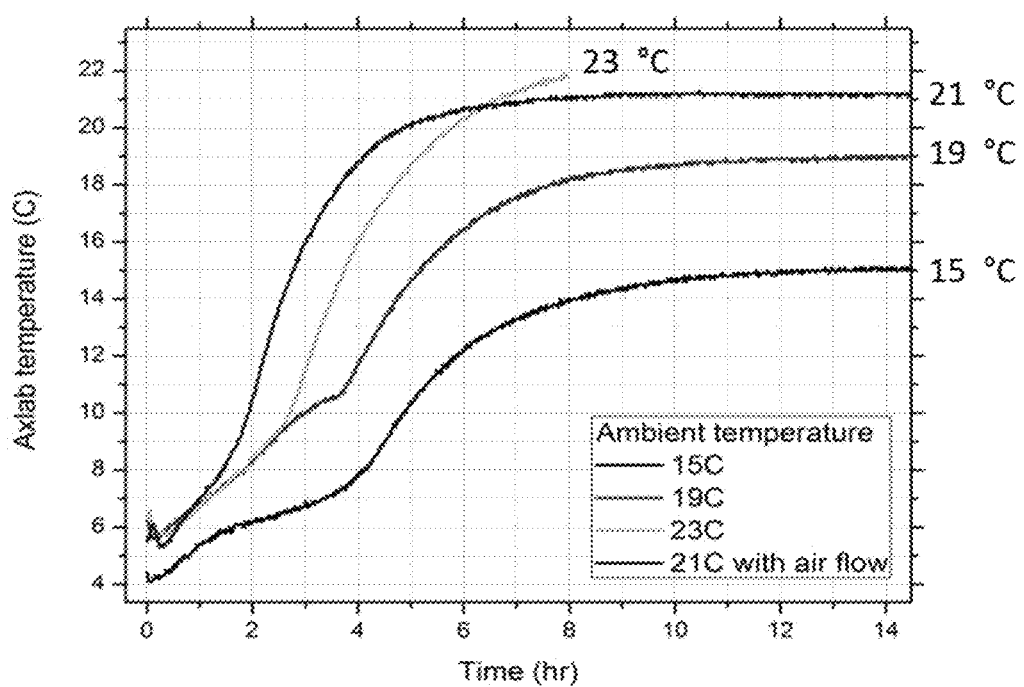
Figure 47A:
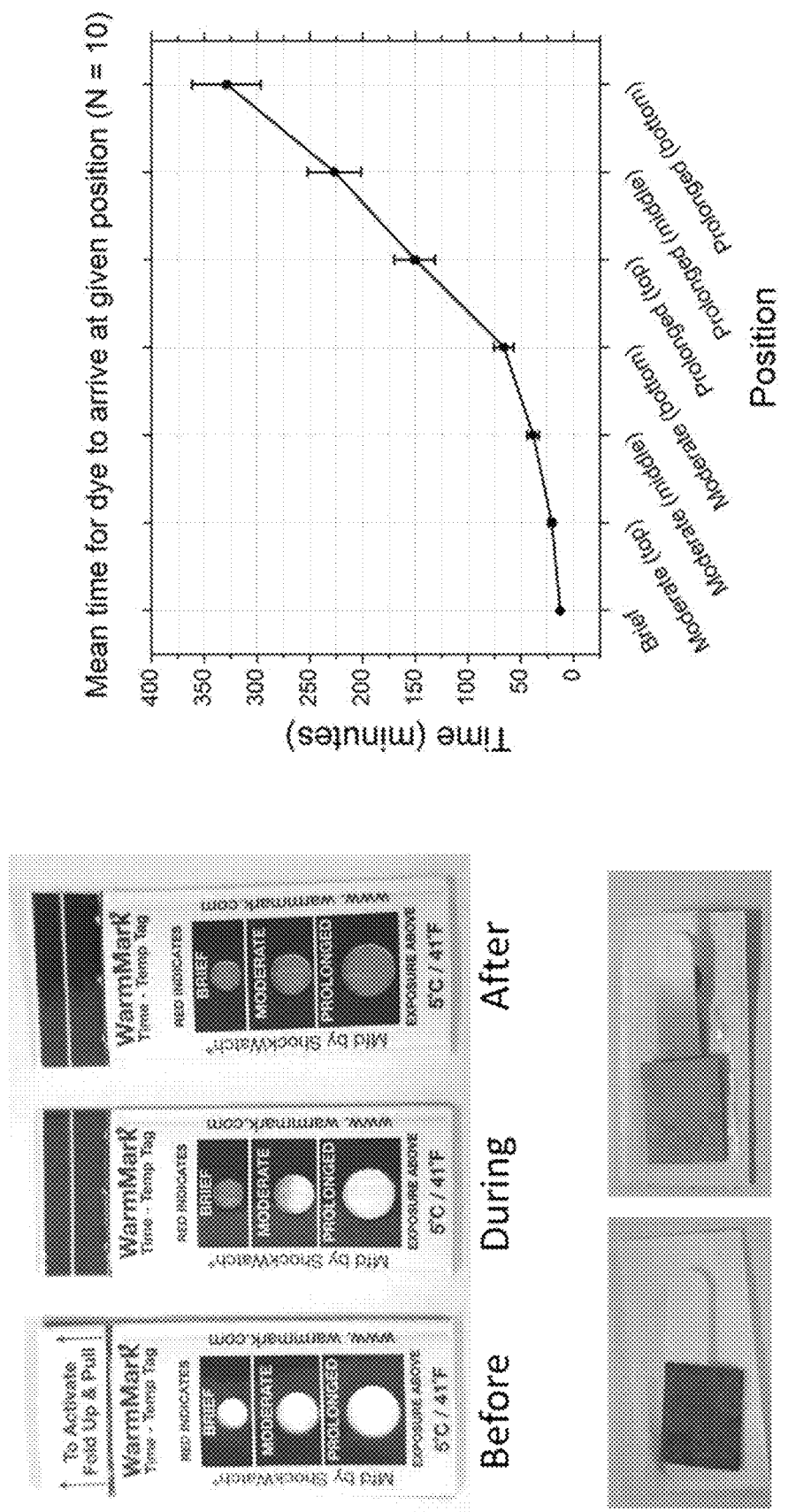
Figure 47C:
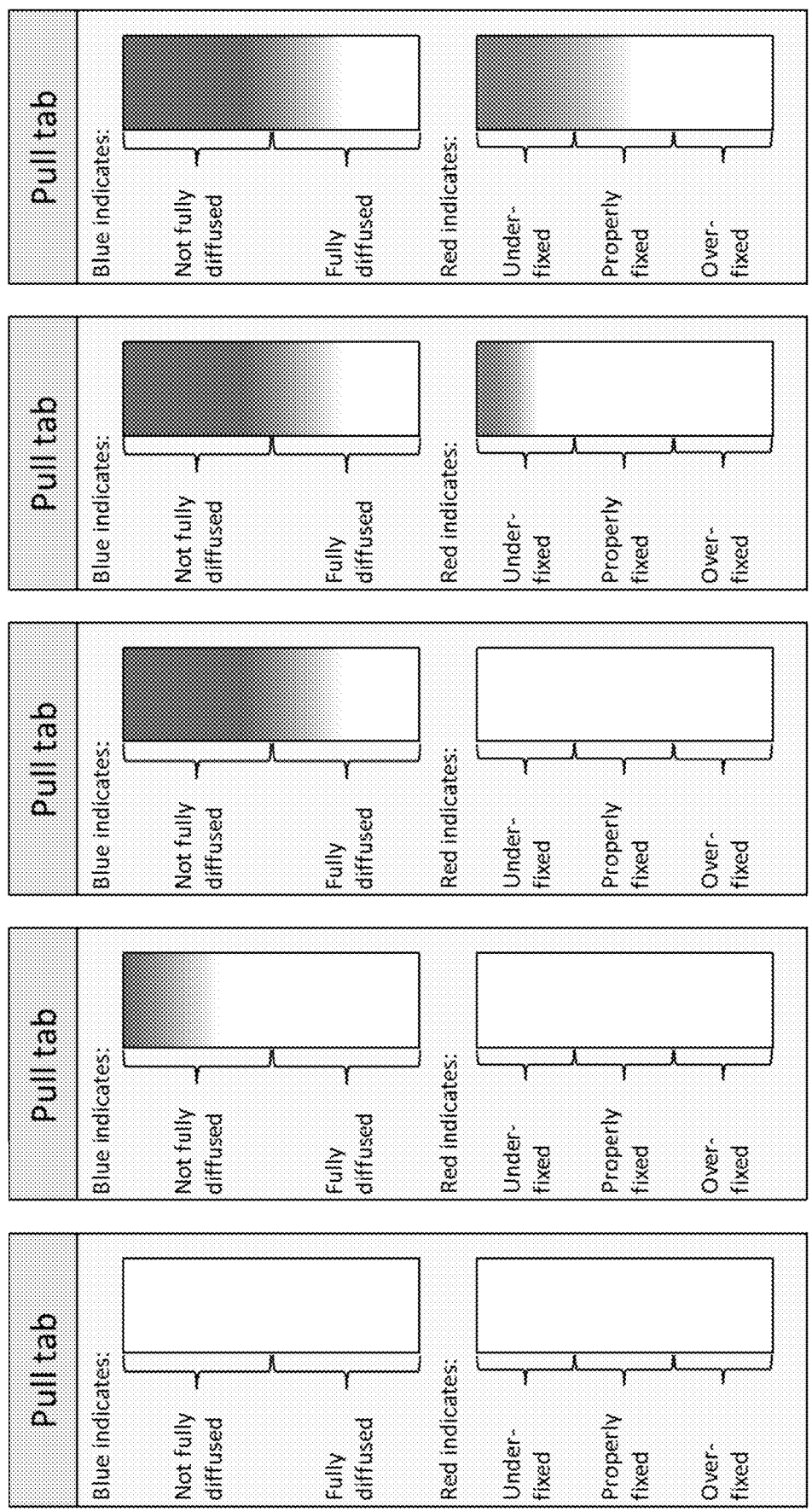

In one embodiment, the transport systems demonstrated herein are useful in an "autonomous heating" embodiment. As used herein, an autonomous heating embodiment is an embodiment in which the transport device is configured to hold the fixative solution within a first cold temperature range (typically in the range of 0° C. to 7° C.) for a period of time sufficient to allow the fixative to diffuse throughout the tissue sample (typically at least 2 hours). After diffusion has completed, the temperature of the transport device is gradually allowed to rise to ambient temperature. As the temperature rises, the fixation reaction begins to proceed, thereby inducing fixation of the tissue sample. An exemplary assembly is illustrated at FIG. 45A-45C. An insulated box (4501) is provided, having a cavity (4502) sized to accept a data logger (4503), such as a TEMPOD data logger (TempSen). Preferably, the data logger is pre-chilled to a temperature in the range of 0° C. to 7° C. The data logger (4503) is configured with a cavity (4504) sized to accept a cooling block (4505) containing a phase change medium having a melting temperature of ~4° C. (although in principle, any melting temperature in the range of 0° C. to 7° C. could be used). The cooling block includes a cavity (4506) sized to accept a sample container (4507) holding a tissue sample and a volume of a fixative solution (preferably pre-chilled in a range of 0° C. to 7° C.). To demonstrate the effectiveness of such a device, Calu3 xenographs were stored in 10% neutral buffered formalin in a transport device as described herein at 15° C., 19° C., 21° C., and 23° C. over a time course. The temperature of the NBF is shown at FIG. 46A. The resulting fixed tissue samples were immunohistochemically stained for pAkt. Results are shown at FIGS. 46B and 46C. A 2+2 control (2 hours at 4° C. in NBF, followed by 45° C. in NBF) is provided as a positive staining sample. As can be seen, the exemplary device preserves pAkt to a comparable extent as the 2+2 protocol.

In one simple embodiment, an autonomous heating embodiment is provided in which time the data logger is replaced by a timer apparatus which uses diffusion of a colored liquid through an absorbent membrane as a timer to indicate how long the colored liquid has been in contact with the absorbent membrane. Measurements of the time of arrival of the colored liquid front at various points along the length of the absorbent membrane can be used as a rough measurement of the time that a tissue sample has been in fixative. In some embodiments, the timer apparatus is capable of determining the amount of time that the fixative has spent at a particular temperature range. For example, a device for monitoring the time that a tissue sample has spent in room temperature fixative can comprise an absorbent membrane separated from a dye-soaked pad by a dye-impervious film. Once the film is removed, the dye comes into contact with the absorbent membrane and starts to diffuse along its length. The distance that the dye is seen to have diffused down the membrane indicates the length of time since the film was removed. Text and markings on the front of the device can either show the user how long the tissue has been in fixative, or give an indication of the state of the tissue. A similar device can measure the time that a tissue sample has spent at cold (e.g. 0-7° C.) and room temperature. A first colored dye indicates the length of time spent at cold temperature by the same method of diffusion along an absorbent membrane and is initiated by removal of the dye-impervious barrier. When the temperature increases beyond the desired temperature range, the dye should stop diffusing and thus give a record of how long the tissue sample was at 0-7° C. A second colored dye, now mixed with a material which melts at a specific temperature above the cold temperature range (e.g. room temperature), will only diffuse along a separate absorbent membrane when the environment around the tissue sample reaches the specific temperature. Thus one can also monitor the time that the tissue sample was at or above the specific temperature. Since two times are being monitored, there are several possible states for the device to end in, indicating whether the tissue sample was exposed to both cold temperature and a higher temperature for the proper amount of time for ideal fixation. It is also possible for the device to merely report the length of time (in hours) at each temperature. The device for monitoring the time spent in cold and room temperature includes a method to halt the diffusion of the first dye through the absorbent membrane when the temperature increases in order to provide a record of how long the tissue sample spent in the cold temperature. For example, a phase change material is introduced behind the absorbent membrane in contact with the first dye. This phase change material (PCM) will remain solid at cold temperature, but when the ambient temperature increases it will melt. The chemical composition of the PCM, absorbent membrane and first dye should be chosen such that the PCM fouls the absorbent membrane and prevents further diffusion of the first dye. For instance, the PCM could be a paraffin which melts at 18° C., and the first dye could be a mixture of dye, water and glycerol. In that case the hydrophobicity of the paraffin absorbed into the membrane would prevent the aqueous mixture from diffusing further along the absorbent membrane. Exemplary arrangements are illustrated at FIGS. 45A-45D. An advantage of such an embodiment is that the entire apparatus may be presented in an inexpensive, disposable format.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. The various embodiments described herein may also be combined to provide further embodiments. The analyzers, processing systems, controllers, and computing devices disclosed herein can include memory for storing information. Such memory can be computer-readable media that may be encoded with computer-executable instructions that implement the technology, e.g., a computer-readable medium that contains the instructions. In addition, the instructions, data structures, and message structures may be transmitted via a data transmission medium, such as a signal on a communications link and may be encrypted. Accordingly, computer-readable media include computer-readable storage media upon which data can be stored and computer-readable transmission media upon which data can be transmitted. The data can include, without limitation, object classifier routines, ground truth slide data (or other types of reference images), reference images, segmentation routines, scoring protocols, or the like. Various communications links may be used, such as the Internet, a local area network, a wide area network, a point-to-point dial-up connection, a cell phone network, and so on. It should be noted that, as used in this specification and the appended claims, the singular forms "a," "an," and "the" include plural referents unless the content clearly dictates otherwise. Thus, for example, reference to "a tissue sample" includes a single tissue sample, or two or more tissue samples. It should also be noted that the term "or" is generally employed in its sense including "and/or" unless the content clearly dictates otherwise. Also, as used herein, the term "comprises" is used in its legally accepted definition and manner, and nothing herein is intended to change such meaning. The systems and methods disclosed herein can be used with tissue samples from mammals. As used herein, the term mammal includes both human and non-human mammals. Similarly, the term "subject" includes both human and veterinary subjects.

Further Embodiments

1. A portable transporter system for protecting biomarkers in a tissue sample, comprising:
   a specimen container configured to retain or hold at least one tissue sample in a reagent, wherein the reagent is chilled to from about 0° C. to about 15° C. prior to transportation to a laboratory;
   a carrier assembly configured to retain or hold the specimen container; and
   a monitoring system that comprises at least one sensor configured to obtain, store or transmit one of or both time and temperature information about the tissue sample and/or reagent in the specimen container when the specimen container is positioned in the carrier assembly and transported to a laboratory without directly contacting the contents of the specimen container, wherein the monitoring system further comprises a data logging device.
2. The transporter system of embodiment 1 wherein the reagent is a tissue fixation reagent.
3. The transporter system of embodiment 1 further comprising a tissue sample cassette for retaining one or more tissue samples therein and wherein the specimen container is configured to retain and hold the tissue sample cassette in the reagent.
4. The transporter system of embodiment 1, wherein the monitoring system measures the temperature of the reagent and/or tissue sample in the specimen container over a period of time.
5. The transporter system of embodiment 1, further including an insulator and/or a cooling element capable of maintaining the volume of the formalin-based fixative solution at a temperature in the range of 0° C. to 15° C. for at least 2 hours under shipping conditions when the tissue sample transport and storage assembly is assembled.
6. The transporter system of embodiment 1, wherein the monitoring system is physically coupled to the carrier assembly.
7. The transporter system of embodiment 1, wherein the monitoring system is electronically coupled to the carrier assembly.
8. The transporter system of embodiment 1, wherein the monitoring system comprises at least one sensor, wherein the sensor is a temperature sensor positioned in the specimen container and comprises a transmitter that outputs a temperature signal to a receiver located in the carrier assembly holding that specimen container.
9. The transporter system of embodiment 1, wherein the monitoring system either stores temperature measurements indicative of the temperature of the reagent and/or the tissue sample or transmits such information to an external receiver wherein the receiver comprises a memory device.
10. The transporter system of embodiment 4, wherein the specimen container comprises a temperature sensor wherein said sensor transmits the temperature of the reagent contained therein to the monitoring system.
11. The transport system of embodiment 1, wherein the specimen container further comprises a radio frequency identification (RFID) tag and the monitoring system further comprises a RFID reader.
12. The transport system of embodiment 1, further comprising a transport container for transporting the specimen container, carrier assembly and monitoring system wherein the transport container comprises an ice bath.
13. The transport system of embodiment 1, further comprising a transport container for transporting the specimen container, carrier assembly and monitoring system, wherein the transport container is configured to maintain the temperature of a specimen container therein to from about 0° C. to about 15° C. for up to 14 days.
14. The transporter system of embodiment 1, further comprising a plurality of carrier assemblies and a plurality of specimen containers wherein each of the plurality of carrier assemblies holds a separate one of the plurality of specimen containers.
15. The transporter system of embodiment 1 further comprises a cooling device configured to reduce or maintain an average temperature of reagent in the specimen container to or at a temperature equal to or lower than about 15° C.
16. An apparatus for transporting tissue samples, comprising:
   a plurality of specimen containers holding reagents;
   a plurality of carrier assemblies, each assembly comprising a specimen container holder and a sensor assembly positioned to monitor the temperature of the specimen container or the reagent held in each specimen container and time the container is held in the holder, wherein the sensor assembly comprises a temperature sensor and a time sensor;
   a transport assembly for carrying the multiple carrier assemblies; and
   a transporter for carrying at least one transport assembly.
17. The apparatus of embodiment 16, wherein the sensor assembly of each of the plurality of carrier assemblies comprises a temperature sensor positioned within the specimen container, wherein the temperature sensor includes a transmitter that outputs a temperature signal to a receiver located in the carrier assembly holding that specimen container.

18. The apparatus of embodiment 17, further comprising a computing device communicatively coupled to ultrasound transmitters and ultrasound receivers, wherein the computing device is configured to evaluate sound speeds in the tissue sample by evaluating time of flight changes of acoustic waves from one or more of the transmitters.

19. The apparatus of embodiment 18, wherein the computing device is further configured to compensate for changes in the time of flight of acoustic waves in a fixative or sample associated with environmental changes.

20. The apparatus of embodiment 17, further comprising the computing device containing instructions, when executed, to cause the computing device to compensate for temperature changes of one or more of the reagent or sample.

21. A transporter system for carrying a tissue sample, comprising:
    a specimen container configured to hold a tissue sample in a fixative;
    a carrier assembly configured to retain or hold a specimen container;
    a monitoring system that obtains and stores time and temperature information about the tissue sample in the specimen container when the specimen container is positioned in the carrier assembly; and
    a transport container configured to hold the carrier assembly holding the specimen container and monitoring system, wherein the transport container is further configured to maintain the temperature of the internal holding chamber at from about 0° C. to about 20° C. for at least 1 hour.

22. The transporter system of embodiment 21, wherein the transport container is configured to maintain the temperature of the internal holding chamber at from about 0° C. to about 15° C. for at least 24 hours.

23. The transporter system of embodiment 21, wherein the transport container is configured to maintain the temperature of the internal holding chamber at from about 0° C. to about 15° C. for up to 14 days.

24. The transporter system of embodiment 21, wherein the carrier assembly is configured to hold a plurality of specimen containers each holding a respective tissue sample, wherein the monitoring system includes a plurality of temperature sensors each measuring a temperature of the tissue sample in one of the specimen containers.

25. The transporter system of embodiment 24, wherein the monitoring system measures the temperature of the fixative and/or tissue sample over a period of time.

26. The transporter system of embodiment 21, wherein the monitoring system includes a temperature sensor carried by the specimen container and positioned to measure a temperature of the fixative.

27. The transporter system of embodiment 21, wherein the monitoring system stores temperature measurements indicative of the temperature of the fixative and/or the tissue sample.

28. The transport system of embodiment 21, wherein the monitoring system includes a reader physically coupled to the carrier assembly and a radio-frequency identification tag coupled to the specimen container.

29. The transporter system of embodiment 21, wherein the transport container comprises a cooling device configured to reduce an average temperature of fixative in the specimen container from room temperature to a temperature equal to or lower than about 15° C.

30. The transporter system of embodiment 21, wherein the monitoring system further comprises a timer.

31. The transporter system of embodiment 21, wherein the specimen container includes a cover and a main body, wherein the cover includes a holder configured to hold the tissue sample in contact with the fixative.

32. A method for processing a tissue sample, comprising:
    contacting the tissue sample with a fixative chilled to from about 0° C. to about 15° C., wherein the fixative is contained in a specimen receiving container;
    placing a specimen container in a holding well of a carrier assembly further comprising at least one data logging device;
    detecting and storing time and temperature information associated with the tissue sample in the data logger of the carrier assembly;
    placing the carrier assembly in a transport assembly; and
    transporting the transport assembly to a laboratory.

33. The method of embodiment 32, wherein detecting the time and temperature information associated with the tissue sample includes:
    measuring a temperature of the fixative and/or the tissue sample, and
    measuring a contact period of time in which the fixative contacts the tissue sample.

34. The method of embodiment 32, wherein detecting the time and temperature information associated with the tissue sample includes obtaining temperature measurements and storing the temperature measurements.

35. A self-cooling portable transporter system for carrying a tissue sample contacting a fixative, comprising:
    a transport container including a holding chamber;
    a fixative in the holding chamber; and
    a fixation-inhibiting cooling device carried by the transport container and in thermal communication with the fixative in the holding chamber, wherein the fixation-inhibiting cooling device is operable to reduce a temperature of the fixative to inhibit fixation of a tissue sample contacting the fixative.

36. The transporter system of embodiment 35, further comprising a monitoring system carried by the transport container and configured to obtain and store time-temperature information about the tissue sample through which the fixative diffuses after the temperature of the fixative has been reduced by the fixation-inhibiting cooling device.

37. The transporter system of embodiment 35, further comprising a monitoring system that obtains temperature over time information about the tissue sample, the fixative, or both.

38. The transporter system of embodiment 35, wherein the fixation-inhibiting cooling device is configured to reduce the temperature of about 100 ml to 400 ml of fixative by at least about 25° C.

39. The transporter system of embodiment 35, wherein the transport container has an open configuration for receiving the tissue sample and a closed configuration for sealing the holding chamber, wherein the fixation-inhibiting cooling device has a non-cooling mode and a cooling mode, and wherein the fixation-inhibiting cooling device in the cooling mode reduces a temperature of the fixative at least about 25° C. in less than about 5 minutes.

40. The transporter system of embodiment 39, wherein the transport container is configured to maintain the temperature of the fixative at or below about 10° C. for at least one hour while an ambient temperature surrounding the transport container is equal to or higher than about 10° C.

41. The transporter system of embodiment 39, wherein the fixative comprises formalin.

42. The transporter system of embodiment 35, wherein the fixation-inhibiting cooling device includes a first substance and a second substance that mix to produce an endothermic reaction in response to the fixation-inhibiting cooling device changing from a non-cooling mode to a cooling mode.

43. The transporter system of embodiment 35, wherein the fixation-inhibiting cooling device comprises a desiccant and a substance that evaporates to cool the fixative.

44. The transporter system of embodiment 35, wherein the fixation-inhibiting cooling device includes a refrigeration unit or a thermoelectric cooler unit.

45. The transporter system of embodiment 35, wherein the fixation-inhibiting cooling device is configured to cool the tissue sample to a temperature equal to or lower than about 4° C.

46. The transporter system of embodiment 35, wherein the fixation-inhibiting cooling device is configured to reduce a temperature of about 100 ml of the fixative at least about 15° C. in less than about 4 minutes.

47. The transporter system of embodiment 35, further comprising a specimen container positioned in the holding chamber and holding the fixative.

48. A transporter system for carrying a tissue sample, comprising:
    a transport container;
    a specimen container configured to hold a tissue sample in a fixative; and
    a monitoring system that obtains and stores time-temperature information about the tissue sample in the specimen container when the specimen container is positioned in the transport container.

49. The transporter system of embodiment 48, wherein the transport container is configured to hold a plurality of specimen containers each holding a respective tissue sample, wherein the monitoring system includes a plurality of temperature sensors each measuring a temperature of the tissue sample in one of the specimen containers.

50. The transporter system of embodiment 48, wherein the monitoring system measures the temperature of the fixative and/or tissue sample over a period of time.

51. The transporter system of embodiment 48, wherein the monitoring system includes a temperature sensor carried by the specimen container and positioned to measure a temperature of the fixative.

52. The transporter system of embodiment 48, wherein the monitoring system stores temperature measurements indicative of the temperature of the fixative and/or the tissue sample.

53. The transporter system of embodiment 48, wherein the monitoring system includes a reader physically coupled to the transport container and a radio-frequency identification tag coupled to the specimen container.

54. The transporter system of embodiment 48, wherein the transport container contains a substance that vaporizes to reduce the temperature of the fixative and/or the tissue sample.

55. The transporter system of embodiment 48, further comprising a cooling device configured to reduce an average temperature of 100 ml of fixative in the specimen container from room temperature to a temperature equal to or lower than about 4° C.

56. The transporter system of embodiment 48, further comprising a cooling device configured to reduce an average temperature of 100 ml of fixative in the specimen container at least 15° C. in less than about 4 minutes.

57. The transporter system of embodiment 48, further comprising a cooling device configured to reduce an average temperature of at least one 1 liter of fixative in the specimen container by at least 15° C.

58. The transporter system of embodiment 48, wherein the monitoring system further comprises a timer.

59. The transporter system of embodiment 48, wherein the specimen container includes a cover and a main body, wherein the cover includes a holder configured to hold the tissue sample in contact with the fixative.

60. An apparatus for processing a tissue sample, comprising:
    a plurality of processing containers holding reagents;
    a carrier assembly including a specimen holder and a sensor assembly positioned to acoustically analyze a tissue sample held by the specimen holder when the tissue sample is submerged in one of the reagents; and
    a transport mechanism carrying the carrier assembly and operable to submerge the sensor assembly and tissue sample held by the specimen holder in the reagents in the containers.

61. The apparatus of embodiment 60, further comprising a computing device with instructions, when executed, that cause the apparatus to:
    if diffusion of fixative through the tissue sample is at or above a target diffusion level, a fixation process is performed on the tissue sample; and
    if diffusion of fixative through the tissue sample is below the target diffusion level, a diffusion process is performed on the tissue sample.

62. The apparatus of embodiment 60, wherein the sensor assembly includes a plurality of sensors positioned to acoustically analyze the tissue sample located in a detection zone, wherein each sensor includes a transmitter that outputs acoustic waves and a receiver that detects the acoustic waves from a respective one of the transmitters, and wherein the detection zone is between the transmitters and the receivers.

63. The apparatus of embodiment 60, wherein the sensor assembly includes:
    a plurality of transmitters, each of the transmitters outputs acoustic waves; and
    a plurality of receivers, each of the receivers is positioned to detect the acoustic waves from a respective one of the transmitters while the sensor assembly moves relative to the sample to scan the sample in one direction.

64. The apparatus of embodiment 60, further comprising a computing device communicatively coupled to the transmitters and receivers, wherein the computing device is configured to evaluate sound speeds in the tissue sample by evaluating time of flight changes of acoustic waves from one or more of the transmitters.

65. The apparatus of embodiment 60, further comprising a computing device configured to compensate for changes with a fixative associated with environmental changes.

66. The apparatus of embodiment 60, further comprising the computing device containing instructions, when executed, cause the computing device to compensate for temperature changes of one or more of the reagents.

67. A method for processing a tissue sample, comprising:
    contacting the tissue sample with a fixative;
    moving a transport container containing the fixative and the tissue sample from a first location to a second location while an average temperature of the fixative is equal to or less than about 5° C.; and
    detecting time-temperature information associated with the tissue sample while moving the transport container from the first location and the second location.

68. The method of embodiment 67, wherein detecting the time-temperature information associated with the tissue sample includes:
  measuring a temperature of the fixative and/or the tissue sample, and
  measuring a contact period of time in which the fixative contacts the tissue sample.
69. The method of embodiment 67, wherein detecting the time-temperature information associated with the tissue sample includes obtaining temperature measurements and storing the temperature measurements.
70. The method of embodiment 67, further comprising after contacting the tissue sample with the fixative, which is at an average temperature equal to or lower than about 10° C. for at least about one hour, heating the tissue sample to a temperature from about 35° C. to about 45° C.
71. The method of embodiment 67, further comprising removing the tissue sample from the transport container; and performing a histological process on the tissue sample based on the time-temperature information.
72. A method for processing a tissue sample contacting a fixative held in a specimen container, comprising:
  removing a tissue sample from a specimen container;
  transmitting acoustic waves through the tissue sample;
  evaluating diffusion of fixative through the tissue sample based on time of flight detection using acoustic waves; and
  performing a histological process on the tissue sample based on the evaluation of the diffusion of the fixative.
73. The method of embodiment 72, wherein evaluating the diffusion of the fixative includes monitoring time of flight of the acoustic waves that travel through the tissue sample while the tissue sample contacts the fixative.
74. The method of embodiment 72, wherein evaluating the diffusion of the fixative includes monitoring time of flight of the acoustic waves that travel through the tissue sample while fixative displaces interstitial liquid from the tissue sample.
75. The method of embodiment 72, further comprising contacting the tissue sample with the fixative (a) after removing the tissue sample from the specimen container and (b) while evaluating diffusion of the fixative in the tissue sample.
76. A portable transporter system adapted to carry a tissue sample in a standard histology cassette, the tissue sample contacting a fixative, comprising:
  a transport container comprising:
  a holding chamber;
  a cassette septum; and
  a fixative in said holding chamber; and
  a container lid comprising a cassette clip attachably couplable to receive, hold and retain the standard histology cassette.
77. The portable transporter system according to embodiment 76, further comprising: a fixation-inhibiting cooling device carried by the transport container and in thermal communication with said fixative in said holding chamber, wherein said fixation-inhibiting cooling device is operable to reduce a temperature of said fixative to inhibit fixation of the tissue sample contacting said fixative.
78. The portable transporter system according to embodiment 76, further comprising a cassette cover removably coupled to said container lid.
79. The portable transporter system according to embodiment 76, wherein said cassette cover comprises a sterile seal between said cassette cover and said container lid.
80. The portable transporter system according to embodiment 76, wherein said fixative comprises formalin.
81. The portable transporter system according to embodiment 76, wherein said cassette septum is removable with said container lid, said cassette clip, and the standard histology cassette.
82. The portable transporter system according to embodiment 81, wherein said removable cassette septum provides easy access to the standard histology cassette while eliminating splashing of said fixative.
83. The portable transporter system according to embodiment 76, wherein said cassette clip is removable couplable to said container lid.
84. The portable transporter system according to embodiment 76, wherein said container clip is operable to be screwed into at least one side of said container lid.
85. The portable transporter system according to embodiment 76, wherein the cassette clip is operable to be clipped to the standard histology cassette.
86. The portable transporter system according to embodiment 76, wherein said cassette clip comprises:
  a first end operable to be coupled to at least one side of said container lid; and
  a second end operable to be coupled to the standard histology cassette.
87. The portable transporter system according to embodiment 76, wherein said cassette septum comprises a breakable membrane.
88. The portable transporter system according to embodiment 87, wherein said container lid further comprises an arm operable to break said breakable membrane upon insertion of the cassette into said holding chamber of said transport container.
89. The portable transporter system according to embodiment 88, wherein said container lid further comprises a cylindrical portion comprising an internal screw thread portion adapted to couple with an external screw thread portion of said transport container, operable to isolate the sample, air and said fixative from a surrounding environment.
90. The portable transporter system according to embodiment 76, further comprising a data collection device.
91. The portable transporter system according to embodiment 90, further comprising a coupler for coupling said data collection device to said transport container together to form a paired tissue sample with data collection.
92. The portable transporter system according to embodiment 91, further comprising a first shipping receptacle portion for receiving a plurality of said paired tissue samples with data collections.
93. The portable transporter system according to embodiment 92, further comprising a second shipping receptacle portion for receiving said plurality of said paired tissue samples with data collections.
94. The portable transporter system according to embodiment 92, further comprising at least one fixation-inhibiting cooling device in thermal communication with said fixative in said holding chamber, wherein said fixation-inhibiting cooling device is operable to reduce a temperature of said fixative to inhibit fixation of the tissue sample contacting said fixative.
95. The portable transporter system according to embodiment 94, further comprising at least one cold transport box operable to receive said first shipping receptacle portion, said plurality of said paired tissue samples with data collections, and said at least one fixation-inhibiting cooling device.

96. The portable transporter system according to embodiment 76, wherein said cassette septum comprises at least one split.

97. The portable transporter system according to embodiment 96, wherein said at least one split of said cassette septum comprises at least two splits.

98. The portable transporter system according to embodiment 97, wherein said at least two splits of said cassette septum comprises wherein said at least two splits are perpendicular to one another.

99. The portable transporter system according to embodiment 97, wherein said at least two splits of said cassette septum comprises wherein said at least two splits are of different length to one another.

100. The portable transporter system according to embodiment 96, wherein said at least one split of said cassette septum comprises at least one cross-shaped split.

101. The portable transporter system according to embodiment 76, wherein the standard histology cassette holding the tissue sample is operable to maintain the tissue sample submersed in fluid independent of the orientation of the transport container.

102. The portable transporter system according to embodiment 76, wherein said cassette clip comprises a clip feature operable to hold and retain the standard histology cassette, where the standard histology cassette is adapted to include a corresponding feature.

103. The portable transporter system according to embodiment 76, further comprising a carrier feature operable to slideably receive and retain the standard histology cassette therein.

104. The portable transporter system according to embodiment 76, wherein said container lid comprises at least one side operable to hold an unused cassette upward to avoid contamination with said fixative prior to sample insertion.

105. The portable transporter system according to embodiment 76, wherein said container lid comprises at least one side operable to seal said fixative fluid inside said holding chamber of said transport container during transport or handling and to avoid spillage and fumes.

106. The portable transporter system according to embodiment 76, wherein said container lid comprises at least one side operable to releasably couple said container lid onto said holding chamber.

107. The portable transporter system according to embodiment 106, wherein said at least one side operable to releasably couple said container lid onto said holding chamber couples via matching screw threads.

108. The portable transporter system according to embodiment 76, wherein the standard histology cassette is held separately until the tissue sample is collected, and wherein said container lid is operable to receive the standard histology cassette when the tissue sample is ready for insertion into said holding chamber.

109. The portable transporter system according to embodiment 76, wherein said container lid comprises:
a multi-purpose lid wherein at least one side is operable to at least one of:
hold an unused cassette upward to avoid contamination with said fixative prior to sample insertion;
seal said fixative fluid inside said holding chamber of said transport container during transport or handling and to avoid spillage and fumes;
releasably couple said container lid onto said holding chamber;
releasably couple said container lid onto said holding chamber couples via matching screw threads; or
receive the cassette when the tissue sample is ready for insertion.

110. The portable transporter system according to embodiment 76, further comprising an electronic data logger coupled to said transport container via a pod.

111. The portable transporter system according to embodiment 110, wherein said electronic data logger is in thermal communication with said transport container.

112. The portable transporter system according to embodiment 110, wherein said electronic data logger is operable to at least one of:
sense insertion of the tissue sample in said transport container;
determine time of insertion of the tissue sample data;
store time of insertion of the tissue sample data in at least one memory;
log time and date data of at least one of:
insertion in said transport container of the tissue sample in the standard histology cassette, or
receipt of a start time data;
start a timer to track time data from at least one of:
an insertion time of the standard histology cassette with the tissue sample in said transport container, or
receipt of a start timer data signal;
determine a time duration data of at least one of:
from said log time and date, or
from said start of said timer;
indicate a time duration data since at least one of:
said log time and date, or
said start of said timer;
indicate data via a display;
indicate data via a liquid crystal display (LCD);
indicate data via a light emitting diode (LED) display;
record a temperature data;
record a temperature and time data;
record at least one of a temperature or a time of crossing at least one temperature threshold data;
record at least one of a temperature or time of temperature excursion data against at least one preprogrammed threshold;
record at least one of a temperature or time of temperature excursion against heating or freezing data;
record at least one temperature change and a time of said at least one temperature change data;
indicate at least one recording;
indicate on at least one display said at least one record;
monitor temperature excursions data;
monitor at least one temperature change, and a time of said at least one temperature change, and log said at least one temperature change and said time data;
monitor data of at least one temperature change and time after seal of said transport container, and indicate relative performance of said data against at least one pre-programmed threshold;
indicate on at least one display results data of said monitor;
store data on at least one memory;
store at least one of sensed data; recorded data; monitored data; or calculated data on at least one memory;
store date on at least one memory, wherein said data comprises at least one of:
a sample identifier;
an identifier;
a radio frequency identifier (RFID);
a bar code identifier;
a QR code identifier;
a location;

a sensed location;
a received location;
a global positioning system (GPS) location;
a location relative to a Wi-Fi access point;
a location relative to a wireless communication network;
a wired communication data;
a wireless communication data;
a direct connection;
a local connection;
a local area network (LAN);
a wide area network (WAN);
a remote connection;
a Bluetooth network data;
a near field communication (NFC) data;
a Zigbee protocol-compliant standard wireless communication data;
a date and time of a data point;
a sensed data point;
a port connection;
a universal serial bus (USB) port connection;
a coupling to a communication device;
a coupling to a computing device;
a coupling to a portable device;
a coupling to a wireless device;
a coupling to a personal computer device;
a coupling to a smartphone device;
a coupling to a tablet device;
a coupling to a mobile phone device; or
a coupling to a telephony device.

113. The portable transporter system according to embodiment 76, further comprising a carrier unit integrated with a plurality of said container lids.

114. The portable transporter system according to embodiment 113, wherein said integrated carrier unit comprises wherein said plurality of said container lids comprises at least four container lids.

115. The portable transporter system according to embodiment 113, further comprising a protective sheath operable to protect the standard histology cassette against contamination or dust.

116. The portable transporter system according to embodiment 113, wherein said carrier unit comprises a plurality of holding chambers shipped with fixative in said plurality of holding chambers, each having one of said container lids.

117. The portable transporter system according to embodiment 113, wherein said container clip does not require the standard histology cassette to be removed from said container lid.

118. The portable transporter system according to embodiment 113, wherein said container lid is reversible and can be screwed onto said transport container immersing the tissue sample in said fixative.

119. The portable transporter system according to embodiment 113, wherein it is possible at a glance to see which of said plurality of holding chambers have samples inserted.

120. The portable transporter system according to embodiment 113, wherein said fixative comprises formalin.

121. The portable transporter system according to embodiment 113, wherein each said container lid is tall enough to receive application of at least one label, code, barcode, or identifier.

122. The portable transporter system according to embodiment 113, wherein each said transport container cannot be inadvertently left outside of a fixation-inhibiting cooling device.

123. The portable transporter system according to embodiment 113, wherein said cassette clip holds the standard histology cassette to ease reading of at least one code on the standard histology cassette.

124. The portable transporter system according to embodiment 76, wherein said fixative is prefilled into said transport container, and is refrigerated to be ready for use.

125. The portable transporter system according to embodiment 124, wherein the tissue sample, when surgically removed is marked with a patient identifier.

126. The portable transporter system according to embodiment 125, wherein the patient identifier comprises at least one of:
a barcode;
a wristband; or
a radio frequency identifier (RFID).

127. The portable transporter system according to embodiment 126, wherein the tissue sample is inserted into the standard histology cassette, and the standard histology cassette is placed in said transport container, wherein the standard histology cassette has a unique identifier.

128. The portable transporter system according to embodiment 127, wherein said transport container is transferred into a pod, wherein said pod holds a data logger in close proximity, and wherein said data logger logs at least one start time and start temperature reading.

129. The portable transporter system according to embodiment 128, wherein said pod is inserted into a fixation-inhibiting cooling device.

130. The portable transporter system according to embodiment 129, wherein said fixation-inhibiting cooling device ensures the tissue sample is kept at 4° C. during transport.

131. The portable transporter system according to embodiment 129, wherein said data logger logs temperatures continuously during transport to a laboratory.

132. The portable transporter system according to embodiment 129, wherein said data logger logs at least one of a temperature or a time at least one of:
continuously;
periodically;
at least one threshold;
at least one temperature threshold;
at a time interval;
upon a temperature change;
according to sensed data; or
after a time duration.

133. The portable transporter system according to embodiment 129, wherein upon arrival at the laboratory, time and temperature data is read from said data logger of said pod of said transport container and verifies integrity of the tissue sample.

134. The portable transporter system according to embodiment 133, wherein the tissue sample is stored in cold storage if additional cold storage time is determined to be required.

135. The portable transporter system according to embodiment 133, wherein the tissue sample is reviewed and at least one of transferred or kept in a final code identified standard histology cassette.

136. The portable transporter system according to embodiment 135, wherein the tissue sample is processed using a standard heated fixative processor, and with subsequent processing steps.

137. The portable transporter system according to embodiment 136, wherein the standard heated fixative processor processing the tissue sample for 2 hours at 45° C. temperature.

138. The portable transporter system according to embodiment 136, wherein said subsequent processing steps comprises at least one of an alcohol processing step, a xylene processing step, or a paraffin processing step.

139. The portable transporter system according to embodiment 136, wherein the tissue sample is embedded, sectioned, and stained.

140. The portable transporter system according to embodiment 139, wherein the tissue sample is stained with various markers or probes.

141. The portable transporter system according to embodiment 139, wherein the stain results are made available for at least one of:
  review by a pathologist,
  receipt of at least one score by a pathologist; or
  report results for the tissue sample to at least one clinical database.

142. The portable transporter system according to embodiment 76, further comprising wherein electronic data is collected.

143. The portable transporter system according to embodiment 142, wherein said electronic data is collected by at least one of:
  an electronic pen;
  a unique identifier;
  a tablet device;
  a wireless identifier;
  a Wi-Fi media access control (MAC) address;
  a static computing device;
  a mobile computing device;
  a barcode scanner;
  an external data temperature logger;
  a portable fixation-inhibiting cooling device comprising intelligence;
  a portable fixation-inhibiting cooling device comprising an electronic datalogger for collecting temperature and time data;

144. The portable transporter system according to embodiment 76, wherein a fixation-inhibiting cooling element is pre-charged over night for next day surgery.

145. The portable transporter system according to embodiment 76, wherein said transport container is kept pre-cooled in a refrigerator.

146. The portable transporter system according to embodiment 76, wherein a fixation-inhibiting cooling device is configured prior to surgery, is transported to surgery location, and keeps reagents cold.

147. The portable transporter system according to embodiment 76, wherein transportation of said portable transporter system is performed at an end of a surgery day.

148. The portable transporter system according to embodiment 76, wherein a fixation processor is operable to at least one of:
  collect transport data;
  perform final fixation steps required; or
  provide a comprehensive fixation quality report for each of the tissue samples.

149. The portable transporter system according to embodiment 142, wherein said electronic data is collected by an electronic pen, and collection comprises processing of data of the tissue sample comprising at least one of:
  establish chain-of-custody during the tissue sample collection, integrate data comprising at least one of: patient-ID, location of surgery, day/time, name of surgeon, or location of removal of the tissue sample;
  associate with a designated of said transport container and cassette identifier (ID);
  record insertion time of the tissue sample into the transport container;
  log transport conditions comprising at least one temperature or time profile;
  document a total time of cold diffusion after which the sample can be safely removed and submitted to a heated fixative step for crosslinking;
  duplicate capture of handwritten Lab Requisition Form by electronic data capture and associate data to a specific specimen of the tissue sample or the standard histology cassette via identifier comprising at least one of a barcode or radio-frequency identifier (RFID);
  verify a minimum fixation condition; or
  enable data capture for a clinical trial.

150. The portable transporter system according to embodiment 149, wherein said electronic data is collected by an electronic pen (ePen) comprising at least one of:
  use ePen to fill out lab requisition form;
  collect electronic data;
  collect identifier information from patient, said transport container, the standard histology cassette;
  transfer electronic data to a computing device for verification or correction;
  upload verified electronic data via communications network if possible;
  if upload not possible, ePen travels with the tissue sample in fixation-inhibited cooling device;
  receive at accessioning stage in histology lab for display and report to the LIS;
  optionally enter any corrections, if required; or
  provide readout of datalogger, or integrate into data uploaded to the LIS.

151. The portable transporter system according to embodiment 142, wherein said electronic data is collected by a unique identifier.

152. The portable transporter system according to embodiment 151, wherein said unique identifier comprises at least one of:
  an Anoto code printed onto a label of a container;
  a barcode on the cassette could be a vantage compatible preprinted code being inserted into said container;
  a barcode on the cassette identifiable by a barcode reader when said container arrives at accessioning stage, wherein said barcode reader is tied to patient-ID associated to a code of said container; or
  a unique label with Anoto pattern on said container, wherein the container is picked randomly, pen ties code electronically to patient-ID, and handwritten link and an identifier to be copied from a label of said container onto paper.

153. The portable transporter system according to embodiment 142, wherein said electronic data is collected by a tablet device coupled to the portable transporter system by at least one of wired or wireless communication, and collection comprises processing of data of the tissue sample comprising at least one of:
  establish chain-of-custody during the tissue sample collection, integrate data comprising at least one of: patient-ID, location of surgery, day/time, name of surgeon, or location of removal of the tissue sample;
  associate with a designated of said transport container and cassette identifier (ID);
  record insertion time of the tissue sample into the transport container;
  log transport conditions comprising at least one temperature or time profile;

document a total time of cold diffusion after which the sample can be safely removed and submitted to a heated fixative step for crosslinking;

duplicate capture of handwritten Lab Requisition Form by electronic data capture and associate data to a specific specimen of the tissue sample or the standard histology cassette via identifier comprising at least one of: a barcode; or radio-frequency identifier (RFID);

data capture via at least one of: camera; RFID; or near field communication (NFC) tag via communication interface;

capture of image of surgical site;

verify a minimum fixation condition; or enable data capture for a clinical trial.

154. The portable transporter system according to embodiment 153, wherein said electronic data is collected by said tablet comprising at least one of:

capture pertinent information about patient and study on the tablet;

capture duplicate entry of lab requisition form on the tablet;

optionally correct any data entry errors on screen, if needed;

optionally upload verified electronic data via wireless communication to LIS;

provide tablet accompanying the tissue sample in same cooling and shipping box;

receive at the accessioning stage in histology lab the tablet for display or report to the LIS; or provide readout of datalogger, or integrate into data uploaded to the LIS.

155. The portable transporter system according to embodiment 142, wherein said electronic data is collected by a wireless identifier.

156. The portable transporter system according to embodiment 155, wherein said electronic data is collected by said wireless identifier comprising a wireless fidelity (Wi-Fi) media access control (MAC) address.

157. The portable transporter system according to embodiment 156, wherein said electronic data is collected by said Wi-Fi MAC address and wherein a device having said Wi-Fi MAC address comprises at least one of:

a datalogger and positional time stamper operable to track the tissue sample;

any time a Wi-Fi router or device with said MAC address communicate, identity of both said router and said device are logged; or since time of contact is known and location of a Wi-Fi router is known, a location of a device with said MAC address is recorded over the journey of the MAC device via a network of free-access Wi-Fi routers.

158. The portable transporter system according to embodiment 142, wherein said electronic data is collected by a static computing device, and collection comprises processing of data of the tissue sample comprising at least one of:

establish chain-of-custody during the tissue sample collection, integrate data comprising at least one of: patient-ID, location of surgery, day/time, name of surgeon, or location of removal of the tissue sample;

associate with a designated of said transport container and cassette identifier (ID);

record insertion time of the tissue sample into the transport container;

log transport conditions comprising at least one temperature or time profile;

document a total time of cold diffusion after which the sample can be safely removed and submitted to a heated fixative step for crosslinking;

duplicate capture of handwritten Lab Requisition Form by electronic data capture and associate data to a specific specimen of the tissue sample or the standard histology cassette via identifier comprising at least one of: a barcode; or radio-frequency identifier (RFID);

data capture via at least one of: camera; RFID; or near field communication (NFC) tag via communication interface;

capture of image of surgical site;

verify a minimum fixation condition; or enable data capture for a clinical trial.

159. The portable transporter system according to embodiment 158, wherein said electronic data is collected by said static computing device comprises at least one of:

capture pertinent information about patient and study;

capture duplicate entry of lab requisition form;

optionally correct any data entry errors on screen, if needed;

optionally upload verified electronic data via communication network to LIS;

if LIS connectivity is prohibited, optionally program data logger to retain additional information on computer locally;

receive at the accessioning stage in histology lab identifier information to reference the tissue sample via LIS query for display or report to the LIS; or provide readout of datalogger, or integrate into data uploaded to the LIS.

160. The portable transporter system according to embodiment 142, wherein said electronic data is collected by a travelling cooling shipping box with intelligence, and collection comprises processing of data of the tissue sample comprising at least one of:

establish chain-of-custody during the tissue sample collection, integrate data comprising at least one of: patient-ID, location of surgery, day/time, name of surgeon, or location of removal of the tissue sample;

associate with a designated of said transport container and cassette identifier (ID);

record insertion time of the tissue sample into the transport container;

log transport conditions comprising at least one temperature or time profile;

document a total time of cold diffusion after which the sample can be safely removed and submitted to a heated fixative step for crosslinking;

duplicate capture of handwritten Lab Requisition Form by electronic data capture and associate data to a specific specimen of the tissue sample or the standard histology cassette via identifier comprising at least one of: a barcode; or radio-frequency identifier (RFID);

data capture via at least one of: camera; RFID; or near field communication (NFC) tag via communication interface;

capture of image of surgical site;

verify a minimum fixation condition; or enable data capture for a clinical trial.

161. The portable transporter system according to embodiment 160, wherein said electronic data is collected by said travelling cooling shipping box with said intelligence, comprising at least one of:

capture pertinent information about patient and study;

capture duplicate entry of lab requisition form;

optionally interface computer with a host computer in said travelling cooling shipping box to store data;
optionally monitor loading or unloading of the tissue sample by the host computer in said travelling cooling shipping box, and log time and temperature;
optionally correct any data entry errors on screen, if needed; or
at the accessioning stage in histology lab, the host computer provides electronic data collected.

162. The portable transporter system according to embodiment 142, wherein said transport of the tissue sample comprises a cooling box configured to at least one of:
pre-charge over night for a next day surgery;
pre-cool in fridge said container;
prior to surgery transport to surgery location and maintain in cold temperature reagents; or
initiate shipping at end of surgery day.

163. The portable transporter system according to embodiment 162, wherein said cooling box is maintained at about 4° C.

164. A portable transporter system adapted to carry a tissue sample contacting a fixative, comprising:
a transport container comprising:
a holding chamber; and
a fixative; and
a container lid comprising:
a cassette holder operable to be coupled to the standard histology cassette and comprising a first seal; and
a cassette receiver operable to be releasably coupled to said transport container and comprising a second seal, wherein said cassette holder and said cassette receiver are operable to be attachably coupled to one another upon insertion of the standard histology cassette coupled to said cassette holder into said cassette receiver.

165. The portable transporter system according to embodiment 164, wherein said cassette holder and said cassette receiver are operable to be attachably coupled to one another via at least one male snap clip and at least one female snap clip receiver.

166. The portable transporter system according to embodiment 165, wherein said at least one male snap clip is on a bottom portion of said cassette holder, and said at least one female snap clip receiver is on an upper portion of said cassette receiver.

167. The portable transporter system according to embodiment 165, wherein said at least one male snap clip comprises a plurality of said at least one male snap clips.

168. The portable transporter system according to embodiment 167, wherein said plurality of said male snap clips comprises at least four snap clips.

169. The portable transporter system according to embodiment 164, wherein said first and second seals comprise solvent compatible o-rings.

170. The portable transporter system according to embodiment 164, wherein said fixative has a fixative volume comprising a holding chamber volume of said holding chamber less a cassette volume of a standard histology cassette.

171. A portable transporter system adapted to carry a tissue contacting a fixative, comprising:
a transport container comprising:
a holding chamber; and
a container lid operable to be releasably coupled to said transport container, said container lid comprising:
a built-in septum comprising a molded boss comprising an external thread; and
a standard sealing screw-top comprising an inner thread matching said external thread of said molded boss, said screw-top operable to cover said built-in septum.

172. The portable transporter system according to embodiment 171, further comprising a syringe comprising a pre-filled amount of fixative, and operable to be refrigerated until used to fill said holding chamber with said fixative, via said built-in septum, after the tissue sample is placed inside said holding chamber.

173. The portable transporter system according to embodiment 172, wherein said fixative comprises formalin.

174. The portable transporter system according to embodiment 171, further comprising a cassette clip attachably couplable to receive, hold and retain the standard histology cassette.

175. A transporter system for protecting biomarkers in a tissue sample, comprising:
a specimen container configured to retain or hold at least one tissue sample in a reagent, wherein the reagent is chilled to from about 0° C. to about 15° C. prior to transportation to a laboratory;
a carrier assembly configured to retain or hold the specimen container; and
a monitoring system that comprises at least one sensor configured to obtain, store or transmit one or both of time and temperature information about the tissue sample and/or reagent in the specimen container when the specimen container is positioned in the carrier assembly and transported to a laboratory, wherein the monitoring system further comprises a data logging device.

176. The transporter system of embodiment 175 wherein the reagent is a tissue fixation reagent.

177. The transporter system of embodiment 175 further comprising a tissue sample cassette for retaining one or more tissue samples therein and wherein the specimen container is configured to retain and hold the tissue sample cassette in the reagent.

178. The transporter system of embodiment 1751, wherein the monitoring system measures the temperature of the reagent and/or tissue sample in the specimen container over a period of time.

179. The transport system of embodiment 175, further comprising a transport container for transporting the specimen container, carrier assembly and monitoring system to a destination.

180. The transporter system of embodiment 175, wherein the monitoring systems comprises one or more sensors selected from the group consisting of temperature, elapsed time, transporter temperature, ambient light, infrared proximity, accelerometer, acoustic, and capacitive sensors.

181. The transporter system of embodiment 175, wherein the monitoring system is physically coupled to the carrier assembly.

182. The transporter system of embodiment 175, wherein the monitoring system is electronically coupled to the carrier assembly.

183. The transporter system of embodiment 175, wherein the monitoring system comprises at least one sensor, wherein the sensor is a temperature sensor positioned in the specimen container and comprises a transmitter that outputs a temperature signal to a receiver located in the carrier assembly holding that specimen container.

184. The transporter system of embodiment 175, wherein the monitoring system either stores temperature measurements indicative of the temperature of the reagent and/or the tissue sample or transmits such information to an external receiver wherein the receiver comprises a memory device.

185. The transporter system of embodiment 4, wherein the specimen container comprises a temperature sensor wherein said sensor transmits the temperature of the reagent contained therein to the monitoring system.

186. The transport system of embodiment 175, wherein the specimen container further comprises a radio frequency identification (RFID) tag and the monitoring system further comprises a RFID reader.

187. The transport system of embodiment 175, further comprising a transport container for transporting the specimen container, carrier assembly and monitoring system wherein the transport container comprises an ice bath.

188. The transport system of embodiment 175, further comprising a transport container for transporting the specimen container, carrier assembly and monitoring system, wherein the transport container is configured to maintain the temperature of a specimen container therein to from about 0° C. to about 15° C. for up to 14 days.

189. The transporter system of embodiment 175, further comprising a plurality of carrier assemblies and a plurality of specimen containers wherein each of the plurality of carrier assemblies holds a separate one of the plurality of specimen containers.

190. The transporter system of embodiment 175 further comprises a cooling device configured to reduce or maintain an average temperature of reagent in the specimen container to or at a temperature equal to or lower than about 15° C.

191. An apparatus for transporting tissue samples, comprising:
  a plurality of specimen containers holding reagents;
  a plurality of carrier assemblies, each assembly comprising a specimen container holder and a sensor assembly positioned to monitor the temperature of the specimen container or the reagent held in each specimen container and time the container is held in the holder, wherein the sensor assembly comprises a temperature sensor and a time sensor;
  a transport assembly for carrying the multiple carrier assemblies; and
  a transporter for carrying at least one transport assembly.

192. The apparatus of embodiment 175, wherein the sensor assembly of each of the plurality of carrier assemblies comprises a temperature sensor positioned within the specimen container, wherein the temperature sensor includes a transmitter that outputs a temperature signal to a receiver located in the carrier assembly holding that specimen container.

193. The apparatus of embodiment 192, further comprising a computing device communicatively coupled to the transmitters and receivers, wherein the computing device is configured to evaluate sound speeds in the tissue sample by evaluating time of flight changes of acoustic waves from one or more of the transmitters.

194. The apparatus of embodiment 192, further comprising a computing device configured to compensate for changes in the time of flight of acoustic waves in a fixative or sample associated with environmental changes.

195. The apparatus of embodiment 192, further comprising the computing device containing instructions, when executed, to cause the computing device to compensate for temperature changes of one or more of the reagent or sample.

196. A transporter system for carrying a tissue sample, comprising:
  a specimen container configured to hold a tissue sample in a fixative;
  a carrier assembly configured to retain or hold a specimen container;
  a monitoring system that obtains and stores time and temperature information about the tissue sample in the specimen container when the specimen container is positioned in the carrier assembly; and
  a transport container configured to hold the carrier assembly holding the specimen container and monitoring system, wherein the transport container is further configured to maintain the temperature of the internal holding chamber at from about 0° C. to about 20° C. for at least 1 hour.

197. The transporter system of embodiment 196, wherein the transport container is configured to maintain the temperature of the internal holding chamber at from about 0° C. to about 15° C. for at least 24 hours.

198. The transporter system of embodiment 196, wherein the transport container is configured to maintain the temperature of the internal holding chamber at from about 0° C. to about 15° C. for up to 14 days.

199. The transporter system of embodiment 196, wherein the carrier assembly is configured to hold a plurality of specimen containers each holding a respective tissue sample, wherein the monitoring system includes a plurality of temperature sensors each measuring a temperature of the tissue sample in one of the specimen containers.

200. The transporter system of embodiment 196, wherein the monitoring system measures the temperature of the fixative and/or tissue sample over a period of time.

201. The transporter system of embodiment 196, wherein the monitoring system includes a temperature sensor carried by the specimen container and positioned to measure a temperature of the fixative.

202. The transporter system of embodiment 196, wherein the monitoring system stores temperature measurements indicative of the temperature of the fixative and/or the tissue sample.

203. The transport system of embodiment 196, wherein the monitoring system includes a reader physically coupled to the carrier assembly and a radio-frequency identification tag coupled to the specimen container.

204. The transporter system of embodiment 196, wherein the transport container comprises a cooling device configured to reduce an average temperature of fixative in the specimen container from room temperature to a temperature equal to or lower than about 15° C.

205. The transporter system of embodiment 196, wherein the monitoring system further comprises a timer.

206. The transporter system of embodiment 196, wherein the specimen container includes a cover and a main body, wherein the cover includes a holder configured to hold the tissue sample in contact with the fixative.

207. A method for processing a tissue sample, comprising:
  contacting the tissue sample with a fixative chilled to from about 0° C. to about 15° C., wherein the fixative is contained in a specimen receiving container;
  placing a specimen container in a holding well of a carrier assembly further comprising at least one data logging device;
  detecting and storing time and temperature information associated with the tissue sample in the data logger of the carrier assembly;
  placing the carrier assembly in a transport assembly; and
  transporting the transport assembly to a destination.

208. The method of embodiment 207, wherein detecting the time and temperature information associated with the tissue sample includes:

measuring a temperature of the fixative and/or the tissue sample, and measuring a contact period of time in which the fixative contacts the tissue sample.

The method of embodiment 33, wherein detecting the time and temperature information associated with the tissue sample includes obtaining temperature measurements and storing the temperature measurements.

The various embodiments and features described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A tissue sample transport and storage assembly comprising:
   (a) a sample container assembly comprising:
      (a1) a wall defining a first cavity for holding a volume of a fixative solution;
      (a2) a container lid comprising a first side and a second side, wherein the container lid is configured to create a fixative impervious barrier enclosing the first cavity, wherein the second side faces the first cavity and wherein the first side faces away from the cavity;
      (a3) a cassette holder movable between a first position on the first side of the container lid and a second position on the second side of the container lid;
      (a4) a histology cassette removably attached to the cassette holder and configured such that when the cassette holder is in the second position, the histology cassette is immersed in the volume of the fixative solution held within the first cavity; and
      (a5) a cassette cover removably and directly coupled to the first side of the container lid and configured to cover the histology cassette when the cassette holder is in the first position;
   (b) a temperature-responsive element disposed on an outer surface of the wall defining the first cavity, where the temperature-responsive element is in thermal communication with the volume of the fixative solution: and
   (c) a case assembly comprising a second cavity, wherein the case assembly comprises an insulator material and/or a cooling element, wherein the second cavity is sized to accept the sample container assembly and the temperature-responsive element, and wherein the insulator material and/or a cooling element is configured to maintain the volume of the fixative solution at a temperature in the range of 0° C. to 7° C. for at least 2 hours when the tissue sample transport and storage assembly is assembled.

2. The tissue sample transport and storage assembly of claim 1, wherein the cassette holder is configured to be screwed into at least one of the first and second sides of the container lid.

3. The tissue sample transport and storage assembly of claim 1, wherein the histology cassette is clipped to the cassette holder.

4. The tissue sample transport and storage assembly of claim 1, wherein the cassette holder comprises:
   a first end operable to be coupled to at least one of the first and second sides of the container lid; and
   a second end operable to be coupled to the histology cassette.

5. The tissue sample transport and storage assembly of claim 1, wherein the cassette cover establishes a sterile seal between the container lid and the histology cassette when the cassette holder is in the first position.

6. The tissue sample transport and storage assembly of claim 1, wherein the sample container assembly further comprises a cassette septum, wherein the cassette septum is removable with said container lid, said cassette holder, and said histology cassette.

7. The tissue sample transport and storage assembly of claim 6, wherein said cassette septum comprises a breakable membrane.

8. The tissue sample transport and storage assembly of claim 7, wherein said container lid further comprises an arm operable to break said breakable membrane upon insertion of the histology cassette into said the first cavity of said sample container assembly.

9. The tissue sample transport and storage assembly of claim 1, wherein said container lid further comprises a portion comprising an internal screw thread portion configured to couple with an external screw thread portion of said sample container, operable to isolate the sample, air and said fixative from a surrounding environment.

10. The tissue sample transport and storage assembly of claim 1, wherein the insulator material defining the second cavity comprises a cooling element.

11. The tissue sample transport and storage assembly of claim 10, wherein the cooling element comprises at least one element selected from the group consisting of:
   a first substance and a second substance that mix to produce an endothermic reaction in response to a fixation-inhibiting cooling device changing from a non-cooling mode to a cooling mode;
   a desiccant and a substance that evaporates to cool the fixative; and
   a refrigeration unit or a thermoelectric cooler unit.

12. The tissue sample transport and storage assembly of claim 10, wherein the cooling element comprises a cooling material having a freezing point in the range of 0° C. to 7° C.

13. The tissue sample transport and storage assembly of claim 12, wherein the volume of the cooling material is selected such that the time for the volume of coolant to transition from completely frozen to completely melted is at least two hours when stored at 20° C. without pressurization.

14. The tissue sample transport and storage assembly of claim 1, wherein said temperature responsive element comprises an absorbent material and a dye, wherein the dye can diffuse through the absorbent material when at a first temperature range and to not diffuse through the dye when at a second temperature range, wherein the extent of diffusion of the dye through the absorbent material correlates with the amount of time that the fixative solution has been at a temperature in the first temperature range.

15. The tissue sample transport and storage assembly of claim 14, wherein the first temperature range is from 0° C. to 7° C., and the second temperature range is a temperature above 7° C.

16. The tissue sample transport and storage assembly of claim 14, wherein the dye is disposed in a matrix having a melting point at a temperature above 7° C., wherein the first temperature range is a temperature at or above the melting point, wherein the second temperature range is a temperature below the melting point.

17. The tissue sample transport and storage assembly of claim 1, wherein said temperature responsive element comprises:
   a first absorbent material and a first dye, wherein the first dye is engineered to diffuse through the absorbent material when at temperature range is from 0° C. to 7° C. and to not diffuse through the absorbent material when at a temperature above 7° C., and wherein the extent of diffusion of the first dye through the first absorbent material correlates with the amount of time that the formalin-based fixative solution has been at a temperature in the temperature range from 0° C. to 7° C.;
   a second absorbent material and a second dye, wherein the second dye is disposed in a matrix having a melting point at a temperature above 7° C., wherein the second dye begins diffusing through the second absorbent material when the matrix begins melting, and wherein the extent of diffusion of the second dye through the second absorbent material correlates with the amount of time that the formalin-based fixative solution has been at a temperature above the melting point.

18. The tissue sample transport and storage assembly of claim 17, wherein the first and/or second absorbent material is attached to the walls or the seal of the sample container assembly without being placed within the cavity defined by the walls.

19. The tissue sample transport and storage assembly of claim 1, further comprising a data logger.

20. The tissue sample transport and storage assembly of claim 19, wherein the temperature responsive element comprises a temperature sensor configured to communicate the temperature of the formalin-based fixative solution to the data logger.

21. The tissue sample transport and storage assembly of claim 20, wherein the temperature sensor is an infrared temperature sensor.

22. The tissue sample transport and storage assembly of claim 19, wherein the data logger further comprises a timer.

23. The tissue sample transport and storage assembly of claim 19, wherein the data logger is operable to at least one of:
   sense insertion of the tissue sample in the sample container;
   determine time of insertion of the tissue sample data;
   store time of insertion of the tissue sample data in at least one memory;
   log time and date data of at least one of: insertion in said sample container assembly of the tissue sample in the histology cassette, or receipt of a start time data;
   start a timer to track time data from at least one of: an insertion time of the histology cassette with the tissue sample in said sample container assembly, or receipt of a start timer data signal;
   determine a time duration data of at least one of: from said log time and date, or from said start of said timer;
   indicate a time duration data since at least one of: said log time and date, or said start of said timer;
   indicate data via a display;
   indicate data via a liquid crystal display (LCD);
   indicate data via a light emitting diode (LED) display;
   record a temperature data;
   record a temperature and time data;
   record at least one of a temperature or a time of crossing at least one temperature threshold data;
   record at least one of a temperature or time of temperature excursion data against at least one preprogrammed threshold;
   record at least one of a temperature or time of temperature excursion against heating or freezing data;
   record at least one temperature change and a time of said at least one temperature change data;
   indicate at least one recording;
   indicate on at least one display said at least one record;
   monitor temperature excursions data;
   monitor at least one temperature change, and a time of said at least one temperature change, and log said at least one temperature change and said time data;
   monitor data of at least one temperature change and time after sealing of said sample container assembly, and indicate relative performance of said data against at least one pre-programmed threshold;
   indicate on at least one display results data of said monitor;
   store data on at least one memory;
   store at least one of sensed data; recorded data; monitored data; or calculated data on at least one memory;
   store data on at least one memory, wherein said data comprises at least one of: a sample identifier; an identifier; a radio frequency identifier (RFID); a bar code identifier; a QR code identifier; a location; a sensed location; a received location; a global positioning system (GPS) location; a location relative to a Wi-Fi access point; a location relative to a wireless communication network; a wired communication data; a wireless communication data; a direct connection; a local connection; a local area network (LAN); a wide area network (WAN); a remote connection; a Bluetooth network data; a near field communication (NFC) data; a Zigbee protocol-compliant standard wireless communication data; a date and time of a data point; a sensed data point; a port connection; a universal serial bus (USB) port connection; a coupling to a communication device; a coupling to a computing device; a coupling to a portable device; a coupling to a wireless device; a coupling to a personal computer device; a coupling to a smartphone device; a coupling to a tablet device; a coupling to a mobile phone device; or a coupling to a telephony device.

24. The tissue sample transport and storage assembly of claim 1, further comprising a first temperature-responsive element in thermal communication with the volume of the fixative solution.

* * * * *